US012412719B2

(12) United States Patent
Ao et al.

(10) Patent No.: US 12,412,719 B2
(45) Date of Patent: Sep. 9, 2025

(54) OPERATING MECHANISM OF CIRCUIT BREAKER, AND CIRCUIT BREAKER

(71) Applicant: Chint Low Voltage Electrical Technology Co., Ltd., Shanghai (CN)

(72) Inventors: Denggui Ao, Shanghai (CN); Hao Fu, Shanghai (CN); Yongfu Xu, Shanghai (CN)

(73) Assignee: CHINT LOW VOLTAGE ELECTRICAL TECHNOLOGY CO., LTD. (CN)

( * ) Notice: Subject to any disclaimer, the term of this patent is extended or adjusted under 35 U.S.C. 154(b) by 0 days.

(21) Appl. No.: 18/248,400

(22) PCT Filed: Mar. 31, 2022

(86) PCT No.: PCT/CN2022/084552
§ 371 (c)(1),
(2) Date: Apr. 10, 2023

(87) PCT Pub. No.: WO2022/206919
PCT Pub. Date: Oct. 6, 2022

(65) Prior Publication Data

US 2023/0377825 A1 Nov. 23, 2023

(30) Foreign Application Priority Data

Apr. 1, 2021 (CN) ......................... 202110355214.0

(51) Int. Cl.
*H01H 71/52* (2006.01)

(52) U.S. Cl.
CPC ................................ *H01H 71/521* (2013.01)

(58) Field of Classification Search
CPC ...... H01H 71/52; H01H 71/522; H01H 71/24; H01H 71/10; H01H 69/00; H01H 71/505;
(Continued)

(56) References Cited

U.S. PATENT DOCUMENTS

2023/0368997 A1* 11/2023 Ao ....................... H01H 71/505
2023/0377824 A1* 11/2023 Ao ......................... H01H 71/12
(Continued)

FOREIGN PATENT DOCUMENTS

CN 201242984 Y 5/2009
CN 203445073 U 2/2014
(Continued)

OTHER PUBLICATIONS

International Search Report mailed Jun. 28, 2022 in corresponding PCT International Application No. PCT/CN2022/084552.
(Continued)

*Primary Examiner* — Lheiren Mae A Caroc
(74) *Attorney, Agent, or Firm* — OSTROLENK FABER LLP

(57) ABSTRACT

An operating mechanism of a circuit breaker, relating to the field of low-voltage electric appliances. The operating mechanism is provided with a double-slider mechanism, a first slider mechanism comprising a first crank, a first connecting rod, a sliding rail and a slider, and a second slider mechanism comprising a contact support, a second connecting rod, a sliding rail and a slider. The double-slider mechanism reduces the space requirement of the operating mechanism while increasing the opening distance of a moving contact, and the breaking performance is good. A circuit breaker comprising the operating mechanism, which provides good breaking performance.

15 Claims, 19 Drawing Sheets

(58) Field of Classification Search
CPC .. H01H 71/54; H01H 2071/507; H01H 11/00; H01H 71/521
USPC .................................................. 200/400, 500
See application file for complete search history.

(56) References Cited

U.S. PATENT DOCUMENTS

| | | | | |
|---|---|---|---|---|
| 2023/0386774 | A1* | 11/2023 | Ao | H01H 1/00 |
| 2023/0411098 | A1* | 12/2023 | Ao | H01H 71/10 |
| 2024/0212963 | A1* | 6/2024 | Ao | H01H 73/04 |

FOREIGN PATENT DOCUMENTS

| | | | |
|---|---|---|---|
| CN | 205789775 | U | 12/2016 |
| CN | 205789805 | U | 12/2016 |
| CN | 206758380 | U | 12/2017 |
| CN | 207542173 | U | 6/2018 |
| CN | 207587663 | U | 7/2018 |
| CN | 208400795 | U | 1/2019 |
| CN | 211654742 | U | 10/2020 |
| WO | WO 2016145704 | A1 | 9/2016 |

OTHER PUBLICATIONS

Extended European Search Report dated Aug. 27, 2024 issued in corresponding European Patent Application No. 22779099.5.

* cited by examiner

OPERATING MECHANISM OF CIRCUIT BREAKER, AND CIRCUIT BREAKER

CROSS-REFERENCE TO RELATED APPLICATIONS

The present application is a 35 U.S.C. §§ 371 national stage application of International Application No. PCT/CN2022/084552, filed Mar. 31, 2022, which claims priority to Chinese Patent Application No. CN202110355214.0, filed Apr. 1, 2021, the contents of which are incorporated herein by reference.

TECHNICAL FIELD

The present invention relates to the field of low-voltage electrical appliances, and more particularly to an operating mechanism of a circuit breaker and the circuit breaker including the operating mechanism.

BACKGROUND ART

With the continuous improvement of an electric energy system, the voltage requirements for a circuit breaker are getting higher and higher. In order to meet the needs of the circuit breaker for a breaking high voltage, increasing an opening distance between a moving contact and a static contact is a common design method, which generally includes the following two design schemes.

One scheme is to increase a length of a moving contact arm, but has the following disadvantages: in order to ensure the reliable connection performance between the moving contact and the static contact, there must be sufficient pressure between the moving contact and the static contact; with the lengthening of the moving contact arm, a required contact spring force will increase sharply, and the force of a spring of the operating mechanism will also increase sharply; and meanwhile, the service life of the circuit breaker is shortened due to the increase in operating force.

The other scheme is to adjust a four-link structure of the existing operating mechanism to increase the opening distance. Due to the high correlation between movements of respective connecting rods in the four-link structure, if a contact support rotates at a larger angle while driving the moving contact to be disconnected, a jump buckle and an upper connecting rod also need to rotate at a larger angle. However, the rotation angle of the jump buckle is directly related to a latch and a handle, such that the handle and the latch need to rotate at a larger angle, which puts forward higher requirements for space. In addition, the length, position, and elasticity of a spring adapted to the jump buckle change, and accordingly, the larger angle of the jump buckle in rotation will slow down a movement speed of the entire mechanism.

SUMMARY OF THE INVENTION

An object of the present invention is to overcome the defects of the prior art and improve an operating mechanism of a circuit breaker, so that an opening distance of a moving contact is increased without increasing a space requirement of the operating mechanism, and a good breaking performance is achieved.

The present invention further provides a circuit breaker including the operating mechanism, and the circuit breaker has a good breaking performance.

In order to achieve the above object, the present invention adopts the following technical solutions:

The present invention provides an operating mechanism of a circuit breaker, comprising a bracket; a rocker arm assembly and a jump buckle pivotally disposed on the bracket respectively, as well as a first crank, a first spring, a first connecting rod and a contact support, wherein one end of the first crank is pivotally disposed on the jump buckle around a first axis, and the other end of the first crank is rotatably connected to one end of the first connecting rod; one end of the first spring is connected to the rocker arm assembly, and the other end of the first spring is connected to the rotating connection position of the first crank and the first connecting rod; and the operating mechanism further comprises slide rails, a slider and a second connecting rod; the slider is slidably disposed on the slide rails and is rotatably connected to the other end of the first connecting rod; one end of the second connecting rod is rotatably connected to the slider, and the other end of the second connecting rod is rotatably connected to the contact support; and the contact support is driven to rotate around a third axis.

Further, the operating mechanism further comprises an auxiliary limiting structure, one end of the auxiliary limiting structure is rotatably connected to the second connecting rod, and the other end of the auxiliary limiting structure is rotatably connected to the bracket or a housing of the circuit breaker.

Further, the auxiliary limiting structure is a third crank, one end of the third crank is rotatably connected to the second connecting rod, and the other end of the third crank is rotatably connected to the bracket or the housing of the circuit breaker.

Further, the slide rails are disposed on the bracket or the housing of the circuit breaker, and the slide rails are of a groove-like structure or a hole-like structure.

Further, each slide rail is straight, arc-shaped, triangular, or a combined shape of straight line and arc.

Further, the bracket comprises two bracket arms disposed to face each other at intervals, and each bracket arm is provided with a slide rail, and two ends of the slider are respectively slidably disposed on the two slide rails.

Further, the slide rails is slide holes, and the slider is a sliding shaft, two ends of which are respectively disposed in the two slide holes.

Further, the second connecting rod has an arc or straight plate structure

Further, the other end of the second connecting rod is rotatably connected to the contact support through the first connecting shaft;

Further, the bracket comprises a second avoidance hole for the first connecting shaft to pass through for avoiding the first connecting shaft.

Further, the operating mechanism includes a plurality of contact supports arranged side by side at intervals, and the respective contact supports are linked by means of a linkage shaft; and the housing of the circuit breaker is provided with a first avoidance hole for the linkage shaft to pass through for avoiding the linkage shaft.

Further, the operating mechanism further includes a latch and a re-buckle disposed on the bracket respectively, wherein a jump buckle is in latching fit with the latch, and the latch is in limiting fit with the re-buckle.

The present invention provides another operating mechanism of a circuit breaker, comprising a bracket; a rocker arm assembly and a jump buckle pivotally disposed on the bracket respectively, as well as a first crank, a first spring, a first connecting rod and a contact support, wherein one end of the first crank is pivotally disposed on the jump buckle around a first axis, and the other end of the first crank is rotatably connected to one end of the first connecting rod; one end of the first spring is connected to the rocker arm assembly, and the other end of the first spring is connected to the rotating connection position of the first crank and the first connecting rod; and the operating mechanism further comprises slide rails, a slider, a second crank and a second connecting rod; the slider is slidably disposed on the slide rails and is rotatably connected to the other end of the first connecting rod; the second crank comprises a second crank supporting portion, a second crank connecting portion, and a second crank driving portion, wherein the second crank is pivotally disposed through the second crank supporting portion, and the second crank is connected to the contact support through the second crank driving portion; one end of the second connecting rod is rotatably connected to the slider, and the other end of the second connecting rod is rotatably connected to the second crank connecting portion; and the contact support is driven to rotate around a third axis.

Further, the second crank is pivotally disposed on the bracket or the housing of the circuit breaker through the second crank supporting portion; the second crank supporting portion and the second crank driving portion are respectively disposed on two ends of the second crank; and the second crank connecting portion is disposed between the second crank supporting portion and the second crank driving portion.

Further, the second crank driving portion is rotatably connected to the contact support through a linkage shaft.

Further, the housing of the circuit breaker is provided with a first avoidance hole for the linkage shaft to pass through for avoiding the linkage shaft; the other end of the second connecting rod is rotatably connected to the second crank connecting portion through the first connecting shaft; and the bracket is provided with a second avoidance hole for the first connecting shaft to pass through for avoiding the first connecting shaft.

Further, the center of rotation of the second crank is a ninth axis, and the ninth axis is parallel to or coincided with the third axis.

Further, the slide rails are disposed on the bracket or the housing of the circuit breaker, and the slide rails are of a groove-like structure or a hole-like structure.

Further, each slide rail is straight, arc-shaped, triangular, or a combined shape of straight line and arc.

Further, the second connecting rod has an arc or straight plate structure

Further, the operating mechanism further includes a latch and a re-buckle disposed on the bracket respectively, wherein a jump buckle is in latching fit with the latch, and the latch is in limiting fit with the re-buckle.

Further, the operating mechanism further comprises a moving contact, the moving contact is a single-breakpoint contact or more breakpoints contact.

Further, the operating mechanism further comprises a latch and a re-buckle which are pivotally disposed on the bracket respectively; the jump buckle is in latching fit with the latch, and the latch is in limiting fit with the re-buckle; the rocker arm assembly comprises a handle, a rocker arm fixedly connected to the handle, and a reset structure for driving the jump buckle to rotate to re-buckle with the latch, the rocker arm being pivotally disposed on the bracket; the first crank comprises a crank limiting portion, which is in limiting fit with the jump buckle; two ends of a swing stroke of the rocker arm are a first stroke end and a second stroke end, respectively; two ends of the first spring are a first spring end and a second spring end, respectively, which are respectively connected to the rocker arm assembly and the first crank.

Further, in the case that the operating mechanism is in a closed state, the rocker arm swings toward the second stroke end and drives the first spring end to rotate around the second spring end, until the first spring passes a first dead center position; the first spring drives the first crank to rotate in a second direction and drives the rocker arm to swing to the second stroke end; the first crank drives the slider through the first connecting rod to slide along the slide rails; and the slider drives the contact support through the second connecting rod to rotate in a first direction to a breaking position, so that the operating mechanism is switched to a disconnected state;

in the case that the operating mechanism is in the disconnected state, the rocker arm swings toward the first stroke end and drives the first spring end to rotate around the second spring end, until the first spring passes the first dead center position; the first spring drives the first crank to rotate in the first direction, such that the crank limiting portion is in limiting fit with the jump buckle, thereby preventing the first crank from rotating in the first direction; meanwhile, the first spring drives the rocker arm to swing to the first stroke end, and the first crank drives the slider through the first connecting rod to slide along the slide rails; and the slider drives the contact support through the second connecting rod to rotate in the first direction to a closing position, so that the operating mechanism is switched to a closed state; the first direction and the second direction are opposite to each other;

Further, in the case that the operating mechanism is in the closed state, the re-buckle rotates to release the limiting fit from the latch, and the latch rotates to release the latching fit from the the jump buckle; the jump buckle rotates and drives the first crank to rotate synchronously, the first crank drives the slider through the first connecting rod to slide along the slide rails, and meanwhile, the slider drives the contact support through the second connecting rod to rotate in the second direction to the breaking position; the first spring drives the rocker arm to swing toward the second stroke end to the reset structure till being in limiting fit with the jump buckle, and the operating mechanism is switched to a tripped state; and in the case that the operating mechanism is in the tripped state, the rocker arm swings to the second stroke end, and the rocker arm drives the jump buckle through the reset structure to rotate to be in latching fit with the latch; and meanwhile, the latch rotates to be in limiting fit with the re-buckle, and the operating mechanism is switched to the disconnected state.

The present invention further provides a circuit breaker, comprising the operating mechanism of the circuit breaker.

According to an operating mechanism of a circuit breaker, a first crank, a first connecting rod, slide rails and a slider form a first slider mechanism, and a contact support, a second connecting rod, the slide rails and the slider form a second slider mechanism. The dual-slider mechanism reduces the correlation between a rotation range of the contact support and rotation angles of the jump buckle and the first connecting rod, thereby achieving the purpose of increasing the opening distance of the moving contact and reducing the space requirement of the operating mechanism. Moreover, the reliable operating performance of the operating mechanism is ensured. In addition, a third crank assists in limiting the operation of the second connecting rod, and the synergy of the second connecting rod and the third crank makes the movement of the second connecting rod more precise, which is beneficial to improve the working reliability and stability of the operating mechanism.

According to another operating mechanism of the circuit breaker, a first crank, a first connecting rod, slide rails and a slider form a first slider mechanism, and a contact support, a second connecting rod, a second crank, the slide rail and the slider form a second slider mechanism. The dual-slider mechanism reduces the correlation between a rotation range of the contact support and rotation angles of the jump buckle and the first connecting rod, thereby achieving the purpose of increasing the opening distance of the moving contact and reducing the space requirement of the operating mechanism. Moreover, the reliable operating performance of the operating mechanism is ensured. Moreover, the second crank is beneficial to improve the assembling accuracy of the operating mechanism and reduce the assembling error.

The circuit breaker of the present invention includes the operating mechanism, which has a compact structure and good breaking performance.

DETAILED DESCRIPTIONS OF THE PREFERRED EMBODIMENTS

Figure 1:
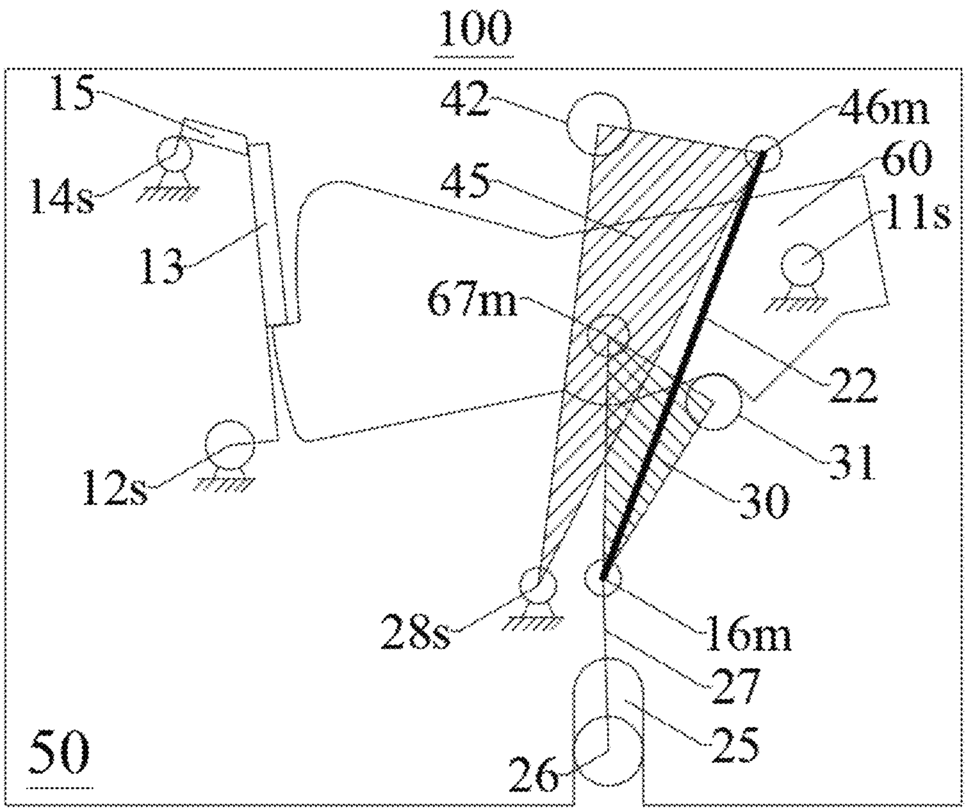
FIG. 1 is a principle schematic diagram of an operating mechanism of the present invention, in which the operating mechanism is in a closed state.

The specific implementation of the circuit breaker of the present invention will be further described below with reference to the embodiments given in FIGS. 1 to 47. The circuit breaker of the present invention is not limited to the description of the following embodiments.

As shown in FIGS. 7-16, 38-41 and 43, the circuit breaker of the present invention includes an operating mechanism 100 and at least one circuit breaker pole 300; the operating mechanism 100 includes at least one group of moving contact mechanisms. Each moving contact mechanism includes a contact support 110 pivotally arranged around a third axis 111*s* and a moving contact 9 disposed on the contact support 110 to rotate synchronously with the contact support 110; each circuit breaker pole 300 includes a static contact 18 which is in one-to-one cooperation with the moving contact mechanism to form a contact system; at least one group of contact systems is disposed in each circuit breaker pole 300; and the operating mechanism 100 actuates, so that the moving contact 9 and the static contact 18 are disconnected or closed, to implement a closing or disconnecting operation of the circuit breaker.

Further, the moving contact 9 rotates around a contact axis, and the contact axis coincides with the third axis 111*s*, or the contact axis is parallel to (but not coincident with) the third axis 111*s*. It should be pointed out that the circuit breaker of the present invention further includes a moving contact rotating shaft for supporting the rotation of the moving contact 9. An axis of the moving contact rotating shaft coincides with the third axis 111*s*, and the moving contact 9 is provided with a moving contact shaft hole 901 matched with the moving contact rotating shaft. In practical applications, a diameter of the moving contact shaft hole 901 is slightly larger than that of the moving contact rotating shaft, so as to ensure the rotation flexibility of the moving contact 9. In the case that the circuit breaker of the present invention is driven by the operating mechanism 100 to be disconnected or closed normally, the moving contact 9 acts synchronously with the contact support 110, and rotation axis lines of the moving contact 9 and the contact support 110 coincide at this time. In the case that the moving contact 9 is repelled to rotate relative to the contact support 110 in response to the occurrence of a short-circuit fault in the circuit breaker of the present invention, the inside surface of the movable contact shaft hole 901 and the moving contact rotating shaft support the moving contact 9 to rotate in a tangential manner. At this time, the rotation axis line of the moving contact 9 is parallel to the third axis 111*s*.

Figure 43:
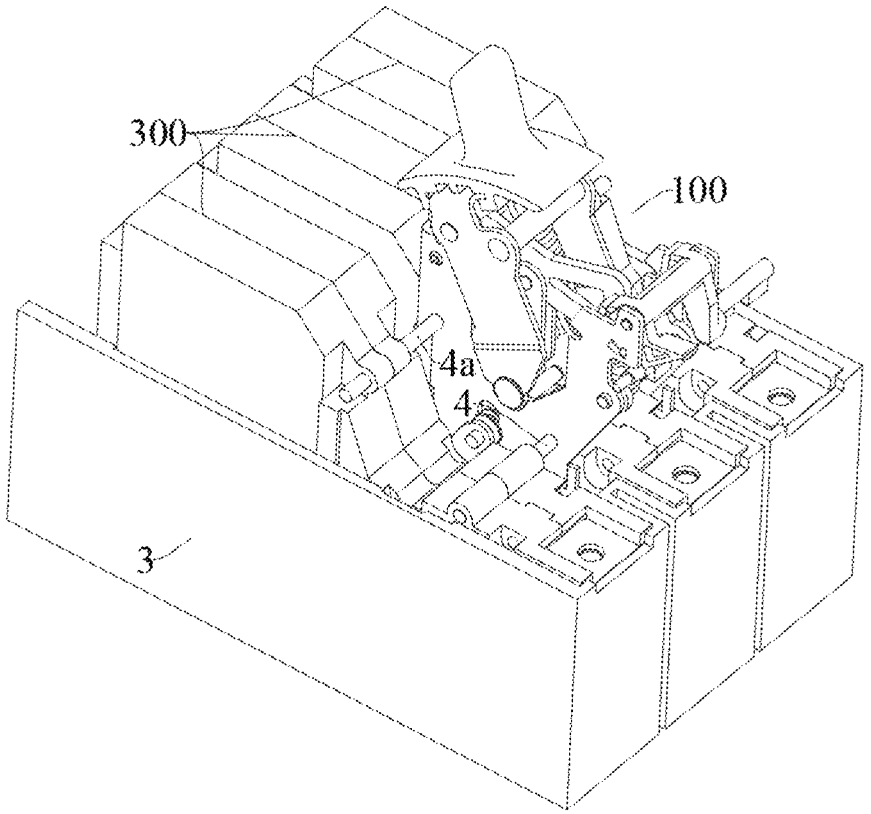
FIG. 43 is a schematic structural diagram of the circuit breaker of the present invention, in which an assembly relationship between the operating mechanism and respective circuit breaker poles is shown.

Further, as shown in FIG. 43, the circuit breaker of the present invention includes a plurality of circuit breaker poles 300 arranged side by side, and the moving contact mechanisms in the respective circuit breaker poles 300 are linked.

Figure 7:
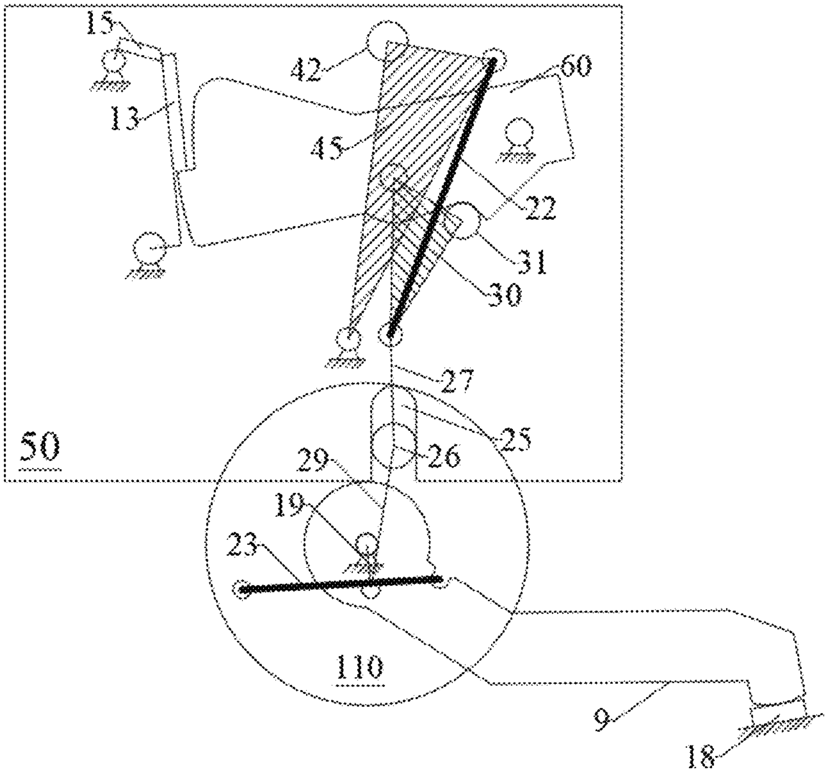
FIG. 7 is a principle schematic diagram of a circuit breaker of the present invention, in which the circuit breaker is in a closed state.
Figure 8:
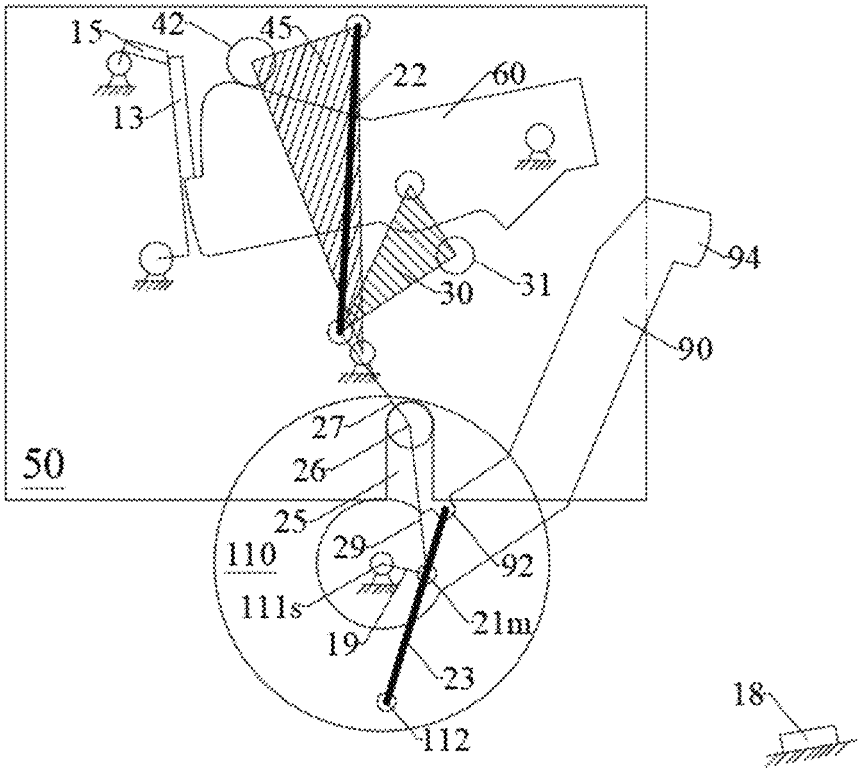
FIG. 8 is a principle schematic diagram of the circuit breaker of the present invention, in which the circuit breaker is in a disconnected state.
Figure 9:
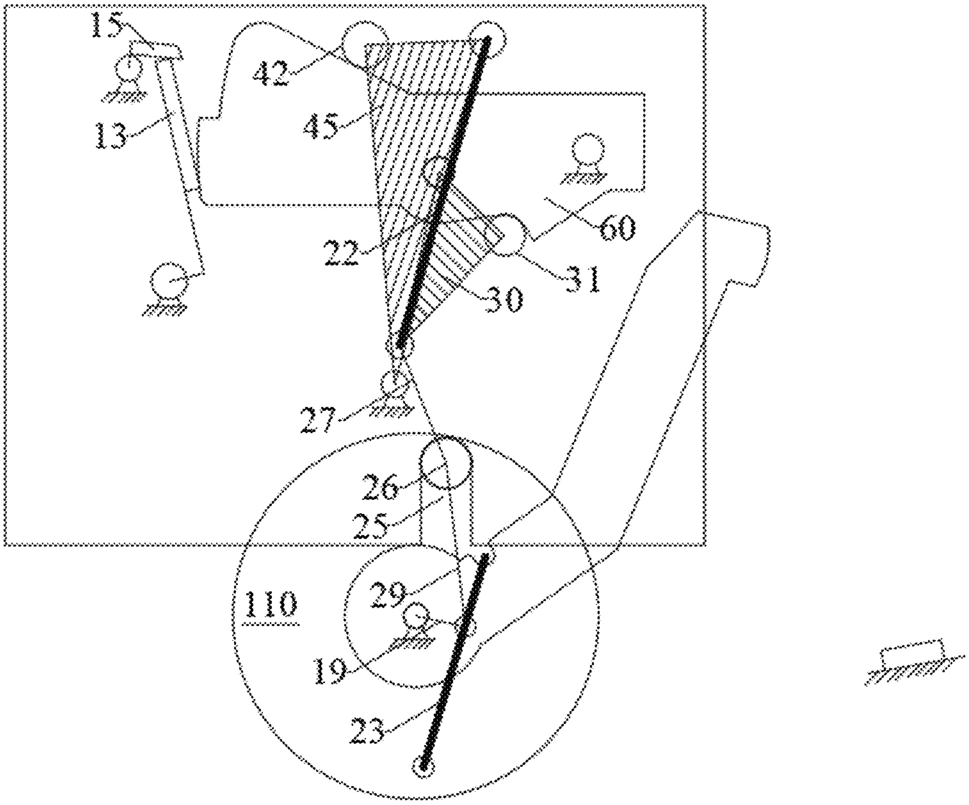
FIG. 9 is a principle schematic diagram of the circuit breaker of the present invention, in which the circuit breaker is in a tripped state.
Figure 10:
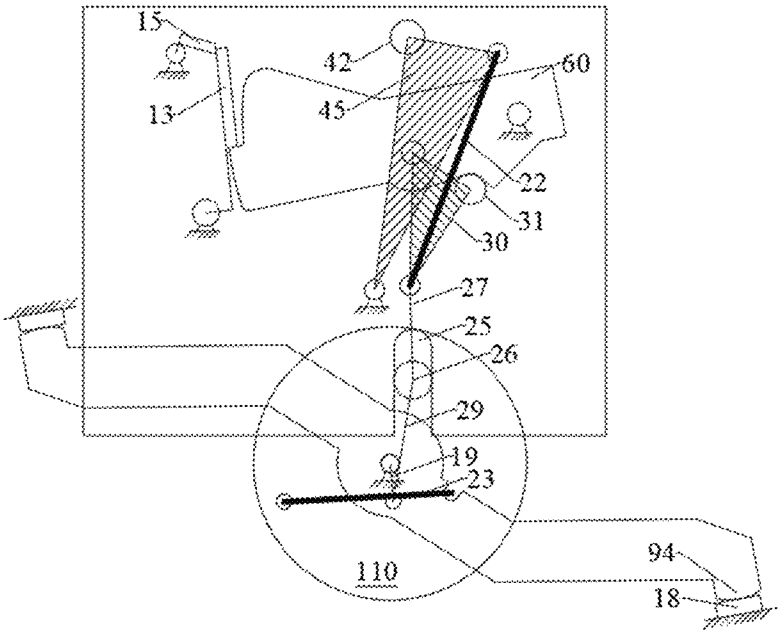
FIG. 10 is a principle schematic diagram of the circuit breaker of the present invention, in which a moving contact point is respectively disposed on two ends of a moving contact and is respectively matched with two static contacts, and the circuit breaker is in a closed state.

Further, as shown in FIGS. 7-9, the movable contact 9 is a single-breakpoint contact, wherein a moving contact point is disposed at one end of the moving contact 9, and the other end of the moving contact 9 is in driving fit with the contact support 110; or, as shown in FIG. 10, the moving contact 9 is a double-breakpoint contact, wherein a moving contact point is respectively disposed at two ends of the moving contact 9, and the middle part of the moving contact 9 is in driving fit with the contact support 110. It should be pointed out that the moving contact 9 may also include more breakpoints.

As shown in FIG. 43, the following is an implementation of a housing of the circuit breaker of the present invention:

the circuit breaker of the present invention further includes a circuit breaker housing 3, wherein the operating mechanism 100 and the respective circuit breaker poles 300 arranged side by side are disposed inside the circuit breaker housing 3 respectively; each circuit breaker pole 300 further includes a unit housing 120, and the contact system of each circuit breaker pole 300 is disposed in the corresponding unit housing 120; and the circuit breaker housing includes a circuit breaker shell 3 and the unit housing 120.

The following is another implementation of the housing of the circuit breaker of the present invention:

the circuit breaker of the present invention further includes a circuit breaker shell 3, wherein the respective circuit breaker poles 300 are arranged side by side inside the circuit breaker shell 3 at intervals, and a phase separation partition is arranged between adjacent circuit breaker poles 300 to ensure a sufficient electric clearance and creepage distance between the circuit breaker poles 300; and the circuit breaker housing includes the circuit breaker shell 3 and the phase separation partition.

The circuit breaker of the present invention will be further described below in conjunction with the accompanying drawings and specific embodiments.

As shown in FIGS. 1-16, 43 and 44, the circuit breaker in this embodiment, preferably a molded case circuit breaker, includes an operating mechanism 100 and a plurality of circuit breaker poles 300; the operating mechanism 100 includes a moving contact mechanism. The moving contact mechanism includes a contact support 110 pivotally arranged around a third axis 111*s* and a moving contact 9 disposed on the contact support 110 to rotate synchronously with the contact support 110; each circuit breaker pole 300 includes a static contact 18 which is in one-to-one cooperation with the moving contact mechanism to form a contact system; at least one group of contact systems is disposed in each circuit breaker pole 300; and the operating mechanism 100 actuates, so that the moving contact 9 and the static contact 18 are disconnected or closed, to implement a closing or disconnecting operation of the circuit breaker.

Figure 3:
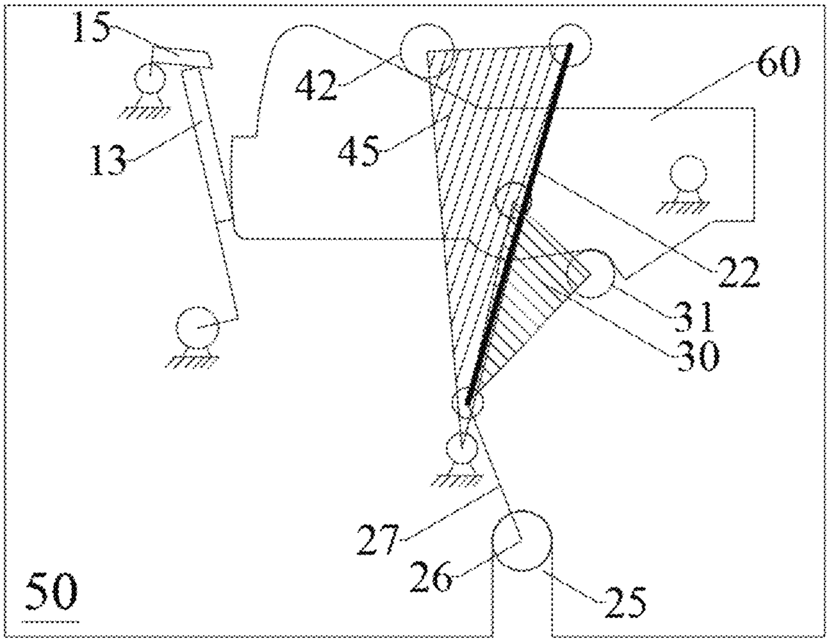
FIG. 3 is a principle schematic diagram of the operating mechanism of the present invention, in which the operating mechanism is in a tripped state.
Figure 44:
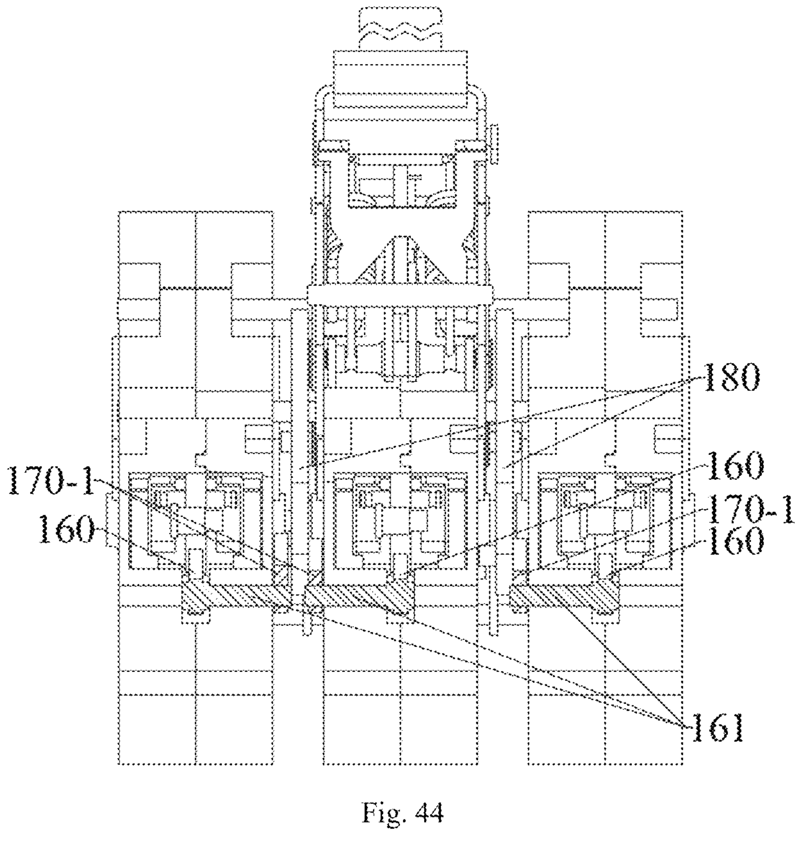
FIG. 44 is a schematic structural diagram of the circuit breaker pole of the present invention, in which a cooperative relationship between the quick tripping device of each circuit breaker pole and the operating mechanism is shown.

Specifically, as shown in FIGS. 43 and 44, the circuit breaker in this embodiment is a three-phase circuit breaker, including three circuit breaker poles 300 (respectively used for connecting or breaking a three-phase circuit of a power supply) arranged side by side; the operating mechanism 100 is mounted on the circuit breaker pole 300 located in the middle; and moving contact mechanisms of the three circuit breaker poles 300 are linked (as shown in FIG. 3, the moving contact mechanisms of the three circuit breaker poles 300 are further linked by a linkage shaft 5). Of course, the number of the circuit breaker poles 300 can be adjusted according to actual needs. For example, the number of the circuit breaker poles 300 may be 2, which are matched with a two-phase power supply; or, the number of the circuit breaker poles 300 may also be 4, which are used for a three-phase four-wire circuit; or, the number of the circuit breaker poles 300 may also be 1, which is matched with a single-phase circuit.

As shown in FIG. 43, the following is a first embodiment of the housing of the circuit breaker in this embodiment:

the circuit breaker in this embodiment further includes a circuit breaker shell 3, wherein the operating mechanism 100 and the respective circuit breaker poles 300 arranged side by side are disposed in the circuit breaker shell 3 respectively; each circuit breaker pole 300 further includes a unit housing 120, and the contact system of each circuit breaker pole 300 is disposed in the corresponding unit housing 120; the contact support 110 is pivotally disposed on the unit housing 120; and the circuit breaker housing includes the circuit breaker shell 3 and the unit housing 120.

Figure 38:
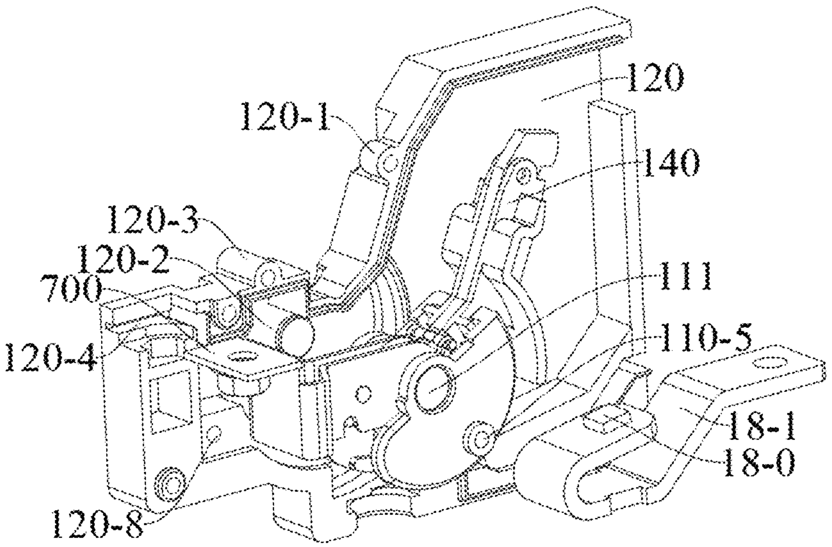
FIG. 38 is a schematic diagram of an assembly structure of the moving contact assembly, the static contact and a unit housing of the present invention.
Figure 41:
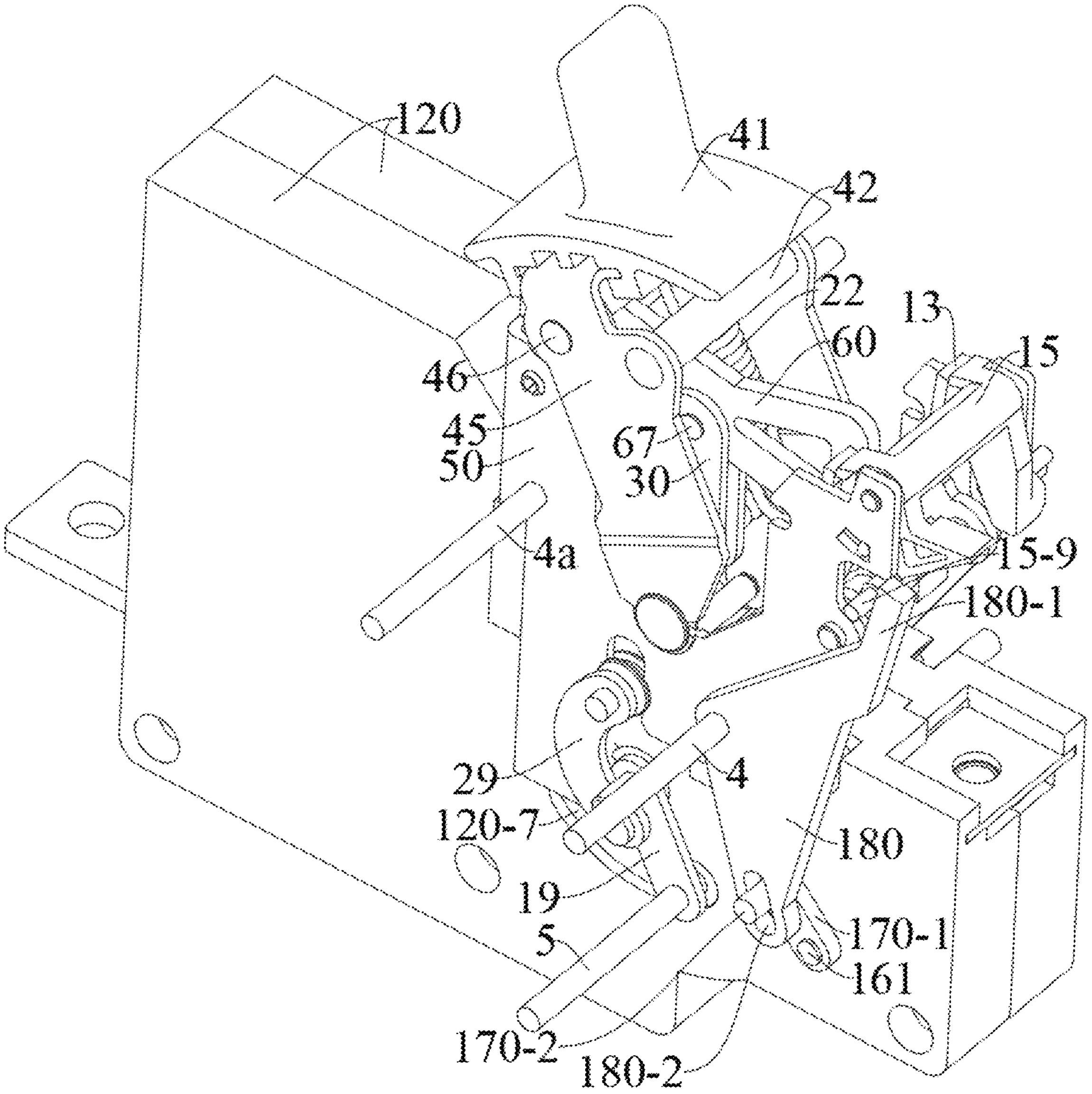
FIG. 41 is a schematic diagram of an assembly structure of the operating mechanism, a quick tripping device and the circuit breaker pole of the present invention.

Further, as shown in FIG. 38, the contact support 110 includes support shaft grooves 111 respectively formed in both sides of the contact support 110, and the unit housing 120 includes housing shaft columns 120-2 matched with the support shaft grooves 111. Further, as shown in FIGS. 38 and 41, the unit housing 120 includes two half housings that are matched with each other, and the two housing shaft columns 120-2 are respectively disposed on the inner walls of the two half housings.

The circuit breaker in this embodiment can also achieve the following technical effects: the operating mechanism 100 (except the moving contact mechanism) is integrally disposed outside the unit housing 120, and the contact system is disposed inside the unit housing 120, which, firstly, prevents electric arc particles generated by the closing/breaking of the moving contact from being deposited on the operating mechanism 100 to affect the operating performance of the operating mechanism 100; secondly, improves the insulation performance of the circuit breaker to ensure the personal safety of users; and thirdly, is beneficial to realize the modularized assembly of the operating mechanism 100.

The following is a second embodiment of the housing of the circuit breaker in this embodiment:

the circuit breaker in this embodiment further includes a circuit breaker shell 3, wherein the respective circuit breaker poles 300 are arranged side by side inside the circuit breaker shell 3 at intervals, and a phase separation partition is disposed between adjacent circuit breaker poles 300; and the circuit breaker housing includes the circuit breaker shell 3 and the phase separation partition.

The first embodiment of the operating mechanism 100 is shown in FIGS. 7-13. The operating mechanism 100 is provided with a dual-slider mechanism, which can reduce the correlation between rotation angles of the operating mechanism and the contact system, and increase an opening distance of the moving contact, without increasing a space requirement of the operating mechanism, to be specific:

as shown in FIGS. 7-13, the operating mechanism 100 includes a bracket 50, a rocker arm assembly and a jump buckle 60 pivotally disposed on the bracket 50 respectively, as well as a first crank 30, a first spring 22, a first connecting rod 27 and a contact support 110, wherein one end of the first crank 30 is pivotally disposed on the jump buckle 60 around a first axis 67*m*, and the other end of the first crank 30 is rotatably connected to one end of the first connecting rod 27; one end of the first spring 22 is connected to the rocker arm assembly, and the other end of the first spring 22 is connected to the rotating connection position of the first crank 30 and the first connecting rod 27; the operating mechanism 100 further includes slide rails 25, a slider 26 and a second connecting rod 29; the slide rails 25 are disposed on the bracket 50 or the circuit breaker housing, and the slider 26 is slidably disposed on the slide rails 25 and is rotatably connected to the other end of the first connecting rod 27; and one end of the second connecting rod 29 is rotatably connected to the slider 26, and the other end of the second connecting rod 29 is rotatably connected to the contact support 110, and the contact support 110 is driven to rotate around the third axis 111*s*. According to the operating mechanism 100, the first crank 30, the first connecting rod 27, the slide rails 25 and the slider 26 form a first slider mechanism, and the contact support 110, the second connecting rod 29, the slide rails 25 and the slider 26 form a second slider mechanism. The first slider mechanism cooperates with the second slider mechanism to reduce the correlation of rotation ranges of the jump buckle 60, the first connecting rod 27 and the contact support 110, thereby increasing the opening distance of the moving contact, without increasing the space requirement of the operating mechanism. Moreover, the reliable operating performance of the operating mechanism is ensured.

Figure 4:
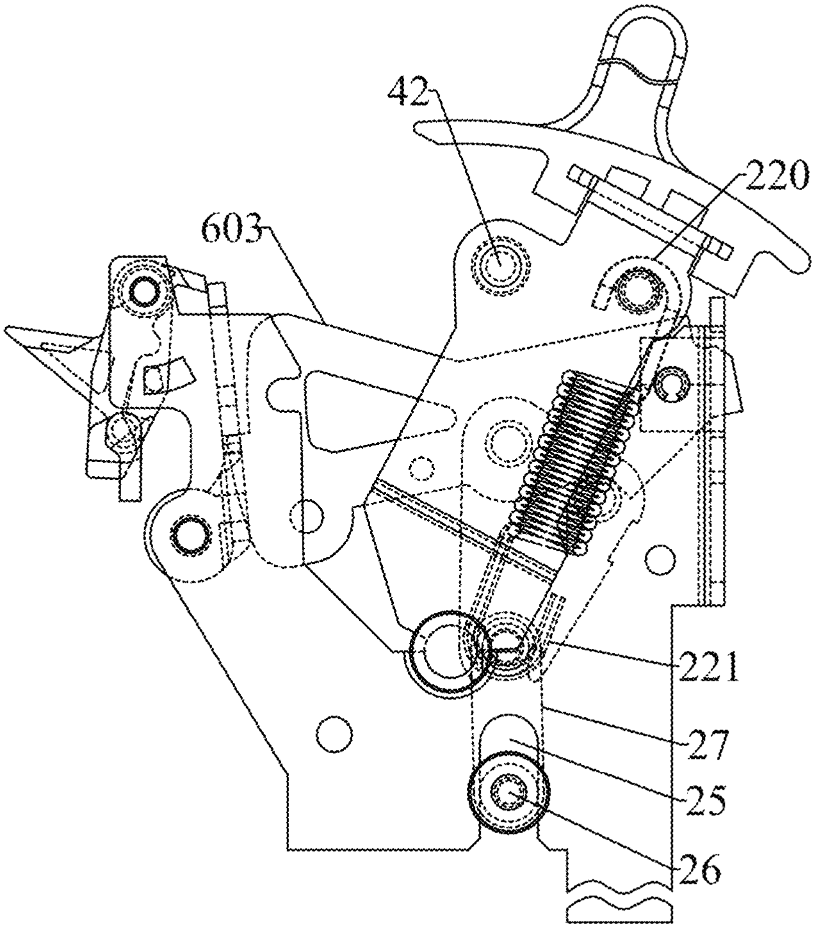
FIG. 4 is a schematic structural diagram of the operating mechanism of the present invention, in which the operating mechanism is in a closed state.
Figure 5:
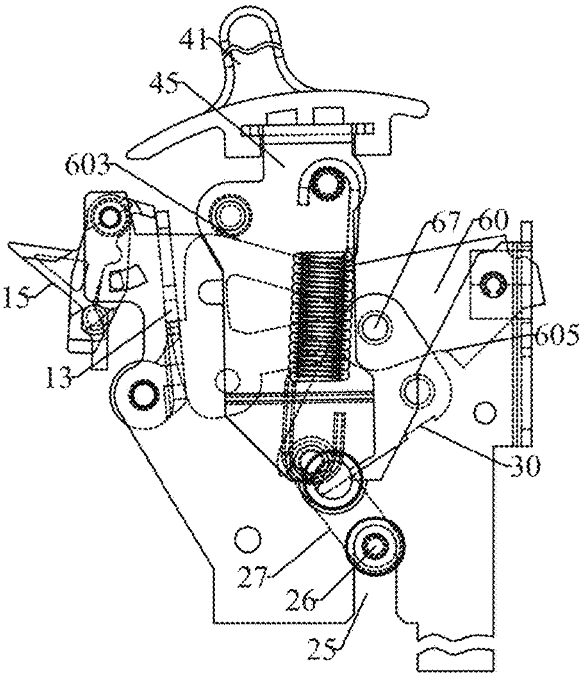
FIG. 5 is a schematic structural diagram of the operating mechanism of the present invention, in which the operating mechanism is in a disconnected state.
Figure 6:
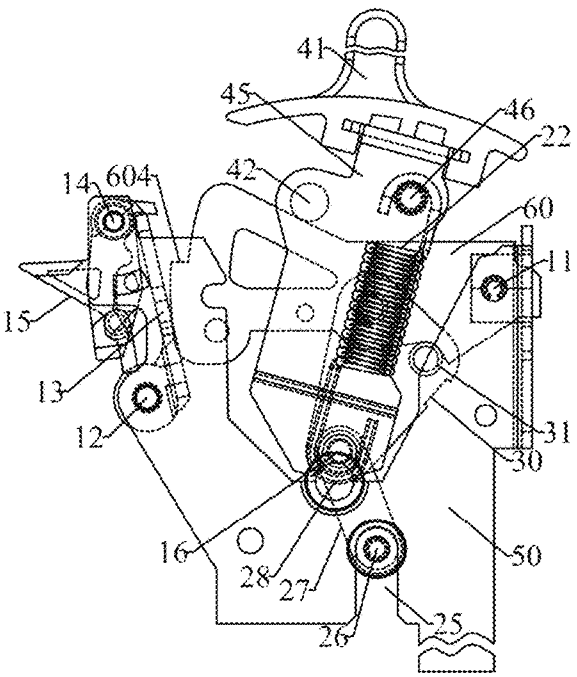
FIG. 6 is a schematic structural diagram of the operating mechanism of the present invention, in which the operating mechanism is in a tripped state.

Further, the slide rails 25 are of a groove-like structure or a hole-like structure. Further, in the case that the slide rail 25 is of the groove-like structure, the slide rail 25 may be disposed on the inside wall of the bracket 50 or the inside wall of the unit housing 120 (a phase separation partition is disposed between adjacent circuit breaker poles 300 in the case that the circuit breaker pole 300 is not provided with a unit housing 120, and the slide rail 25 is disposed on a sidewall of the phase separation partition), and the slide rail 25 does not penetrate through the bracket 50 or the unit housing 120 (or the phase separation partition) in a thickness or depth direction. Further, two ends of the slide rail 26 are respectively disposed in the two slide rails 25, and one end of the first connecting rod 27 connected to the slider 26 and one end of the second connecting rod 29 connected to the slider 26 are both disposed in a space between the two slide rails 25. In the case that the slide rail 25 is of the hole-like structure, the slide rail 25 may be disposed on the inside wall (as shown in FIGS. 4-6) of the bracket 50 or the inside wall of the unit housing 120 (a phase separation partition is disposed between adjacent circuit breaker poles 300 in the case that the circuit breaker pole 300 is not provided with a unit housing 120, and the slide rail 25 is disposed on a sidewall of the phase separation partition), and the slide rail 25 penetrates through the bracket 50 or the unit housing 120 (or the phase separation partition) in a thickness or depth direction. Further, a shown in FIGS. 16 and 22, two ends of the slider 26 pass through the two slide rails 25 respectively; one end of the first connecting rod 27, which is connected to the slider 26, is located between the two slide rails 25; and one ends of the two second connecting rods 29, which are connected to the slider 26, are located on two sides of the two slide rails 25 respectively, and rotatably connected to two ends of the slider 26 respectively.

Figure 11:
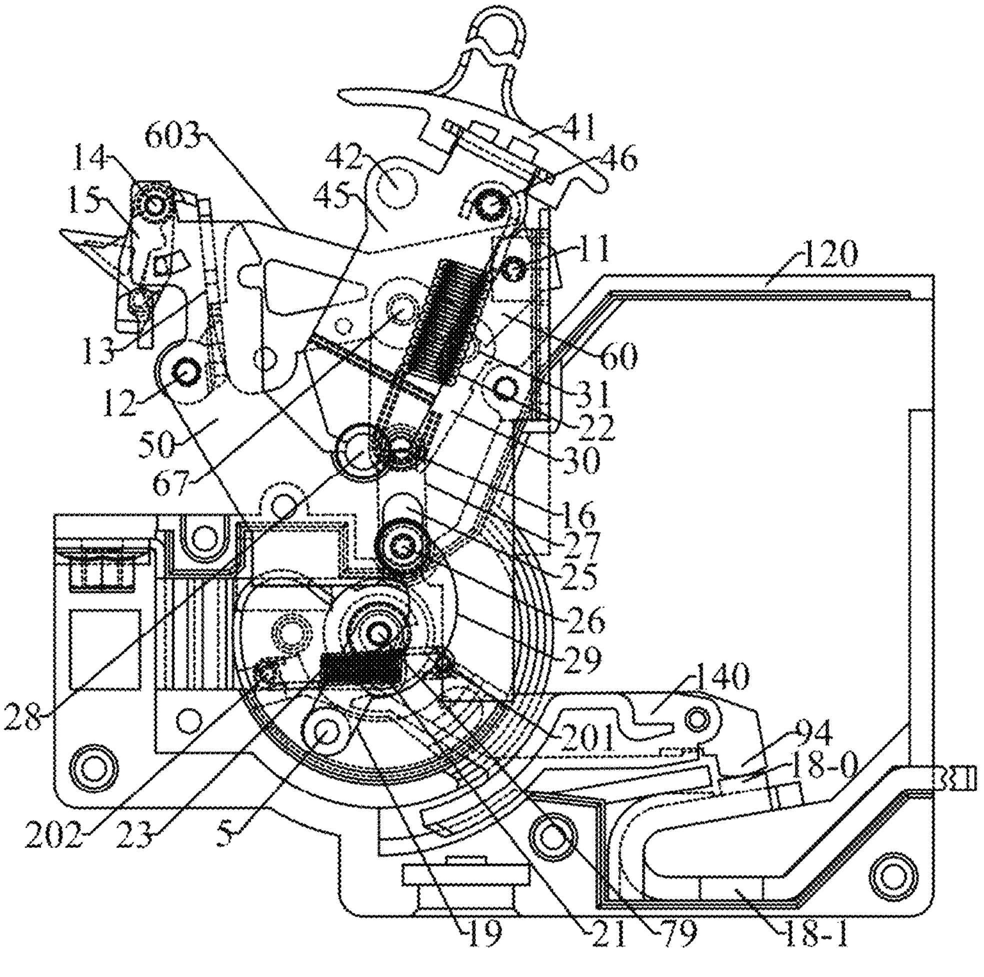
FIG. 11 is a schematic structural diagram of the circuit breaker of the present invention, in which the circuit breaker is in a closed state.
Figure 12:
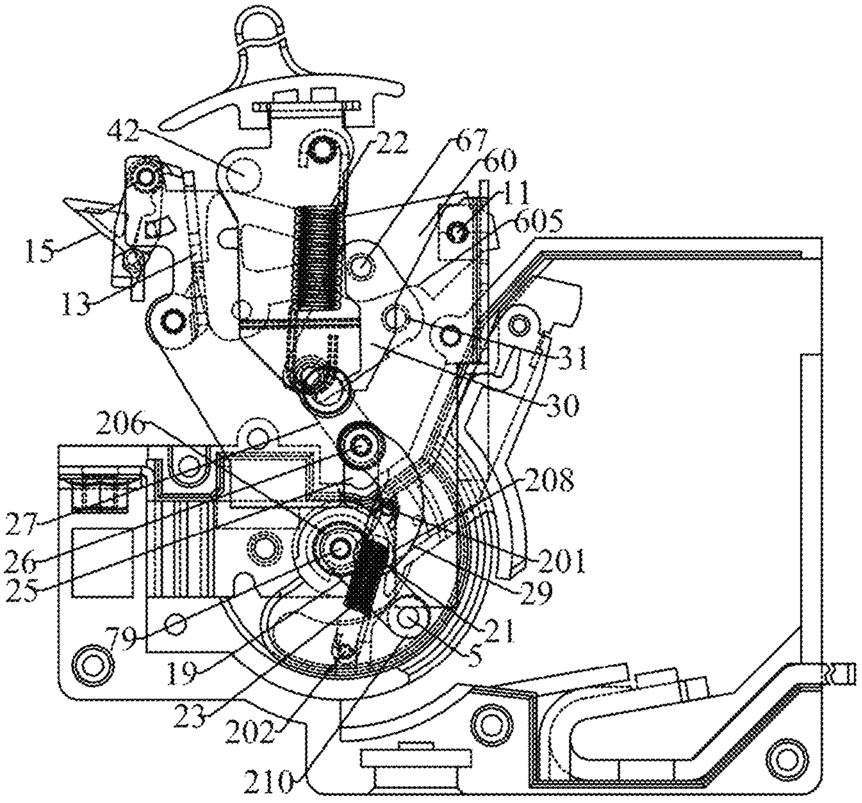
FIG. 12 is a schematic structural diagram of the circuit breaker of the present invention, in which the circuit breaker is in a disconnected state.
Figure 13:
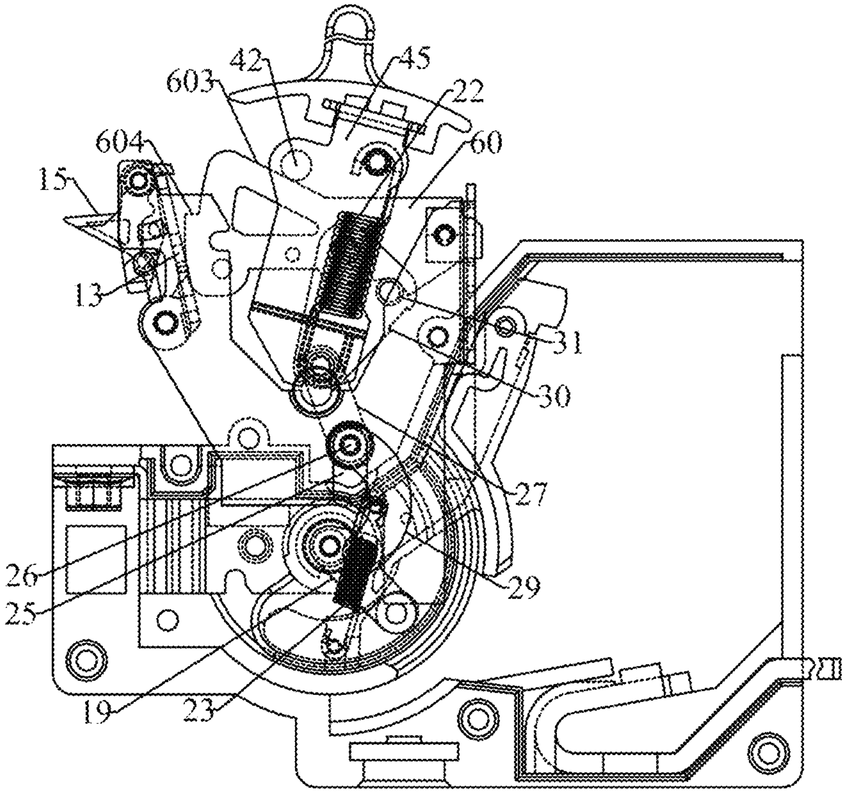
FIG. 13 is a schematic structural diagram of the circuit breaker of the present invention, in which the circuit breaker is in a tripped state.

Further, each slide rail 25 is straight, arc-shaped, triangular, or a combined shape of straight line and arc. Further, the shape of the slide rail 25 may also be adaptively set according to a current level of the circuit breaker, a design space, control requirements, and the like. As shown in FIGS. 11, 12 and 13, the slider 26 moves upward along the slide rails 25 in response to a disconnecting or tripping action of the circuit breaker; and the slider 26 moves downward along the slide rails 25 when the circuit breaker is closed. A trajectory of upward movement and a trajectory of downward movement are coincident, which, in this case, may be set to be straight, arc-shaped, or a combined shape of straight line and arc. For example, the slide rail 25 is set in a triangular shape or other shapes. In the case that the slide rail is set as a triangle, a movement trajectory of the slider 26 along the slide rails 25 is upward along one side of the triangle when the circuit breaker is disconnected or tripped; the movement trajectory of the slider 26 along the slide rails 25 is downward along the other side of the triangle, but the downward and upward movement trajectories are not coincident (not shown); the slider 26 forms a closed-shaped movement trajectory along the slide rails 25.

As shown in FIGS. 11-13, 23 and 46, an embodiment of the slide rails 25 and the slider 26 is shown. The bracket 50 includes two bracket arms 501 disposed to face with other at intervals, and each bracket arm 501 is provided with a slide rail 25, and two ends of the slider 26 are respectively slidably disposed on the two slide rails 25. Further, as shown in FIGS. 7-13, 23 and 46, each slide rail 25 is a slide hole, and the slider 26 is a sliding shaft, two ends of which are respectively disposed in the two slide holes. Further, as shown in FIGS. 7-13, 23, 41 and 46, each slide rail 25 is a straight hole, the slider 26 is a sliding shaft disposed in the straight hole, and two ends of the sliding shaft are provided with sliding shaft grooves which are in limiting fit with the sidewall of the straight hole.

Figure 47:
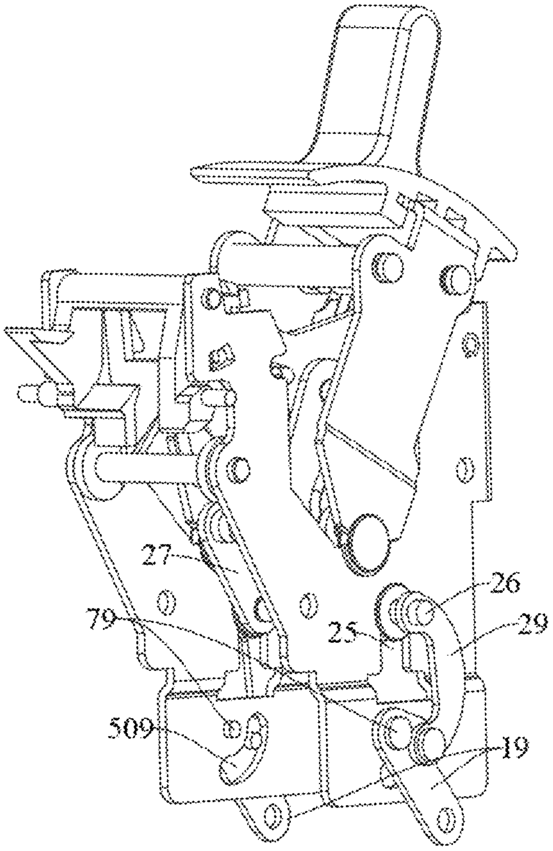
FIG. 47 is a schematic structural diagram of the operating mechanism of the present invention, in which one end of the first crank is pivotally disposed on the bracket.

Further, as shown in FIG. 11, the other end of the second connecting rod 29 is rotatably connected to the contact support 110 directly through a first connecting shaft 21. Further, as shown in FIG. 47, the bracket 50 further includes a second avoidance hole 509 for the first connecting shaft 21 to pass through for avoiding the first connecting shaft 21. Further, as shown in FIG. 47, the second avoidance hole 509 is an arc-shaped hole, which is matched with a movement trajectory of the first connecting shaft 21.

Further, as shown in FIG. 41, the operating mechanism 100 includes a plurality of contact supports 110 arranged side by side at intervals, and the respective contact supports 110 are linked by means of a linkage shaft 5; and the housing of the circuit breaker is provided with a first avoidance hole 120-7 for the linkage shaft 5 to pass through for avoiding the linkage shaft 5. Further, as shown in FIG. 41, the first avoidance hole 120-7 is an arc-shaped hole, which is matched with a movement trajectory of the linkage shaft 5. Further, as shown in FIG. 41, the housing of the circuit breaker includes a unit housing 120, in which the first avoidance hole 120-7 is formed; or in the case that the housing of the circuit breaker is provided with a phase separation partition, the first avoidance hole is formed in the phase separation partition.

Further, as shown in FIGS. 1-13, the operating mechanism 100 further includes a latch 13 and a re-buckle 15 pivotally disposed on the bracket 50 respectively, wherein a jump buckle 60 is in latching fit with the latch 13, and the latch 13 is in limiting fit with the re-buckle 15. Specifically, as shown in FIGS. 1-6 and 25, the jump buckle 60 is provided with a jump buckle hasping surface 604 at one end, and the latch 13 is provided with a latch hasping surface, wherein the jump buckle hasping surface 604 is located below the latch hasping surface and is in limiting fit with the latch hasping surface to realize latching fit of the jump buckle 60 and the latch 13. As shown in FIGS. 1-6, one end of the re-buckle 15 is located on one side of the latch 13 and limiting fit with the latch 13; the re-buckle 15 releases the limiting fit from the latch 13 while the re-buckle 15 is driven to rotate; and the latch 13 rotates and releases the limiting fit of the jump buckle hasping surface 604 and the latch hasping surface so that the latch 13 releases the latching fit from the jump buckle 60. Further, the circuit breaker of the present invention further includes an overload and short-circuit protection mechanism. The overload and short-circuit protection mechanism will drive the re-buckle 15 to rotate while a short-circuit or overload fault occurs in the circuit breaker, so that the re-buckle 15 releases the limiting fit from the latch 13. Further, the short-circuit and overload protection mechanism includes a short-circuit protection mechanism and an overload protection mechanism, wherein the short-circuit protection mechanism is preferably an electromagnetic trip, and the overload protection mechanism is preferably a thermal tripping mechanism (e.g., the overload protection mechanism includes a bimetal sheet). It should be pointed out that the cooperation between the latch 13 and the jump buckle 60, the cooperation between the latch 13 and the re-buckle 15, and the cooperation between the re-buckle 15 and the short-circuit and overload protection mechanism may all be realized by the prior art, which will not be expanded in detail.

Further, as shown in FIGS. 1-13, the rocker arm assembly includes a synchronously acting handle 41, a rocker arm 45 fixedly connected to the handle 41, and a reset structure 42 for driving the jump buckle 60 to rotate to re-buckle with the latch 13, wherein the rocker arm 45 is pivotally disposed on the bracket 50, and two ends of a swing stroke of the rocker arm 45 on the rocker arm assembly are in limiting fit with the bracket 50, respectively. Further, as shown in FIGS. 4-6, and 11-16, the reset structure 42 is a reset shaft; the jump buckle 60 is of a strip structure, wherein one end of the jump buckle 60 is in latching fit with the latch 13, and the other end of the jump buckle 60 is pivotally disposed on the bracket 50; and the jump buckle 60 includes a driving side edge 603 disposed on one side to be in driving fit with the reset structure 42. Specifically, in the direction shown in FIGS. 4-6 and 11-16, the driving side edge 603 is disposed at the upper side edge of the jump buckle 60.

Further, as shown in FIGS. 1-13, the first crank 30 includes a crank limiting portion 31. The crank limiting portion 31 is in limiting fit with the jump buckle 60 in the case that the circuit breaker is in a closed state or tripped state. Further, as shown in FIGS. 4-6, and 11-16, the crank limiting portion 31 is a limiting shaft, and is in limiting fit with the jump buckle 60 to prevent the first crank 30 from rotating. Further, as shown in FIGS. 4-6 and 11-16, the jump buckle 60 includes a limiting side edge 608 disposed at one side edge to cooperate with the crank limiting portion 31, and the limiting side edge 608 is an arc-shaped side edge. Specifically, as shown in FIGS. 4-6 and 11-16, the limiting side edge 608 is disposed at the lower side edge of the jump buckle 60.

Further, as shown in FIGS. 1-13, the first connecting rod 27 and the first crank 30 are rotatably connected around a second axis 16*m*; one end of the first spring 22 is rotatably connected to the second axis 16*m*, and the other end of the first spring 22 is rotatably disposed on the rocker arm assembly around a fourth axis 46*m*. Further, as shown in FIGS. 1-13, the first crank 30 and the first connecting rod 27 are rotatably connected by a second spring shaft 16, one end of the first spring 22 is connected to the second spring shaft 16, and the other end of the first spring 22 is connected to the rocker arm 45 through the first spring shaft 46.

Figure 2:
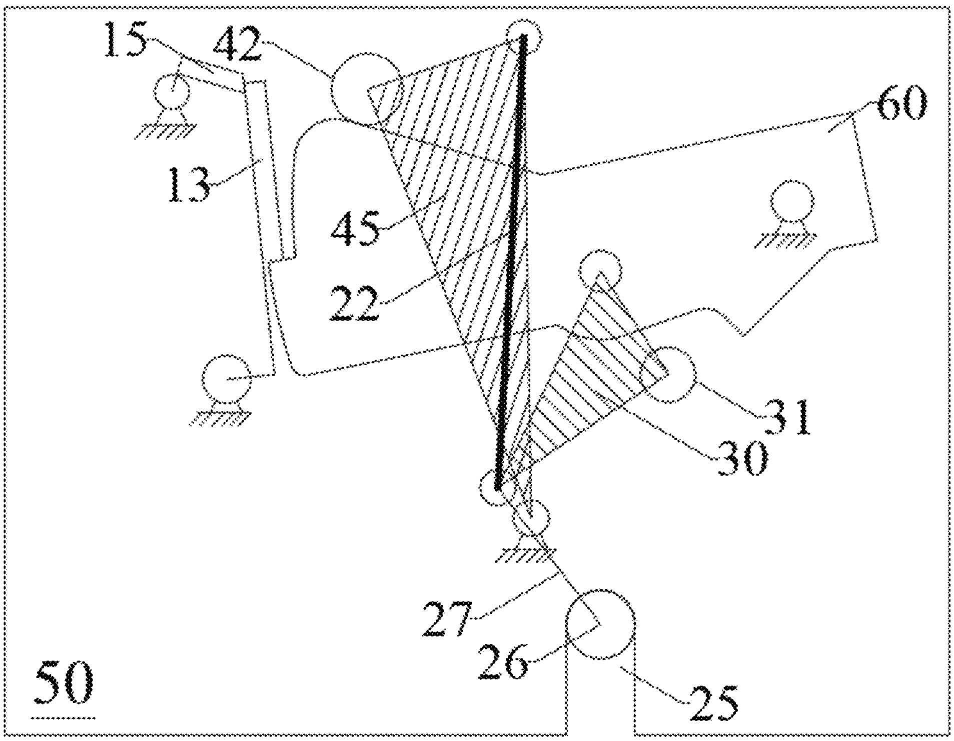
FIG. 2 is a principle schematic diagram of the operating mechanism of the present invention, in which the operating mechanism is in a disconnected state.
Figure 22:
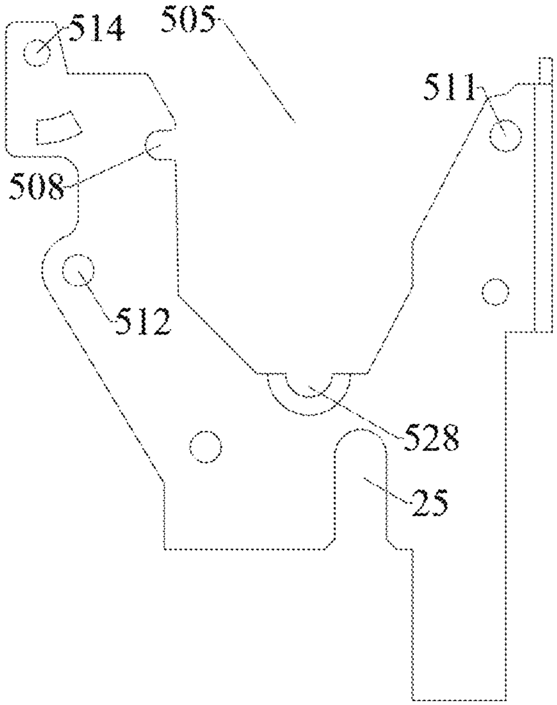
FIG. 22 is a schematic projection view of a bracket of the present invention, in which at least a V-shaped groove is shown.
Figure 25:
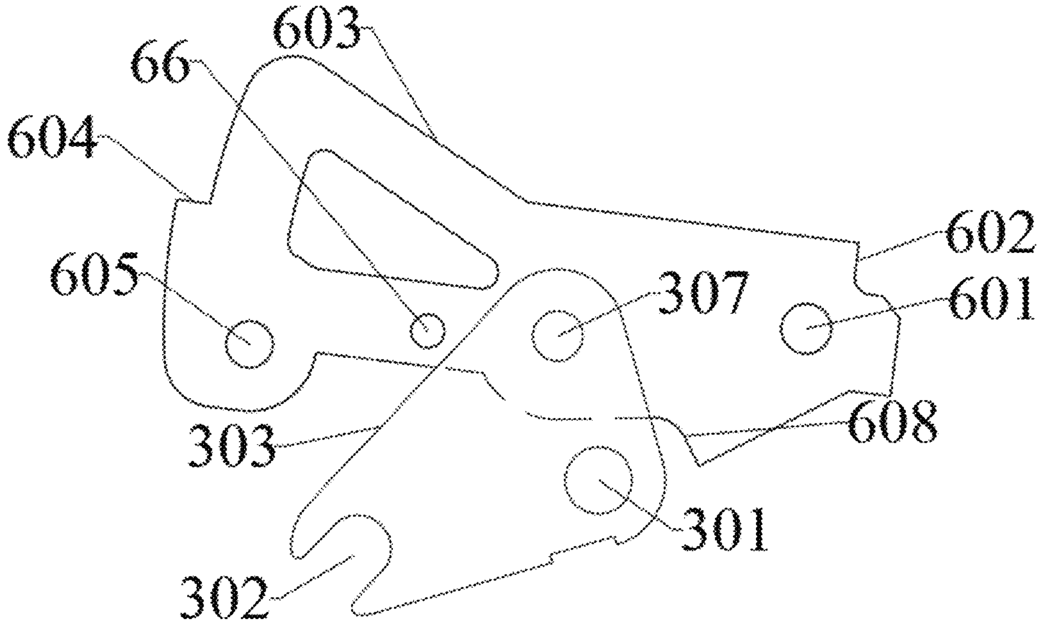
FIG. 25 is a schematic diagram of the connection of the jump buckle and the first crank of the present invention.

Further, as shown in FIGS. 1-3, the jump buckle 60 is pivotally disposed on the bracket 50 around a fifth axis 11*s*; the re-buckle 15 is pivotally disposed on the bracket 50 around a sixth axis 14*s*; the latch 13 is pivotally disposed on the bracket 50 around a seventh axis 12*s*; the rocker arm 45 is pivotally disposed on the bracket 50 around an eighth axis 28*s*; and one end of the first spring 22 is pivotally disposed on the rocker arm 45 around a fourth axis 46. Further, as shown in FIGS. 4-6, the jump buckle 60 is pivotally disposed on the bracket 50 through a jump buckle shaft 11; the re-buckle 15 is pivotally disposed on the bracket 50 through a re-buckle shaft 14; the latch 13 is pivotally disposed on the bracket 50 through a latch shaft 12; the rocker arm 45 is pivotally disposed on the bracket 50 through a rocker arm shaft 28; two ends of the first spring 22 are rotatably connected to the rocker arm 45 and the first crank 30 through the first spring shaft 46 and the second spring shaft 16 respectively; the first spring shaft 46 and the second spring shaft 16 are respectively located on two sides of the jump buckle 60, and the first crank 30 is pivotally disposed on the jump buckle 60 through a first crank shaft 67; and one end of the first connecting rod 27 is rotatably connected to the first crank 30 through the second spring shaft 16, and the other end of the first connecting rod 27 is rotatably connected to the slider 26. Further, as shown in FIG. 22, each bracket arm 501 of the bracket 50 is provided with a bracket jump buckle shaft hole 511, a bracket-re-buckle shaft hole 514, a bracket-latch shaft hole 512 and a bracket-rocker arm shaft groove 528 which cooperate with the jump buckle shaft 11, the re-buckle shaft 14, the latch shaft 12 and the rocker arm shaft 28, respectively. As shown in FIG. 25, the jump buckle 60 includes a jump buckle shaft hole 601 disposed in one end thereof, the first crank 30 is provided with a crank shaft hole 307 that cooperates with the first crank shaft 67, and a jump buckle-crank shaft hole that cooperates with the first crank shaft 67 is formed in the middle of the jump buckle 60.

Figure 26:
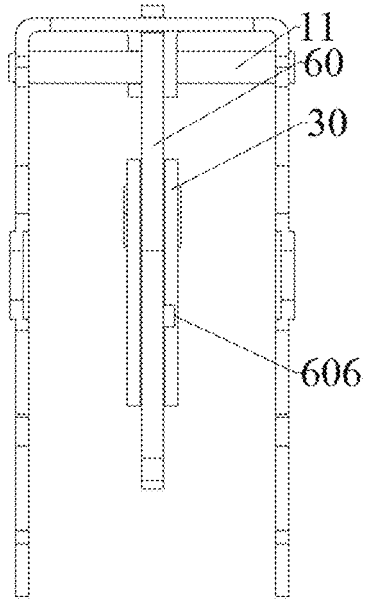
FIG. 26 is a schematic diagram of an assembly structure of the bracket, the jump buckle and a jump buckle shaft of the present invention.

Further, as shown in FIGS. 4-6, 11-16, and 25, an embodiment of the first crank 30 is shown: the first crank 30 is of a triangular structure, in which one vertex is pivotally disposed on the jump buckle 60 around the first axis 67*m*, another vertex is rotatably connected to the first spring 22 and the first connecting rod 27 around the second axis 16*m* respectively, and the third vertex is provided with a crank limiting portion 31. Further, as shown in FIG. 26, two first cranks 30 are respectively disposed on two sides of the jump buckle 60, and the three vertices of the two first cranks 30 are connected to the crank limiting portion 31 respectively through the first crank shaft 67, the second spring shaft 16 and the crank limiting portion 31. Further, as shown in FIG. 25, the first crank 30 includes a crank shaft hole 307, a limiting shaft hole 301, and a crank-spring shaft groove 302 which cooperate with the first crank shaft 67, the crank limiting portion 31 and the second spring shaft 16 respectively, and the crank shaft hole 307, the limiting shaft hole 301 and the crank-spring shaft groove 302 are located in three vertices of the first crank 30 respectively.

Figure 23:
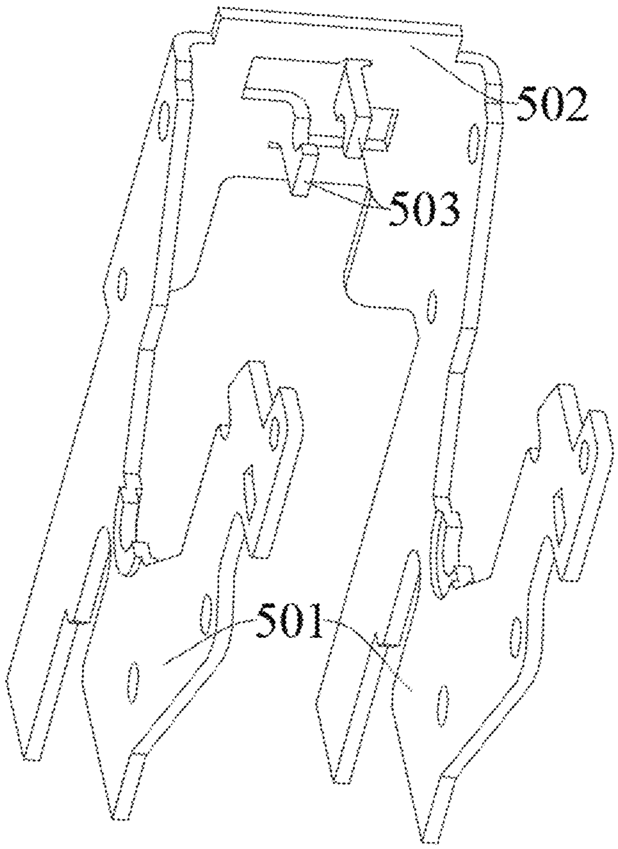
FIG. 23 is a stereoscopic structural diagram of the bracket of the present invention.
Figure 27:
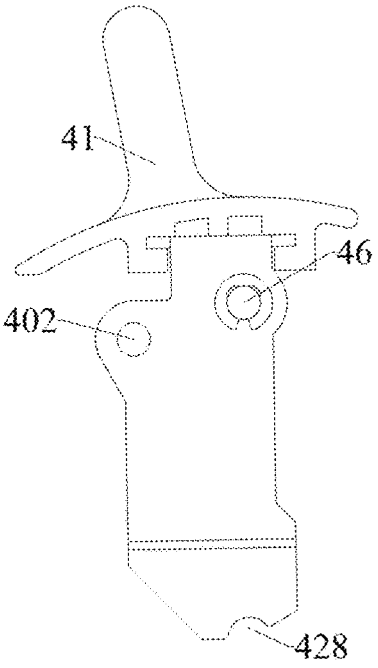
FIG. 27 is a schematic structural diagram of a rocker arm assembly of the present invention.
Figure 28:
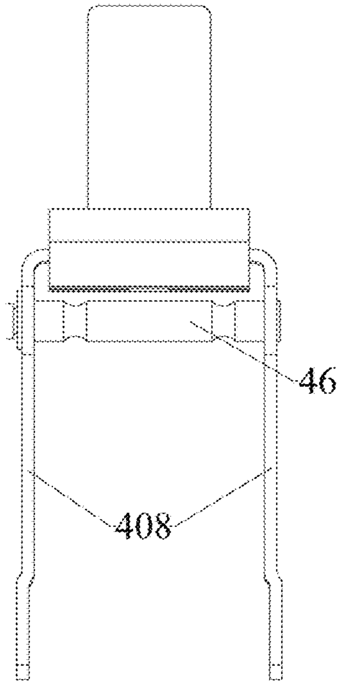
FIG. 28 is a schematic structural diagram from another perspective of the rocker arm assembly of the present invention.

Further, as shown in FIGS. 4-6 and 11-16, the bracket 50 includes a V-shaped groove 505, wherein the rocker arm 45 is in limiting fit with two sidewalls of the V-shaped groove 505 at the first stroke end and the second stroke end respectively. Further, as shown in FIGS. 22 and 23, the bracket 50 comprises two bracket arms 501 disposed to face each other at intervals and a bracket connecting plate 502, wherein two ends of the bracket connecting plate 502 are respectively connected to the two bracket arms 501 by bending, so that the bracket 50 is integrally of a U-shaped structure, and each support arm 501 is provided with a V-shaped groove 505. As shown in FIGS. 27 and 28, the rocker arm 45 includes a pair of rocker arm legs 408 disposed to face each other at intervals, which are respectively disposed in two V-shaped grooves 505 and are rotatably connected to the two bracket arms 501 respectively.

Specifically, as shown in FIGS. 4-6 and 11-16, the lower end of each rocker arm leg 408 is pivotally disposed at the bottom of the V-shaped groove 505 through the rocker arm shaft 2; and at the first stroke end and the second stroke end of the rocker arm, and the rocker arm legs 408 are in limiting fit with a right sidewall and a left sidewall of the V-shaped groove, respectively. Further, as shown in FIG. 22, a bracket-rocker arm shaft groove 528 which cooperates with the rocker arm shaft 28 is formed in the bottom of the V-shaped groove 505. As shown in FIG. 27, a rocker arm shaft groove 428 which cooperates with the rocker arm shaft 28 and oppositely cooperates with the bracket-rocker arm shaft groove 528 is formed in one end of the rocker arm leg 408.

The following is a process of switching the operating mechanism 100 in the first embodiment among a disconnected state, a closed state and a tripped state, and the details are as follows:

as shown in FIGS. 7-13, two ends of the swing stroke of the rocker arm 45 are the first stroke end and the second stroke end respectively; and two ends of the first spring 22 are the first spring end 220 and the second spring end 221 respectively, which are connected with the rocker arm assembly and the first crank 30 respectively. Specifically, as shown in FIGS. 7-13, the first stroke end and the second stroke end of the rocker arm 45 are a right end and a left end of the swing stroke of the rocker arm 45 respectively, the upper end of the first spring 22 is the first spring end 220, and the lower end of the first spring 22 is the second spring end 221.

The operation process of the operating mechanism 100 being switched from the closed state to the disconnected state will be described below in conjunction with FIGS. 7, 8, 11 and 12: as shown in FIG. 7 and FIG. 11, in the case that the operating mechanism 100 is in a closed state, the rocker arm 45 swings toward the second stroke end and drives the first spring end 220 to rotate around the second spring end 221, until the first spring 22 passes a first dead center position; the first spring 22 drives the first crank 30 to rotate in a second direction and drives the rocker arm 45 to swing to the second stroke end; the first crank 30 drives the slider 26 through the first connecting rod 27 to slide along the slide rails 25; and the slider 26 drives the contact support 110 through the second connecting rod 29 to rotate in the first direction to a breaking position (the moving contact 9 and the static contact 18 are in a disconnected state while the contact support 110 is located in the breaking position), so that the operating mechanism is switched to a disconnected state shown in FIG. 8 and FIG. 12. Specifically, as shown in FIGS. 7, 8, 11 and 12, in the case that the operating mechanism 100 is switched from a closing position to a disconnecting position, the slider 26 moves upward along the slide rails 25, the first direction is counterclockwise, and the second direction is clockwise. When the first spring 22 is located at the first dead center position, the energy storage of the first spring 22 reaches a maximum value, the first axis 67*m* is located on a first axis line, and the first axis 22 passes the first axis 67*m* while the first spring 22 passes the first dead center position around the second spring end 221. Therefore, the first axis 67*m* may also be regarded as the first dead center position, that is to say, the first axis line passes the first axis 67*m*, i.e., the first spring 22 passes the first dead point position. It should be pointed out that, as shown in FIG. 12, the contact support 110 and/or the moving contact 9 are limited by the unit housing 120 while the operating mechanism 100 is in the disconnected state, so that the contact support 110 cannot continue to rotate in the first direction, and the contact support 110 forms limiting for the slider 26 through the second connecting rod 29 at the same time, thereby preventing the slider 26 from sliding upward along the slide rails 25.

The operation process of the operating mechanism 100 being switched from the disconnected state to the closed state will be described below in conjunction with FIGS. 7, 8, 11 and 12: as shown in FIG. 8 and FIG. 12, in the case that the operating mechanism 100 is in the disconnected state, the rocker arm 45 swings toward the first stroke end and drives the first spring end 220 to rotate around the second spring end 221, until the first spring 22 passes the first dead center position; the first spring 22 drives the first crank 30 to rotate in the first direction, such that the crank limiting portion 31 is in limiting fit with the jump buckle 60, thereby preventing the first crank 30 from rotating in the first direction; meanwhile, the first spring 22 drives the rocker arm 45 to swing to the first stroke end, and the first crank 30 drives the slider 26 through the first connecting rod 27 to slide along the slide rails 25; and the slider 26 drives the contact support 110 through the second connecting rod 29 to rotate in the second direction to the closing position (the moving contact 9 and the static contact 18 are in a closed state while the contact support 110 is located in the closing position), so that the operating mechanism is switched to the closed state; and the first direction and the second direction are opposite to each other. Specifically, as shown in FIGS. 7, 8, 11 and 12, the slider 26 moves downward along the slide rails 25 while the operating mechanism 100 is switched from the disconnected state to the closed state. It should be pointed out that, as shown in FIG. 7, the moving contact 9 and the static contact 18 are closed while the operating mechanism 100 is in the closed state, so that the contact support 110 cannot continues to rotate in the second direction, and the contact support 110 forms limiting for the slider 26 through the second connecting rod 29 at the same time, thereby preventing the slider 26 from sliding downward along the slide rails 25.

The operation process of the operating mechanism 100 being switched from the closed state to the tripped state will be described below in conjunction with FIGS. 7, 9, 11 and 13: as shown in FIG. 7 and FIG. 11, in the case that the operating mechanism 100 is in the closed state, the re-buckle 15 rotates to release the limiting fit from the latch 13, and the latch 13 rotates to release the latching fit from the jump buckle 60; the jump buckle 60 rotates and drives the first crank 30 to rotate synchronously, the first crank 30 drives the slider 26 through the first connecting rod 27 to slide along the slide rails 25, and meanwhile, the slider 26 drives the contact support 110 through the second connecting rod 29 to rotate in the second direction to a breaking position; and the first spring 22 drives the rocker arm 45 to swing toward the second stroke end to the reset structure 42 to be in limiting fit with the jump buckle 60, and the operating mechanism is switched to the tripped state as shown in FIG. 9 and FIG. 13. Specifically, as shown in FIGS. 7, 9, 11 and 13, the slider 26 moves upward along the slide rails 25 while the operating mechanism 100 is switched from the closed state to the tripped state. It should be pointed out that, as shown in FIG. 13, the contact support 110 and/or the moving contact 9 are limited by the unit housing 120 while the operating mechanism 100 is in the tripped state, so that the contact support 110 cannot continue to rotate in the first direction, and the contact support 110 forms limiting for the slider 26 through the second connecting rod 29 at the same time, thereby preventing the slider 26 from sliding upward along the slide rails 25.

The operation process of the operating mechanism 100 being switched from the tripped state to the disconnected state will be described below in conjunction with FIGS. 8, 9, 11 and 13: as shown in FIG. 9 and FIG. 13, in the case that the operating mechanism 100 is in the tripped state, the rocker arm 45 swings to the second stroke end, and the rocker arm 45 drives the jump buckle 60 through the reset structure 42 to rotate to be in latching fit with the latch 13; and meanwhile, the latch 13 rotates to be in limiting fit with the re-buckle 15, and the operating mechanism is switched to the disconnected state shown in FIG. 8 and FIG. 11.

The following is a second embodiment of the operating mechanism 100, to be specific: the operating mechanism 100 of the second embodiment differs from the operating mechanism 100 of the first embodiment in that: the operating mechanism 100 in the second embodiment further includes an auxiliary limiting structure, wherein one end of the auxiliary limiting structure is rotatably connected to the second connecting rod 29, and the other end of the auxiliary limiting structure is rotatably connected to the bracket 50 or a housing of the circuit breaker. The auxiliary limiting structure cooperates with the movement of the slider 26 to affect a movement state of the second connecting rod 29, thereby jointly defining a movement trajectory of the rotating connection position of the second connecting rod 29 and the contact support 100.

It should be pointed out that the auxiliary limiting structure is rotatably connected to one end of the bracket 50 or the housing of the circuit breaker, or may also be configured to reciprocate along a predetermined trajectory, for example, this end is slidably disposed in a track. Further, in the case that one end of the auxiliary limiting structure is connected to the housing of the circuit breaker, this end may be connected to the circuit breaker shell 3 or the unit housing 120 (or the phase separation partition).

Figure 48:
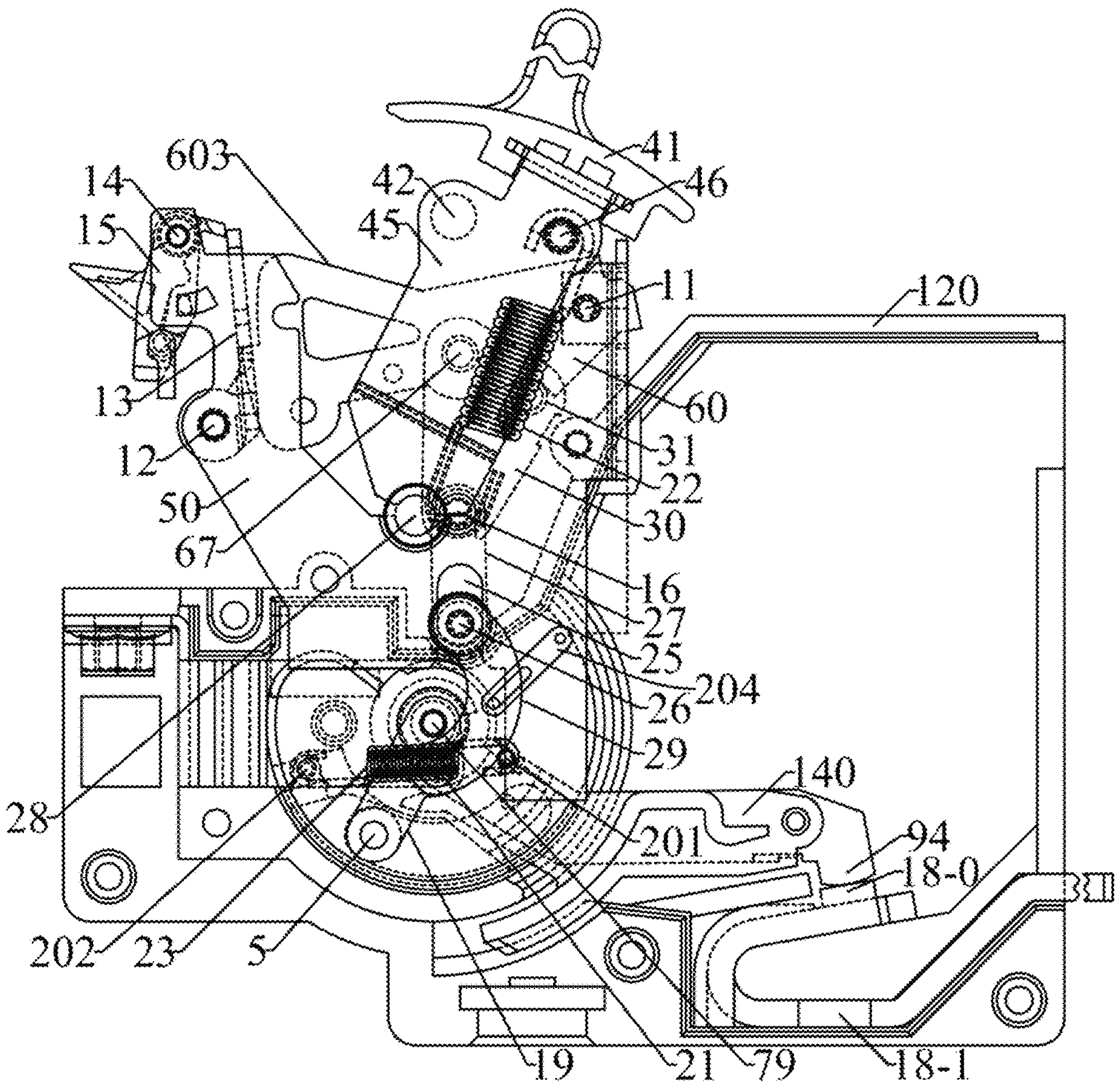
FIG. 48 is another schematic structural diagram of the circuit breaker of the present invention, in which the circuit breaker is in a closed state.
Figure 49:
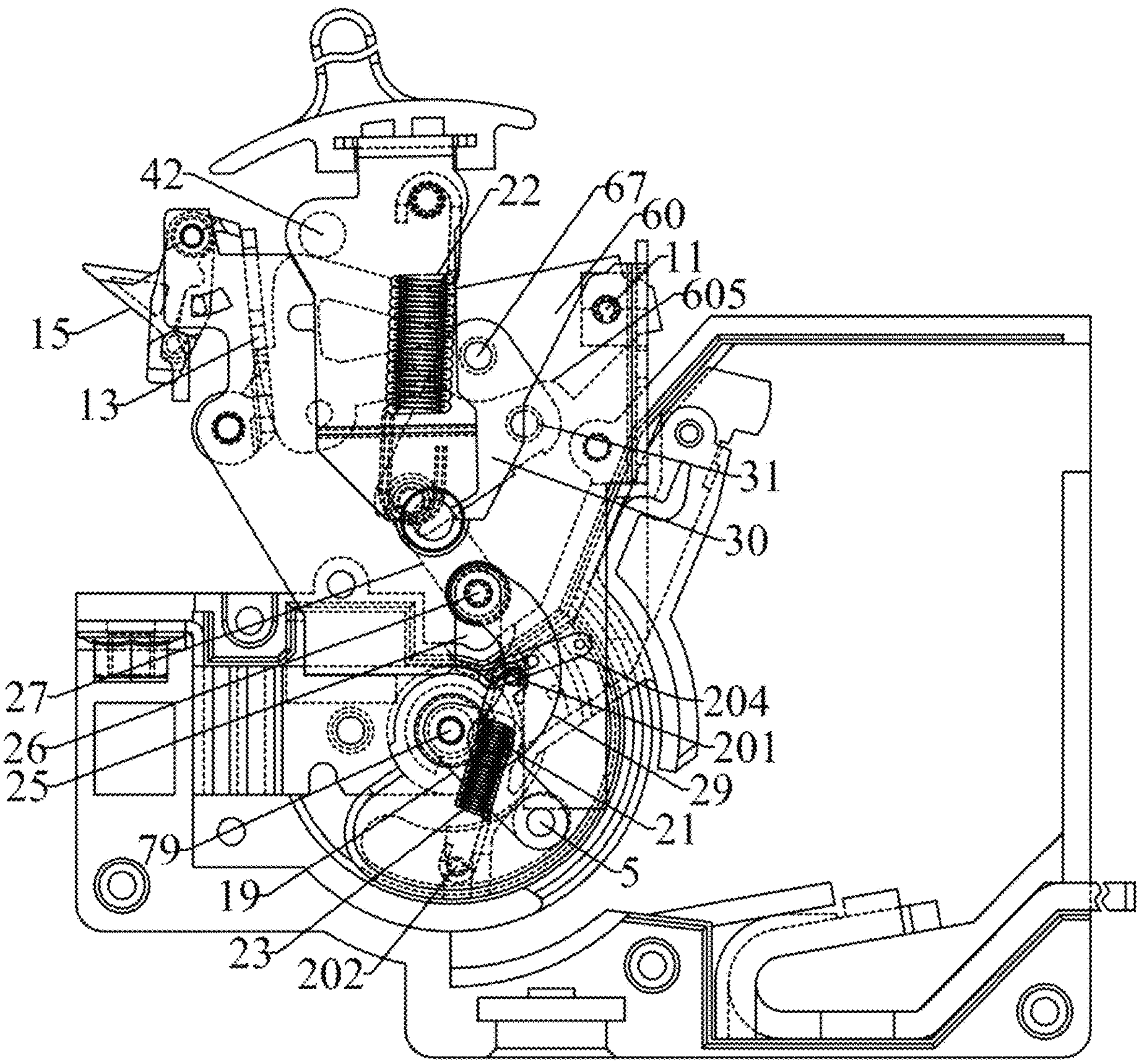
FIG. 49 is another schematic structural diagram of the circuit breaker of the present invention, in which the circuit breaker is in a disconnected state.

Further, referring to FIGS. 48 and 49, the auxiliary limiting structure is of a connecting rod structure or a crank-slider structure. Further, the auxiliary limiting structure is a third crank 204, wherein one end of the third crank 204 is rotatably connected to the second connecting rod 29, and the other end of the third crank 204 is rotatably connected to the bracket 50 or the housing of the circuit breaker. The second connecting rod 29 moves accordingly while the slider 26 slides along the slide rails 25, and at the same time, the third crank 204 rotates around a part of the third crank 204 that is rotatably disposed on the bracket 50 or the housing of the circuit breaker to assist in limiting the movement of the second connecting rod 29; and the second connecting rod 29 and the third crank 204 cooperate to make the movement of the second connecting rod 29 more precise.

Further, the third crank has a straight or arc-shaped plate structure.

As shown in FIG. 7-13 and FIG. 47, a third embodiment of the operating mechanism 100 is specifically as follows:

the operating mechanism 100 of the third embodiment differs from the operating mechanism 100 of the first embodiment in that: the operating mechanism 100 further includes a second crank 19, wherein the second crank 19 includes a second crank supporting portion 206, a second crank connecting portion 208, and a second crank driving portion 210; the second crank 19 is pivotally disposed through the second crank supporting portion 206, and the second crank 19 is connected to the contact support 110 through the second crank driving portion 210; one end of the second connecting rod 29 is rotatably connected to the slider 26, and the other end of the second connecting rod 29 is rotatably connected to the second crank connecting portion 208; and the contact support 110 is driven to rotate around the third axis 111*s*. Further, the second crank 19 is pivotally disposed on the bracket 50 or the housing of the circuit breaker through the second crank supporting portion 208. Further, the rocker arm assembly can drive the first crank 30 to swing through the first spring 22, the first crank 30 drives the slider 26 through the first connecting rod 27 to slide on the slide rails 25, the slider 26 drives the second crank 19 to swing through the second connecting rod 29, the second crank 19 drives the contact support 110 to rotate, and the contact support 110 drives the moving contact 9 of the circuit breaker to rotate. The slider 26 slides on the slide rails 25, and the slider 26 drives the second crank 19 to swing through the second connecting rod 29. A distance between the third axis 111*s* and a rotation axis line (referring to a reference numeral 21 in FIGS. 11-14) at the rotating connection position of the second connecting rod 29 and the second crank 19 is much smaller than the length of the moving contact 9, so the second connecting rod 29 drives the second crank 19 to generate a small rotation, which will be proportionally enlarged into an opening distance between the moving contact and the static contact. The opening distance of the moving contact 9 can be adjusted by adjusting a connection position between the second connecting rod 29 and the second crank 19.

Specifically, in the case that the second crank supporting portion 206 of the second crank 19 is disposed on the housing of the circuit breaker, the second crank supporting portion 206 may be pivotally disposed on the circuit breaker housing 3 or the unit housing 120 (or the phase separation partition). Further, as shown in FIG. 41, the second crank supporting portion 206 is pivotally disposed on the unit housing 120 through a second crank shaft 79. Further, the unit housing 120 includes a second crank shaft hole which is a blind hole, and the second crank shaft 79 cooperates with the second crank shaft hole.

Specifically, as shown in FIG. 47, in the case that the second crank supporting portion 206 of the second crank 19 is disposed on the bracket 50, the second crank supporting portion 206 is pivotally disposed on the sidewall of the bracket 50 through the second crank shaft 79. The second crank shaft 79 may be a common connector such as a rivet, a screw rod or a bolt. The second crank supporting portion 206 is pivotally disposed on the bracket 50, which is beneficial to further reduce the assembly error of the operating mechanism 100 and improve the operational reliability of the operating mechanism 100.

Further, as shown in FIGS. 11-16, 41 and 47, the second crank connecting portion 208 of the second crank 19 is disposed between the second crank supporting portion 206 and the second crank driving portion 210. Specifically, as shown in FIGS. 11-13, the second crank supporting portion 206 and the second crank driving portion 210 are respectively disposed on two ends of the second crank 19; and the second crank supporting portion 208 is disposed in the middle of the second crank 19 and located between the second crank supporting portion 206 and the second crank driving portion 210.

Further, the center of rotation of the second crank 19 is a ninth axis, and the ninth axis is parallel to or coincided with the third axis 111*s*. Specifically, as shown in FIG. 41, the ninth axis coincides with the third axis 111*s* in the case that the second crank supporting portion 206 is pivotally arranged on the unit housing 120. As shown in FIG. 47, the second crank supporting portion 206 is pivotally disposed on the bracket 50, and the ninth axis is parallel to, but not coincident with the third axis 111*s*.

Further, as shown in FIGS. 11-16 and 41, the second connecting rod 29 is rotatably connected to the second crank connecting portion 208 of the second crank 19 through the first connecting shaft 21.

Further, as shown in FIGS. 11-16 and 41, the second crank driving portion 210 of the second crank 19 is driving connection to the contact support 110 through the linkage shaft 5. The linkage shaft 5 is a connecting shaft for realizing the synchronous rotation of the respective contact supports 110, and the second crank driving portion 210 of the second crank 19 is connected with the linkage shaft 5 to drive the contact support 110 to rotate, which is beneficial to improve the action synchronicity of respective circuit breaker poles 300.

Further, the second connecting rod 29 has an arc or straight plate structure, wherein one end of the second connecting rod 29 is rotatably connected to the slider 26 and the other end of the second connecting rod 29 is rotatably connected to the second crank 19 (or, in the operating mechanism 100 of the first embodiment, the second crank 19 is directly connected to the contact support 110). Further, as shown in FIGS. 11-16, 41 and 47, the second connecting rod 29 has an arc-shaped plate structure, wherein one end of the second connecting rod 29 is rotatably connected to the slider 26, and the other end of the second connecting rod 29 is rotatably connected to the second crank connecting portion 208 of the second crank 19. It should be pointed out that the shape of the second connecting rod 29 can be adaptively set according to specific space conditions, and can be designed into a shape that meets the requirements when it is necessary to avoid a specific structure, wherein the arc shape or the straight plate shape is a relatively conventional design, but the shape of the second connecting rod 29 is not limited to the arc or straight plate structure.

As shown in FIG. 1-13, a fourth embodiment of the operating mechanism 100 is specifically as follows:

the operating mechanism 100 of the fourth embodiment differs from the operating mechanisms 100 of the first to third embodiments in that: as shown in FIGS. 2-3, 5-6, 8-9, and 12-13, the slide rails 25 are defined on the bracket 50, and the slider 26 is in limiting fit the slide rails 25 to prevent the slider 26 from sliding while the operating mechanism 100 is in a disconnected state or a tripped state. The slide rails 25 provide a guiding function for the slider 26, and also serve as supporting points to provide a supporting force for the first connecting rod 27 and the slider 26, so that the operating mechanism 100 may have a stable closing position, disconnecting position and tripping position without cooperating with the contact support 110, making the operating mechanism 100 become an independently operable mechanism, which is conducive to the modularized assembly and production of the operating mechanism 100, and provides more design space for the distribution of the operating mechanism 100 in the circuit breaker shell 3. In addition, in actual production, the operating mechanism 100 does not need to cooperate with the contact system, which avoids the loss of the contact system during the test process, improves the assembly efficiency, and helps reduce R&D and production cost. Further, the operating mechanism 100 of the fourth embodiment can be independently switched among the closed state, the disconnected state and the tripped state in the case that the second connecting rod 29, the contact support 110 and the moving contact 9 are detached.

As shown in FIGS. 4-6 and 11-16, a layout form of the operating mechanism 100 of the fourth embodiment is as follows: the re-buckle 15, the latch 13, the jumping pin 16 and the first crank 30 are all arranged between two bracket arms 501; one end of the jump buckle 60 is pivotally arranged on the bracket connecting plate 502, and the other end of the jump buckle 60 is in latching fit with the latch 13; the re-buckle 15 and the latch 13 are disposed on one side of the V-shaped groove 505, and the bracket connecting plate 502 is located on the other side of the V-shaped groove 505; one end of the rocker arm leg 408 is pivotally disposed at the bottom of the V-shaped groove 505; one end of the first crank 30 is rotatably connected to the middle part of the jump buckle 60, the other end of the first crank 30 is rotatably connected to one end of the first connecting rod 27, and the other end of the first connecting rod 27 is in driving connection with the slider 26; and the slide rails 25 are disposed on the bracket arms 501, and the slide rails 25 and the V-shaped groove 5 are respectively disposed on two ends of the bracket arms 501 and have opposite opening directions. Further, as shown in FIGS. 7-16, the slider 26 is further connected to one end of the second connecting rod 29, and the other end of the second connecting rod 29 is connected to the second crank 19; one end of the second crank 19 is pivotally disposed around the ninth axis, the ninth axis coincides with the third axis 111*s*, and the other end of the second crank 19 is connected to the contact support 110.

Specifically, in the direction shown in FIGS. 4-6 and 11-16, the right end of the jump buckle 60 is pivotally arranged on the bracket connecting plate 502, and the left end of the jump buckle 60 is in latching fit with the latch 13; the re-buckle 15 and the latch 13 are disposed on the left side of the V-shaped groove 505, and the bracket connecting plate 502 is located on the right side of the V-shaped groove 505; the lower end of the rocker arm leg 408 is pivotally disposed at the bottom of the V-shaped groove 505; the upper end of the first crank 30 is rotatably connected to the middle part of the jump buckle 60, the lower end of the first crank 30 is rotatably connected to the upper end of the first connecting rod 27, and the lower end of the first connecting rod 27 is in driving connection with the slider 26; and the slide rails 25 and the V-shaped groove 505 are disposed at the lower end and the upper end of the bracket arm 501 respectively, and have openings which face downward and upward respectively. Further, in a direction shown in FIGS. 7-16, the upper end of the second connecting rod 29 is connected to the slider 26, the lower end of the second connecting rod 29 is connected to the second crank 19, the upper end of the second crank 19 and the contact support 110 are pivotally disposed around the third axis 111*s* respectively, and the lower end of the second crank 19 is in driving connection to the contact support 110.

In order to better illustrate the structure and principle of the operating mechanism 100, a cooperative relationship of respective components of the operation mechanism 100 of the fourth embodiment are described in detail below in three states (closed, disconnected and tripped states), to be specific:

As shown in FIGS. 1-6, two ends of the swing stroke of the rocker arm 45 are a first stroke end and a second stroke end, respectively; two ends of the first spring 22 are a first spring end 220 and a second spring end 221 respectively, which are connected to the rocker arm assembly and the first crank 30 respectively; and an axis line of the first spring 22 is a first axis line, a first axis line side and a second axis line side are respectively located on two sides of the first axis line. As shown in FIG. 1 and FIG. 4, in the case that the operating mechanism 100 is in the closed state, the rocker arm 45 is located at the first stroke end, the re-buckle 15 is in limiting fit with the latch 13, the latch 13 is in latching fit with the jump buckle 60, the crank limiting portion 31 is in limiting fit with the jump buckle 60 to prevent the first crank 30 from rotating in the first direction, and the first axis 67*m* is located at the first axis line side. As shown in FIG. 2 and FIG. 5, in the case that the operating mechanism 100 is in the disconnected state, the rocker arm 45 is located at the second stroke end, the re-buckle 15 is in limiting fit with the latch 13, the latch 13 is in latching fit with the jump buckle 60, the crank limiting portion 31 releases the limiting fit from the jump buckle 60, the reset structure 42 is in limiting fit with the jump buckle 60, and the slider 26 is in limiting fit with the slide rails 25 to prevent the first crank 30 from rotating in the second direction through the first connecting rod 27. The first and second directions are opposite to each other, and the first axis 67*m* is located at the second axis line side. Further, as shown in FIGS. 3 and 6, in the case that the operating mechanism 100 is in the tripped state, the rocker arm 45 is located in the middle of its swing stroke, the re-buckle 15 releases the limiting fit from the latch 13, the latch 13 releases the latching fit from the jump buckle 60, the crank limiting portion 13 is in limiting fit with the jump buckle 60, the reset structure 42 is in limiting fit with the jump buckle 60, the slider 26 is in limiting fit with the slide rails 25, and the first axis 67*m* is located at the first axis line side. The operating mechanism 100 enters the disconnected state after re-buckle from the tripped state.

Specifically, in a direction shown in FIGS. 1-6, the first stroke end is the right end of the swing stroke of the rocker arm assembly or rocker arm 45, and the second stroke end is the left end of the swing stroke of the rocker arm assembly or rocker arm 45; the first axis line side is the left side of the first axis line, and the second axis line side is the right side of the first axis line; and the first direction is counterclockwise and the second direction is clockwise.

It should be pointed out that the "re-buckle" of the operating mechanism 100 refers that the latch 13 and the jump buckle 60 restore the latching fit, and the re-buckle 15 and the latch 13 restore the limiting fit.

The following is an operation process of switching the operating mechanism 100 of the fourth embodiment among a closed state, a disconnected state and a tripped state:

the operation process of the operating mechanism 100 being switched from the closed state to the disconnected state will be described below in conjunction with FIGS. 1, 4, 2 and 5: as shown in FIG. 1 and FIG. 4, in the case that the operating mechanism 100 is in the closed state, the rocker arm 45 swings toward the second stroke end and drives the first spring end 220 to rotate around the second spring end 221, until the first spring 22 passes a first dead center position; the first spring 22 drives the first crank 30 to rotate in the second direction and drives the rocker arm 45 to swing to the second stroke end; the first crank 30 drives the slider 26 through the first connecting rod 27 to move till being in limiting fit with the slide rails 25 so as to prevent the first crank 30 from rotating in the second direction, so that the operating mechanism 100 is switched to the disconnected state shown in FIG. 2 and FIG. 5. Specifically, in a direction shown in FIG. 1 and FIG. 4, in the case that the operating mechanism 100 is in the closed state, the rocker arm 45 swings from right to left (from the first stroke end to the second stroke end) and drives the first spring end 220 to rotate around the second spring end 221 in a anticlockwise direction, until the first spring 22 passes the first dead center position; the first spring 22 drives the first crank 30 to rotate in a clockwise direction (the second direction) and drives the rocker arm 45 to swing to the second stroke end rapidly; the first crank 30 drives the slider 26 through the first connecting rod 27 to move to the upper end of the slide rails 25 and to be in limiting fit therewith, thereby preventing the first crank 30 from rotating in the clockwise direction (the second direction), so that the operating mechanism 100 is switched to the disconnected state shown in FIG. 2 and FIG. 5.

The operation process of the operating mechanism 100 being switched from the disconnected state to the closed state will be described below in conjunction with FIGS. 1, 4, 2 and 5: as shown in FIG. 2 and FIG. 5, in the case that the operating mechanism 100 is in the disconnected state, the rocker arm 45 swings toward the first stroke end and drives the first spring end 220 to rotate around the second spring end 221, until the first spring 22 passes the first dead center position; the first spring 22 drives the first crank 30 to rotate in the first direction, such that the crank limiting portion 31 is in limiting fit with the jump buckle 60, thereby preventing the first crank 30 from rotating in the first direction; meanwhile, the first spring 22 drives the rocker arm 45 to swing to the first stroke end, so that the operating mechanism 100 is switched to the closed state as shown in FIG. 1 and FIG. 4; and the first direction and the second direction are opposite to each other. Specifically, in a direction shown in FIG. 2 and FIG. 5, in the case that the operating mechanism 100 is in the disconnected state, the rocker arm 45 swings from left to right (from the second stroke end to the first stroke end) and drives the first spring end 220 to rotate around the second spring end 221 in a clockwise direction, until the first spring 22 passes the first dead center position; the first spring 22 drives the first crank 30 to rotate in an anticlockwise direction (the first direction), such that the crank limiting portion 31 is in limiting fit with the jump buckle 60, thereby preventing the first crank 30 from continuing to rotate in the anticlockwise direction (the first direction); meanwhile, the first spring 22 drives the slider 26 through the first connecting rod 27 to move to the middle part of the slide rails 25 from the upper end of the slide rails 25, and meanwhile, drives the rocker 45 to swing to the first stroke end rapidly, so that the operating mechanism 100 is switched to the closed state shown in FIG. 1 and FIG. 4.

The operation process of the operating mechanism 100 being switched from the closed state to the tripped state will be described below in conjunction with FIGS. 1, 4, 3 and 6: as shown in FIG. 1 and FIG. 4, in the case that the operating mechanism 100 is in the closed state, the re-buckle 15 rotates to release the limiting fit from the latch 13, and the latch 13 rotates to release the latching fit from the jump buckle 60; the jump buckle 60 rotates and drives the first crank 30 to rotate synchronously, the first crank 30 drives the slider 26 through the first connecting rod 27 to move till being in limiting fit with the slide rails 25, thereby preventing the jump buckle 60 from continuing to rotate; and the first spring 22 drives the rocker arm 45 to swing toward the second stroke end to the reset structure 42 to be in limiting fit with the jump buckle 60, such that the operating mechanism is switched to the tripped state as shown in FIG. 3 and FIG. 6. Specifically, in the direction shown in FIG. 1 and FIG. 4, in the case that the operating mechanism 100 is in the closed state, the re-buckle 15 rotates anticlockwise to release the limiting fit from the latch 13, and the latch 13 rotates anticlockwise to release the latching fit from the jump buckle 60; the jump buckle 60 rotates clockwise and drives the first crank 30 to rotate synchronously, the first crank 30 drives the slider 26 through the first connecting rod 27 to slide to the upper end of the slide rails 25 and to be in limiting fit therewith, thereby preventing the jump buckle 60 from continuing to rotate clockwise; and the first spring 22 drives the rocker arm 45 to swing anticlockwise (in a direction where the second stroke end is located) to the reset structure 42 and be in limiting fit with the jump buckle 60, such that the operating mechanism 100 is switched to the tripped state shown in FIG. 3 and FIG. 6.

The operation process of the operating mechanism 100 being switched from the tripped state to the disconnected state will be described below in conjunction with FIGS. 3, 6, 2 and 5: as shown in FIG. 3 and FIG. 6, in the case that the operating mechanism 100 is in the tripped state, the rocker arm 45 swings to the first stroke end, and the jump buckle 60 is driven by the reset structure 42 to rotate to be in latching fit with the latch 13, such that the latch 13 is in limiting fit with the re-buckle 15, and the operating mechanism 100 is switched to the disconnected state shown in FIG. 2 and FIG. 5. Specifically, in the direction shown in FIG. 3 and FIG. 6, in the case that the operating mechanism 100 is in the tripped state, the rocker arm 45 swings to the first stroke end anticlockwise, and the jump buckle 60 is driven by the reset structure 42 to rotate to be in latching fit with the the latch 13, and meanwhile, the jump buckle 60 drives the latch 13 to rotate clockwise, such that the latch 13 is in limiting fit with the re-buckle 15, and the operating mechanism 100 is switched to the disconnected state shown in FIG. 2 and FIG. 5.

Further, as shown in FIGS. 1-6, the first spring 22 is located in the first dead center position, and the first axis 67*m* is located on the first axis line. Further, as shown in FIGS. 1-6, the first spring 22 is a tension spring, the first direction refers to a direction facing the first stroke end, and the second direction refers to a direction facing the second stroke end.

As shown in FIGS. 23-26, the present invention further provides a connection structure, which achieves a simple connection between the jump buckle 60 and the bracket 50, to be specific:

as shown in FIG. 23, the connection structure includes a bracket 50, a jump buckle 60 and a jump buckle shaft 11; the bracket 50 includes a bracket connecting plate 502, and bracket arms 501 connected to the bracket connecting plate 502; the jump buckle shaft 11 is connected to the bracket arms 501; the jump buckle 60 is rotatably disposed on the jump buckle shaft 11; and the bracket 50 further includes jump buckle positioning arms 503, which limit two sides of the jump buckle 60, thereby limiting a position of the jump buckle 60 in an axial direction of the jump buckle shaft 11. The connection structure, compared with the prior art mode in which the jump buckle 60 and the jump buckle shaft 11 are riveted and then assembled onto the bracket 50, is simpler and convenient to operate, and also reduces the requirements for a thermal treatment process of the jump buckle 11.

Figure 24:
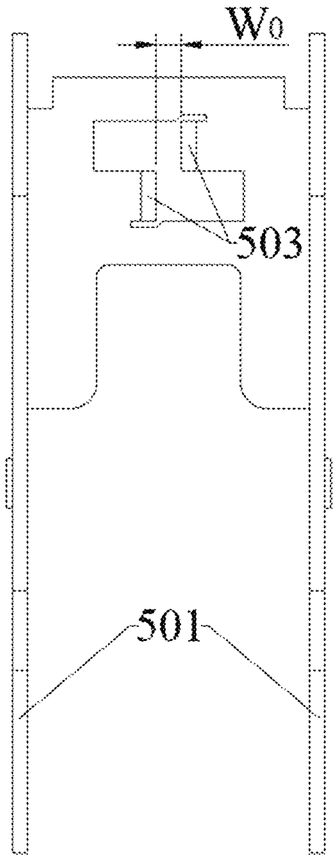
FIG. 24 is a schematic projection view of the bracket of the present invention, in which at least a positional relationship and spacing between two jump buckle positioning arms are shown.

Further, as shown in FIGS. 24 and 26, a spacing Wo between parts of the jump buckle positioning arms 503, which are located on two sides of the jump buckle 60 and used for limiting the jump buckle 60, is matched with the thickness of the jump buckle 60, ensuring the rotation flexibility of the jump buckle 60 while preventing the jump buckle 60 from moving along an extension direction of the jump buckle shaft 11.

Further, as shown in FIGS. 23-24, and 26, at least two jump buckle positioning arms 503 are disposed to face each other at intervals. Further, as shown in FIGS. 23 and 24, the two jump buckle positioning arms 503 are staggered axially along the jump buckle shaft 11, and are located on two sides of the jump buckle shaft 11.

Further, as shown in FIGS. 23-24 and 26, an implementation of the jump buckle positioning arms 503 is as follows: two jump buckle positioning arms 503 are disposed to face each other at intervals, wherein one end of each jump buckle positioning arm 503 is connected to the bracket connecting plate 502, and the other end of the jump buckle positioning arm 503 is blocked on one side of the jump buckle 60. Further, as shown in FIG. 23, one end of each of the two jump buckle positioning arms 503 is respectively connected to the bracket connecting plate 502 by bending, the other end of the jump buckle positioning arm 503 extends in the direction where the jump buckle shaft 11 is located and is respectively blocked on two sides of the jump buckle 60, and the length of the jump buckle positioning arm 503 is greater than a spacing between the jump buckle shaft 11 and the bracket connecting plate 502. Specifically, the side facing a reader in FIG. 23 is a front side, the rear end of the jump buckle positioning arm 503 is connected to the bracket connecting plate 502, and the front end of the jump buckle positioning arm 503 extends in the direction where the jump buckle shaft 11 is located. Further, as shown in FIG. 23, the jump buckle positioning shaft 503 and the bracket connecting plate 502 are of an integrated structure, which is formed by cutting and bending the middle part of the bracket connecting plate 502.

Further, the following is another implementation of the jump buckle positioning arm 503 (not shown): the bracket 50 further includes a positioning arm connecting plate, wherein one end of the positioning arm connecting plate is connected to two jump buckle positioning arms 503, and the other end of the positioning arm connecting plate is connected to the bracket connecting plate 502.

It should be pointed out that a setting method of the jump buckle positioning arms 503 is not limited to the above two implementations. The jump buckle positioning arms 503 may also be connected to the bracket arms 501; or the jump buckle positioning arms 503 and the bracket 50 may be of an integrated structure, or of split structures assembled together later (by common connection means, such as welding, screw connection and riveting).

Further, each jump buckle positioning arm 503 includes a positioning arm avoidance hole for the jump buckle shaft 11 to pass through; or, as shown in FIG. 23, the jump buckle positioning arm 503 includes a semicircular positioning arm avoidance groove for the jump buckle shaft 11 to pass through, and opening ends of the two positioning arm avoidance grooves are opposite each other.

As shown in FIGS. 23 and 24, an embodiment of the jump buckle positioning arms 503 is as follows: two jump buckle positioning arms 503 are staggered in an axial direction of the jump buckle shaft 11 and are located on two sides of the jump buckle shaft 11; and as shown in FIG. 23, the jump buckle positioning arm 503 includes a semicircular positioning arm avoidance groove for the jump buckle shaft 11 to pass through, and opening ends of the two positioning arm avoidance grooves are opposite each other.

as shown in FIGS. 23-24, and 26, an embodiment of the connection structure is as follows: as shown in FIGS. 23 and 24, the bracket 50 is of a U-shaped structure, including a bracket connecting plate 502, and two bracket arms 501 connected to two ends of the bracket connecting plate 502 respectively by bending; as shown in FIG. 26, two ends of the jump buckle shaft 11 are connected to the two bracket arms 501 respectively; as shown in FIGS. 23, 24 and 26, the jump buckle 60 is rotatably disposed on the jump buckle shaft 11; the bracket 50 further includes two jump buckle positioning arms 503 located between the two bracket arms 501 and disposed to face each other at intervals, wherein the two jump buckle positioning arms 503 are disposed on two sides of the jump buckle 60 to block the jump buckle 60, thereby limiting the range of movement of the jump buckle 60 along an extension direction of the jump buckle shaft 11 (that is, limiting the position of the jump buckle 60 in the axial direction of the jump buckle shaft 11).

As shown in FIGS. 17-21, a fifth embodiment of the operating mechanism 100 is specifically as follows:

as shown in FIGS. 17-21, the operating mechanism 100 includes a bracket 50, a rocker arm assembly and a jump buckle 60 disposed on the bracket 50 respectively, a first crank 30 pivotally disposed on the jump buckle 60 around the first axis 67*m*, and a first spring 22; one end of the jump buckle 60 is rotatably connected to the bracket 50, and is a jump buckle pivoting end; the jump buckle 60 includes a jump buckle hole 605 for a positioning pin shaft 17 to be inserted, the bracket 50 includes a bracket hole 508 for the positioning pin shaft 17 to be inserted, the jump buckle hole 605 and the bracket hole 508 are aligned, and the first spring shaft 46 is in limiting fit with the jump buckle 60; one end of the first crank 30 swings away from the jump buckle pivoting end, so that a spacing between the first spring shaft 46 and the second spring shaft 16 is less than or equal to a length of the first spring 22, forming a first assembly state; and in the first assembly state, two ends of the first spring 22 are assembled to the first spring shaft 46 and the second spring shaft 16 respectively, and the rocker arm assembly swings in a direction where the jump buckle pivoting end is located and drives the first spring 22 and the first crank 30 to swing to the jump buckle pivoting end respectively, thereby forming a second assembly state. According to the operating mechanism 100 in this embodiment, the first spring 22 may be mounted on the first spring shaft 46 and the second spring shaft 16 simply and rapidly, thereby improving the assembly efficiency of the operating mechanism 100 and saving the assembly time and labor cost.

Figure 17:
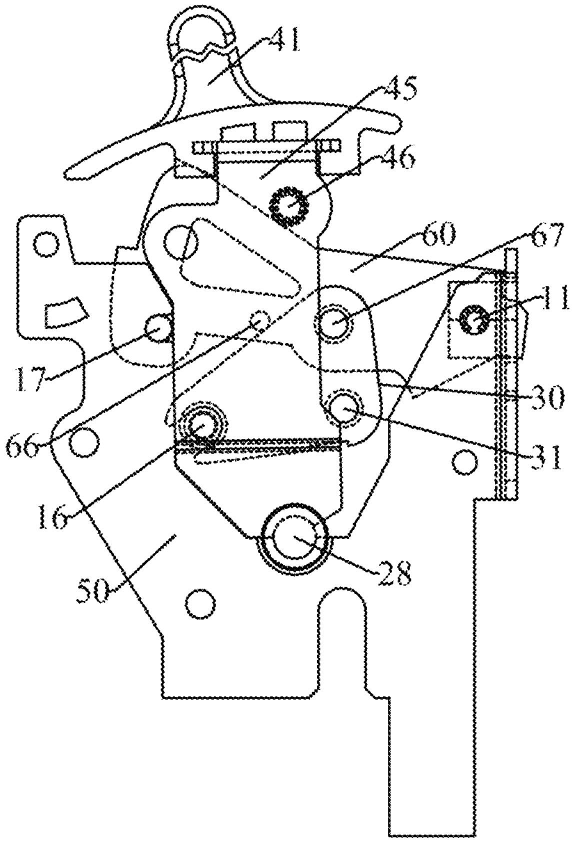
FIG. 17 is a schematic structural diagram of the operating mechanism of the present invention, in which a jump buckle and a bracket are fixed together by a positioning shaft pin, a second spring shaft is in limiting fit with the jump buckle, a first crank is in limiting fit with the jump buckle, and a spacing between the second spring shaft and a first spring shaft is less than or equal to the length of the first spring.
Figure 18:
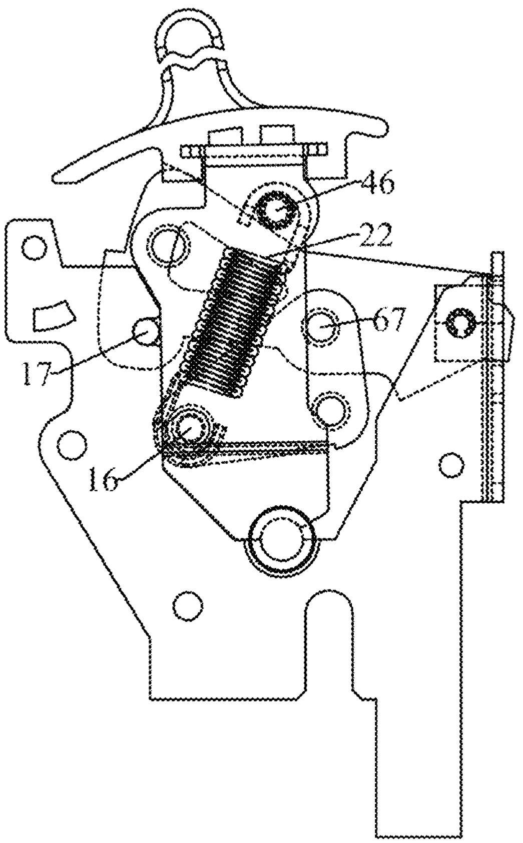
FIG. 18 is a schematic structural diagram of the operating mechanism of the present invention, in which a first spring is mounted on the first spring shaft and the second spring shaft compared to FIG. 17.
Figure 19:
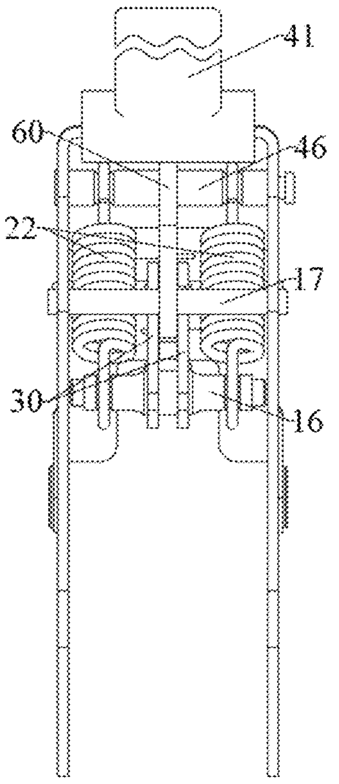
FIG. 19 is a schematic structural diagram of the operating mechanism of the present invention, in which a positional relationship between the first spring and the jump buckle is shown.
Figure 20:
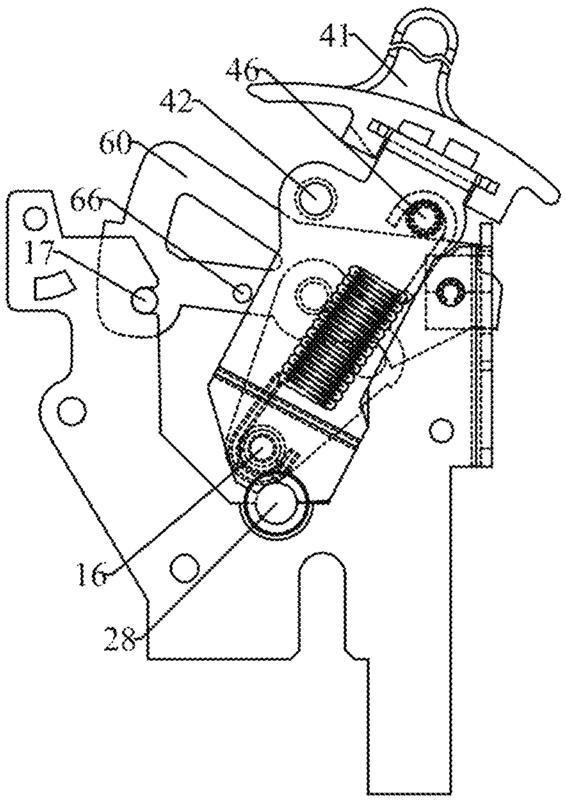
FIG. 20 is a schematic structural diagram of the operating mechanism of the present invention, in which a reset structure is mounted on a rocker arm compared to FIG. 18.
Figure 21:
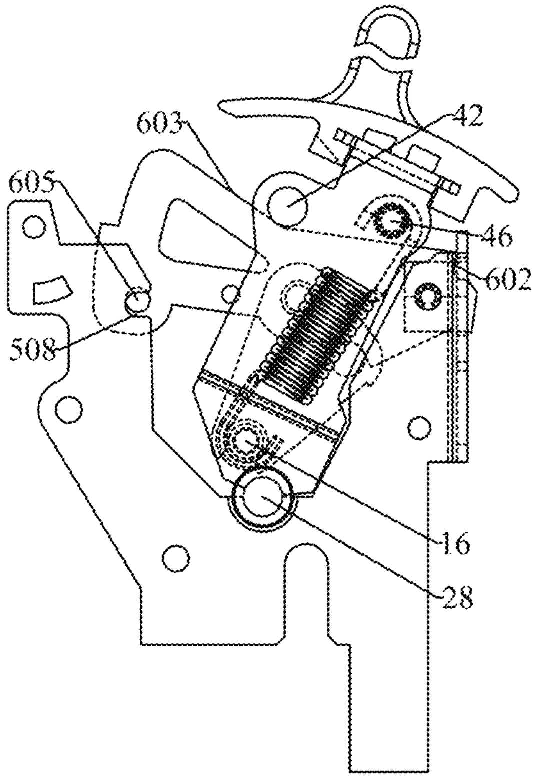
FIG. 21 is a schematic structural diagram of the operating mechanism of the present invention, in which a positioning shaft pin is detached compared to FIG. 20.

Specifically, as shown in FIG. 17, the jump buckle hole 605 is aligned with the bracket hole 508; the first spring shaft 46 is in limiting fit with the jump buckle 60, and one end of the first crank 30 swings in a direction away from the jump buckle pivoting end till being in limiting fit with the jump buckle 60, such that the first assembly state is formed. Further, as shown in FIGS. 17 and 18, in the first assembly state, two ends of the first spring 22 are assembled to the first spring shaft 46 and the second spring shaft 16, respectively; and after the rocker arm assembly swings so that the first spring shaft 46 moves away from the jump buckle 60 and the axis line of the first spring 22 swings over the first axis 67*m*, the first spring 22 drives the rocker arm assembly to swing to one end of its swing stroke, while driving the first crank 30 to swing in the direction of the jump buckle pivoting end to the first crank 30 till being limiting fit with the jump buckle 60 again. At this time, the assembly of the first spring 22 is completed, and the operating mechanism 100 enters the second assembly state as shown in FIG. 20. Further, in a direction shown in FIGS. 17-18, and 20-21, the right end of the jump buckle 60 is the jump buckle pivoting end; "one end of the first crank 30 swings away from the jump buckle pivoting end" refers that the lower end of the first crank 30 swings clockwise; and "the first crank 30 swings in the direction of the jump buckle pivoting end" refers that the lower end of the first crank 30 swings counterclockwise.

Further, as shown in FIGS. 17 and 25, the jump buckle 60 further includes a jump buckle protrusion 66; and in the first assembly state, the jump buckle protrusion 66 limits a swing position of the first crank 30. Further, as shown in FIG. 17, the jump buckle protrusion 66 in the first assembly state is in limiting fit with the first crank 30. Further, as shown in FIGS. 17 and 18, the first spring shaft 46 and the second spring shaft 16 are located on two sides of the jump buckle 60; and the jump buckle protrusion 66 is located between the jump buckle shaft 11 and the jump buckle hole 605, and the first axis 67*m* is located between the jump buckle protrusion 66 and the jump buckle pivoting end. Specifically, in the direction shown in FIGS. 17 and 18, the first spring shaft 46 and the second spring shaft 16 are located on the upper and lower sides of the jump buckle 60, respectively.

Further, as shown in FIG. 17 and FIG. 18, the rocker arm assembly is disposed in the V-shaped groove of the bracket 50; the jump buckle pivoting end is located on one side of the V-shaped groove, and the latch 13, the re-buckle 15 and the bracket hole 508 are located on the other side of the V-shaped groove; and the rocker arm 45 is pivotally disposed at the bottom of the V-shaped groove. Specifically, in the direction shown in FIG. 17 and FIG. 18, the jump buckle pivoting end is located on the right side of the V-shaped groove, and the latch 13, the re-buckle 15 and the bracket hole 508 are located on the left side of the V-shaped groove.

As shown in FIG. 25, an embodiment of the jump buckle 60 is as follows: the jump buckle 60 is of a strip plate structure, wherein a jump buckle shaft hole 601 and a limiting shoulder 602 which is in limiting fit with the bracket connecting plate 502 of the bracket 50 are formed at one end of the jump buckle 60, a jump buckle hole 605 and a jump buckle table 604 which is in latching fit with the latch 13 are formed in the other end of the jump buckle 60, and the jump buckle protrusion 66 and a jump buckle-crank shaft hole are formed in the middle of the jump buckle 60; the jump buckle hole 605, the jump buckle protrusion 66, the jump buckle-crank shaft hole and the jump buckle shaft hole 601 are arranged side by side at intervals in sequence; and two edges of the jump buckle 60 in a length direction are provided with a driving side edge 603 and a limiting side edge 608, respectively, which are located at two ends of the jump buckle 60 in the length direction.

Based on the fifth embodiment of the operating mechanism 100, the present invention further provides an assembly method of an operating mechanism, which can complete the assembly of the first spring 220 easily and quickly and is conducive to improving the assembly efficiency of the entire operating mechanism 100 and realizing automatic assembly. The assembly method of the operating mechanism includes the following steps.

Step I, Aligning the jump buckle hole 605 of the jump buckle 60 to the bracket hole 508 of the bracket 50, and inserting the positioning pin shaft 17 inside the jump buckle 605 and the bracket hole 508, such that the operating mechanism enters the first assembly state.

Further, in the step I, the jump buckle hole 605 is aligned with the bracket hole 508, the positioning pin shaft 17 is mounted in the jump buckle hole 605 and the bracket hole 508, and the rocker arm 45 swings away from the jump buckle pivoting end, such that the first spring shaft 46 is in limiting fit with the jump buckle 60; and the first crank 30 swings away from the jump buckle pivoting end to be in limiting fit with the jump buckle 60, such that the operating mechanism 100 enters the first assembly state. At this time, a spacing between an axis line of the first spring shaft 46 and an axis line of the second spring shaft 16 is less than or equal to the length of the first spring 22.

Step II, Assembling two ends of the first spring 22 to the first spring shaft 46 and the second spring shaft 16 respectively in the first assembly state; and swinging the rocker arm 45 toward the jump buckle pivoting end, wherein the rocker arm 45 drives the first spring 22 and the first crank 30 to rotate, such that the operating mechanism enters the second assembly state.

Further, in the step II, two ends of the first spring 22 are assembled to the first spring shaft 46 and the second spring shaft 16, respectively; the rocker arm 45 swings in the direction where the jump buckle pivoting end is located, the rocker arm 45 drives the first spring 22 through the first spring shaft 46 to swing around the second spring shaft 16, and the axis of the first spring 22 swings over the rotation center (i.e., the first axis 67*m*) of the first crank 30; the first spring 22 drives the rocker arm 45 to swing to one end of the swing stroke of the rocker arm assembly, and meanwhile, the first spring 22 drives the first crank 30 to swing in the direction of the jump buckle pivoting end to the first crank 30 till being in limiting fit with the jump buckle 60 again. The operating mechanism enters the second assembly state, and the first spring 22 completes the assembly.

Further, the assembly method of the operating mechanism of the present invention further includes a step III, i.e., assembling the reset structure 42 of the rocker arm assembly on the rocker arm 45 in the second assembly state, drawing the positioning pin shaft 17 off, and driving the jump buckle 60 by the first spring 22 to rotate to be in limiting fit with the reset structure 42.

Further, the assembly method of the operating mechanism of the present invention further includes steps IV and V, the orders of which may be interchangeable: in the step IV, the slider 26 is assembled on the slide rails 25, and two ends of the first connecting rod 27 are rotatably assembled on the second spring shaft 16 and the slider 26, respectively. In the step V, the latch 13 is pivotally disposed on the bracket 50 through the latch shaft 12 respectively, and the re-buckle 15 is pivotally disposed on the bracket 50 through a re-buckle shaft 14.

Further, the assembly method of the operating mechanism of the present invention further includes the following operations: prior to the step I, the second spring shaft 16 is assembled on the first crank 30, the first crank 30 is pivotally disposed on the jump buckle 60 around the first axis 67*m*, and the jump buckle 60 is pivotally disposed on the bracket 50; and the first spring shaft 46 is mounted on the rocker arm 45 of the rocker arm assembly, and the rocker arm 45 is pivotally disposed in the V-shaped groove of the bracket 50.

Figure 29:
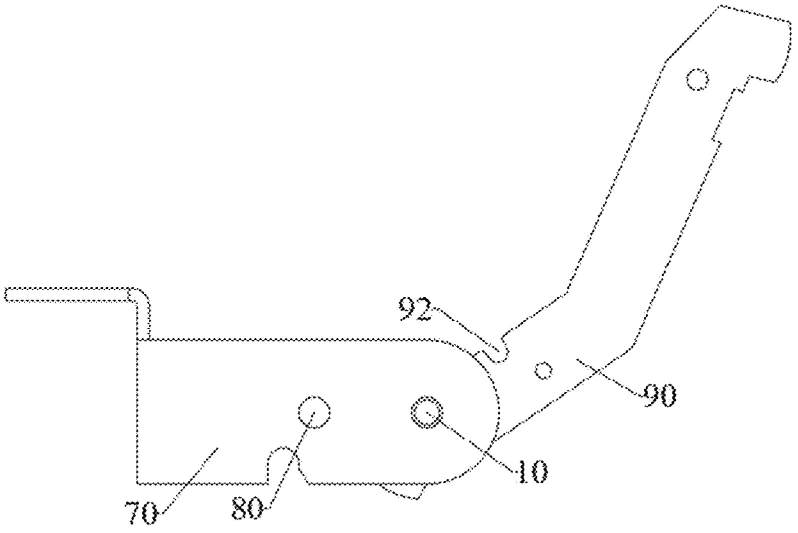
FIG. 29 is a schematic structural diagram of a moving contact assembly of the present invention.
Figure 33:
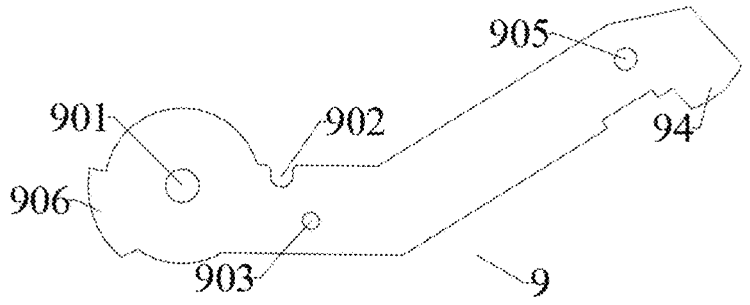
FIG. 33 is a schematic structural diagram of a first embodiment of a moving contact of the present invention.

Further, as shown in FIGS. 7-16, and 35, the moving contact mechanism further includes a contact spring 23, wherein one end of the contact spring 23 is connected to the moving contact 9, and the other end of the contact spring 23 is connected to the contact support 110. When the moving contact 9 and the static contact 18 are closed, a first acting force is applied to the moving contact 9 so that the moving contact 9 presses the static contact 18. Further, as shown in FIGS. 7-16, and 35, one end of the contact spring 23 is connected to the moving contact 9 through a third spring shaft 201, and the other end of the contact spring 23 is rotatably connected to the contact support 110 through the fourth spring shaft 202. Further, as shown in FIGS. 29 and 33, the moving contact 9 includes a moving conductive rod 90, wherein the moving conductive rod 90 is provided with a conductive rod clamping groove 902 cooperated with the third spring shaft 201.

Figure 14:
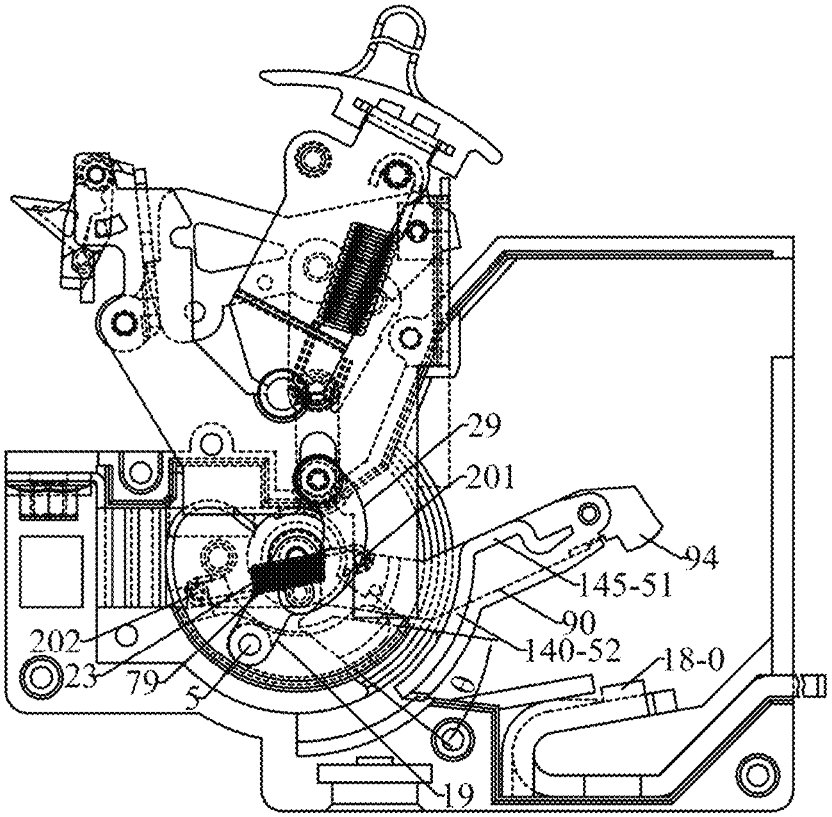
FIG. 14 is a schematic structural diagram of the circuit breaker of the present invention, in which the moving contacts are repulsed by an electric repulsion force.
Figure 15:
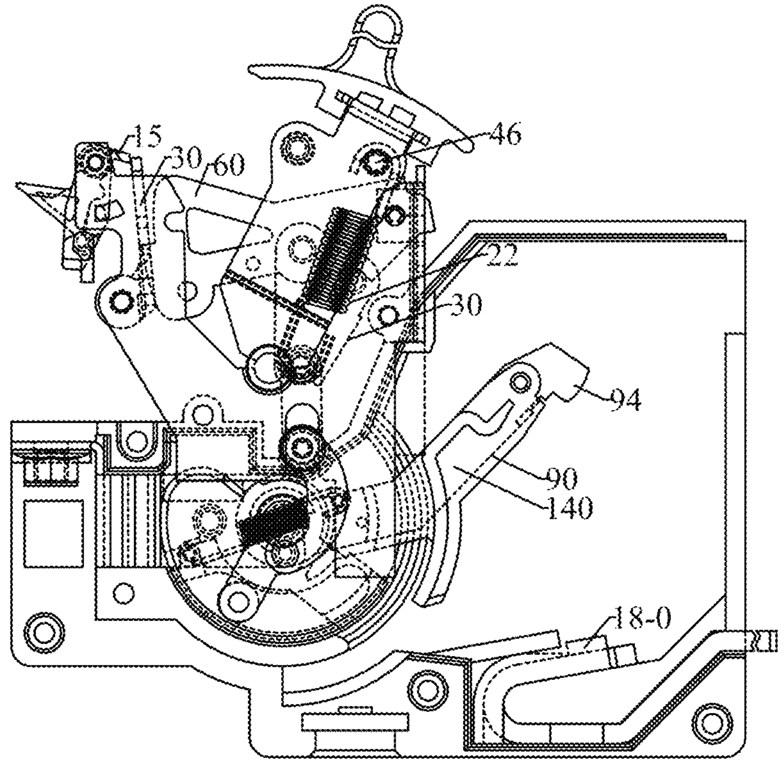
FIG. 15 is a schematic structural diagram of the circuit breaker of the present invention, in which a contact spring rotates to a second dead center position.
Figure 16:
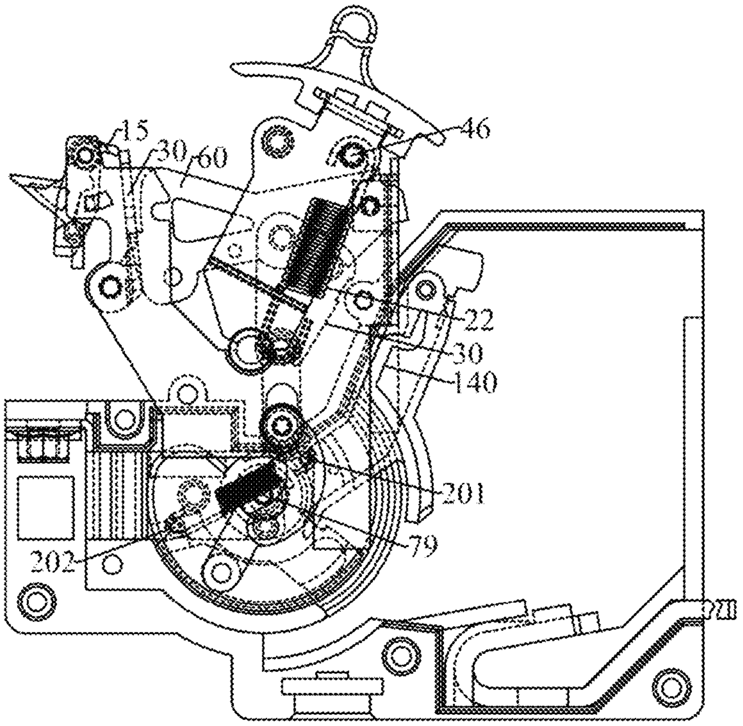
FIG. 16 is a schematic structural diagram of the circuit breaker of the present invention, in which the contact spring locks a moving contact.

Further, as shown in FIGS. 14-16, the contact spring 23 may also achieve the locking of the moving contact 9, to be specific: two ends of the contact spring 23 are a third spring end and a fourth spring end respectively, wherein the third spring end is connected to the moving contact 9, the fourth spring end is connected to the contact support 110, a geometric axis line of the contact spring 23 is a second axis line, and the second axis line coincides with a connecting line of the third spring end and the fourth spring end; as shown in FIG. 11, the second axis line is located on one side of the third axis 111*s* when the moving contact 9 is normally closed or disconnected, and the contact spring 23 keeps the moving contact 9 in a normally closed position or a normally disconnected position; the moving contact 9 rotates relative to the contact support 110 when the moving contact 9 is repelled by an electric repulsion force generated by a short-circuit current; and the moving contact 9 drives the contact spring 23 to rotate around the fourth spring end, so that the second axis line swings to the other side of the third axis 111*s*, and the moving contact 9 remains in a temporary breaking position. The moving contact mechanism includes a contact support 110, a moving contact 9 and a contact spring 23. The moving contact mechanism has a simple structure. The contact spring 23 realizes the overtravel of the moving contact 9 to ensure the reliable contact between the moving contact 9 and the static contact 18; and the contact spring 23 locks the moving contact 9 in the temporary breaking position when the moving contact 9 is repelled by an electric repulsion force generated by the short-circuit current, so that the moving contact 9 does not rebound in the occurrence of a short-circuit fault, which ensures the reliable breaking of the moving contact 9 and the static contact 18. It should be pointed out that when the moving contact 9 is located in the temporary breaking position, if the operating mechanism 100 switches from the closed state to the disconnected state, the moving contact 9 automatically acts from the temporary breaking position to a normal disconnecting position.

Further, as shown in FIG. 11, the moving contact 9 and the static contact 18 are closed, and the short-circuit current flows through the moving contact 9 and the static contact 18. Due to a current direction in the moving contact 9 being opposite to a current direction of a part, opposite to the moving contact 19, of the static contact 18, an electric repulsion force is generated between the moving contact 9 and the static contact 18, so that the moving contact 9 is repulsed.

Further, as shown in FIGS. 14-16, the contact spring 23 passes through a second dead center position when the moving contact 9 drives the contact spring 23 to rotate and thus the second axis line swings from one side of the third axis 111*s* to its other side; and as shown in FIG. 15, the third axis 111*s* is located on the second axis line when the contact spring 23 is located in the second dead center position.

Specifically, as shown in FIGS. 11 and 12, in the case that the circuit breaker of the present invention is normally closed or normally disconnected, the contact spring 23 and the contact support 110 act synchronously and are relatively stationary. The second axis line of the contact spring 23 is always kept on the same side of the third axis 111*s*, and undergoes a small deformation only when the moving contact 9 and the static contact 18 are closed, so as to provide an overtravel force for the moving contact 9, thereby ensuring that the moving contact 9 and the static contact 18 are tightly closed. In the direction shown in FIGS. 14-16, when the short-circuit current flows through the circuit breaker of the present invention, the moving contact 9 will be repelled by the electric repulsion force generated by the short-circuit current, so that the moving contact 9 rotates in a counterclockwise direction relative to the contact support 110 (the contact support 110 remains stationary because the operating mechanism is in the closed state), and the moving contact 9 (through the third spring shaft 201) drives the contact spring 23 to rotate counterclockwise around the fourth spring end. As shown in FIG. 15, when the contact spring 23 rotates to the second dead center position, the energy storage of the contact spring 23 reaches a maximum value, and the third axis 111*s* is located on the second axis line. As shown in FIG. 16, the second axis line also passes the third axis 111*s* while the contact spring 23 passes the second dead center position. Therefore, the third axis 111*s* may also be regarded as the second dead center position, that is, the second axis passes the third axis 111*s*, i.e., the contact spring 23 passes the second dead center position. After the contact spring 23 passes the second dead center position, the energy is released and drives the moving contact 9 to quickly rotate to the temporary breaking position, so that the moving contact 9 remains in the temporary breaking position, and finally the second axis line is moved from the lower side of the third axis 111s to its upper side.

The present invention further discloses a moving contact assembly that can significantly improve the reliability of the connection between the conductor 70 and the moving contact 9, and realize a hard connection therebetween, to be specific:

as shown in FIGS. 29-34, and 45-46, the moving contact assembly includes a conductor 70, an inelastic fastener 80 and a moving contact 9, wherein the conductor 70 includes a first clamping arm 710 and a second clamping arm 711 which are disposed to face each other at intervals; the moving contact 9 includes a moving conductive rod 90 and a moving contact point 94; the moving contact point 94 is disposed at one end of the moving conductive rod 90; the moving conductive rod 90 includes a conductive rod contact portion disposed at the other end; the conductive rod contact portion is inserted between the first clamping arm 710 and the second clamping arm 711 and rotatably connected to the first clamping arm 710 and the second clamping arm 711, respectively; and the fastener 80 is connected to the first clamping arm 710 and the second clamping arm 711 respectively, so that the first clamping arm 710 and the second clamping arm 711 clamp the conductive rod contact portion. Further, as shown in FIGS. 29-34, and 45-46, the conductor 70 further includes a conductor connecting plate 712, and two ends of the conductor connecting plate 712 are connected to the first clamping arm 710 and the second clamping arm 711 respectively by bending.

Compared with the prior art, such as in the Japanese patent JP3794163B2 in which a double-torsion-spring pressing conductor and a moving contact are adopted, the moving contact assembly of the present invention is characterized in that the fastener 80 achieves a hard connection between the conductor 70 and the conductive rod 90, which, under the premise of ensuring that the moving conductive rod 90 has a certain flexibility of action, ensures the reliable structure and electrical connection between the conductor 70 and the conductive rod contact portion.

It should be pointed out that the "inelastic fastener 80" means that the fastener 80 will not undergo an elastic deformation caused by external forces.

Figure 30:
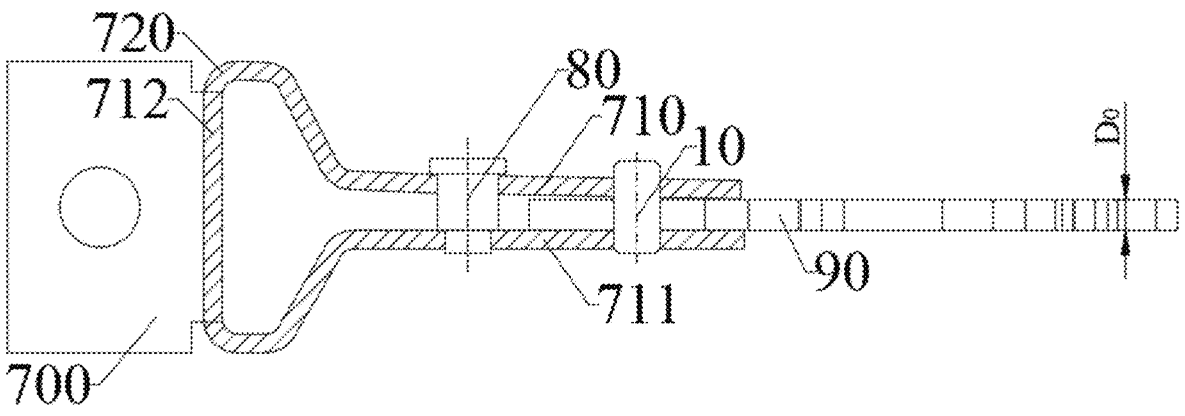
FIG. 30 is a schematic structural diagram of the moving contact assembly of the present invention, in which at least a connection relationship among a moving conductive rod, a first clamping arm and a second clamping arm is shown.

Further, as shown in FIGS. 30, 31, 34 and 45, the conductor 70 further includes a conductor connecting plate 712, and two ends of the conductor connecting plate 712 are connected to the first clamping arm 710 and the second clamping arm 711 by bending, respectively; and as shown in FIGS. 29 and 30, the fastener 80 is disposed between the conductor connecting plate 712 and the conductive rod contact portion, so that the first clamping arm 711 and the second clamping arm 710 clamp the conductive rod contact portion. Further, as shown in FIGS. 30, 31, 34, and 45, the conductor connecting plate 712, the first clamping arm 710 and the second clamping arm 711 are of a U-shaped structure as a whole. It should be pointed out that a clamping force of the first clamping arm 710 and the second clamping arm 711 for the moving conductive rod 90 may be adjusted by changing a length of a rivet body 802 and/or a position of the fastener 80 between the conductor connecting plate 712 and the moving conductive rod 90.

Figure 31:
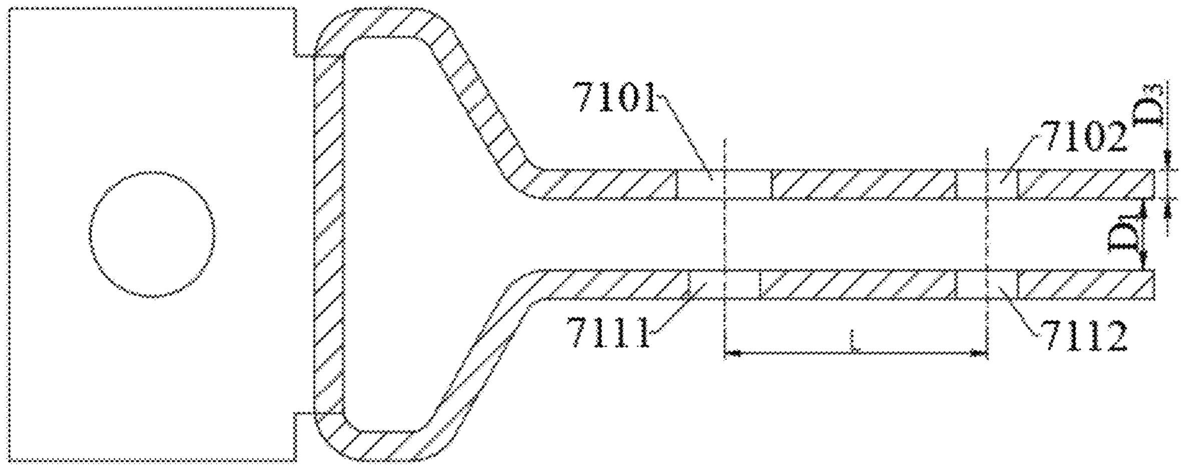
FIG. 31 is a schematic structural diagram of an implementation of a conductor of the present invention.
Figure 34:
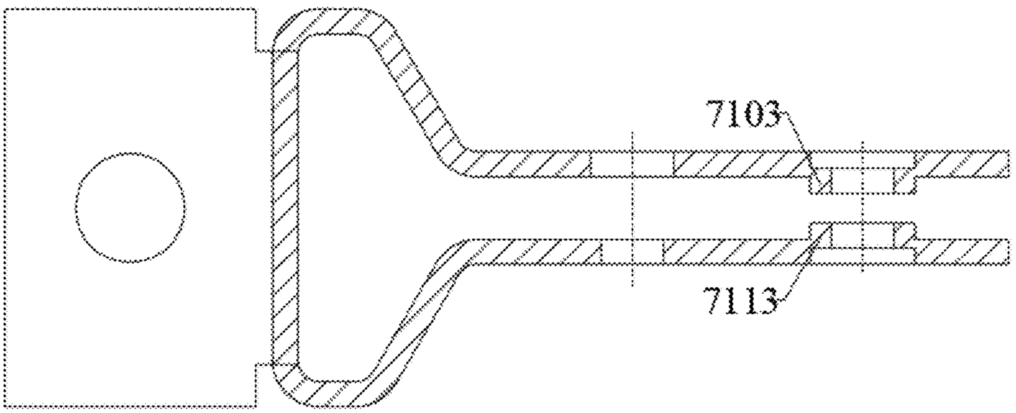
FIG. 34 is a schematic structural diagram of another implementation of a conductor of the present invention.

Further, as shown in FIGS. 30, 31, 34 and 45, the first clamping arm 710 and the second clamping arm 711 each include a clamping arm straight portion and a clamping arm bent portion, wherein two ends of the clamping arm bent portion are connected to the clamping arm straight portion and the conductor connecting plate 712 respectively by bending; the two clamping arm bent portions are offset by the clamping arm straight portions of the first clamping arm 710 and the second clamping arm 711 to the middle of the clamping arm connecting plate 712, respectively; the fastener 80 is disposed on the two clamping arm straight portions and fixedly connected to the two clamping arm straight portions, respectively; and the moving conductive rod 90 is rotatably connected to the two clamping arm straight portions. Further, as shown in FIGS. 31 and 34, the clamping arm straight portion of the first clamping arm 710 is provided with a first clamping arm hole 7101 and a first clamping arm shaft hole 7102 (or a first clamping arm shaft table 7103); and the clamping arm straight portion of the second clamping arm 711 is provided with a second clamping arm hole 7111 and a second clamping arm shaft hole 7112 (or a second clamping arm shaft table 7113).

Further, as shown in FIG. 38, the unit housing 120 includes a wiring board slot 120-4 that is in plug-in fit with a conductor wiring board 700.

Further, as shown in FIG. 31, in a state where the fastener 80 is not mounted, a spacing between the first clamping arm 710 and the second clamping arm 711 is $D_1$. As shown in FIG. 30, the thickness of the conductive rod contact portion is, $D_1 \geq D_0$. The "in the state where the fastener 80 is not mounted" means that the first clamping arm 710 and the second clamping arm 711 are in an initial free state, but are not constrained by the fastener 80 if the fastener 80 and the conductor 70 have not been assembled together.

Figure 45:
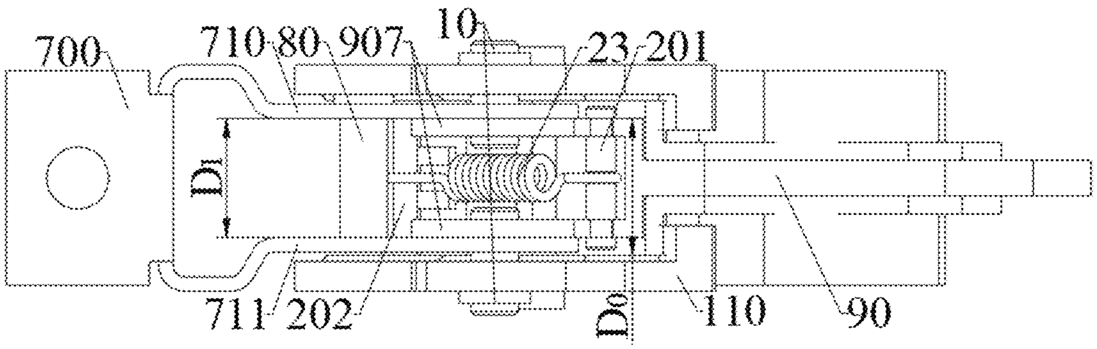
FIG. 45 is a schematic structural diagram of another implementation of the moving contact mechanism of the present invention.

Further, as shown in FIGS. 30 and 45, an inner sidewall of the first clamping arm 710 is in point contact or line contact with the conductive rod contact portion, and an inner sidewall of the second clamping arm 711 is in surface contact with the conductive rod contact portion. A contact mode in which the first clamping arm 710 and the second clamping arm 711 are in contact with the conductive rod contact portion is conducive to increasing a contact area between the conductor 70 and the moving contact 9, improving the conductivity of the moving contact mechanism, and maintaining the movement performance between the conductor and the moving contact.

Further, as shown in FIGS. 30 and 45, one end of the fastener 80 is fixedly connected or in clamping connection with the first clamping arm 710, and the other end of the fastener 80 is fixedly connected to the second clamping arm 711. Further, the fastener 80 is a rivet, wherein one end of the rivet is a rivet head 801 in clamping connection with the first clamping arm 710, and the other end of the rivet is a riveting end 803 fixedly connected to the second clamping arm 711.

Figure 32:
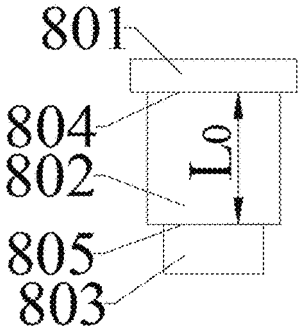
FIG. 32 is a schematic structural diagram of a fastener of the present invention.

Further, as shown in FIG. 32, the fastener 80 is a rivet. Further, as shown in FIG. 32, an embodiment of the fastener 89 is as follows: the fastener 80 includes a rivet head 801, a rivet body 802 and a rivet end 803 which are disposed in sequence, wherein an outer diameter of the rivet head 801 is greater than an outer diameter of the rivet body 802, and a first annular table 804 is disposed at the connection between the rivet head 801 and the rivet body 802; and an outer diameter of the rivet body 802 is greater than an outer diameter of the rivet end 803, and a second annular table 805 is disposed at the connection between the rivet body 802 and the rivet end 803. As shown in FIGS. 30 and 45, the first annular table 804 is in limiting fit with the first clamping arm 710, and the rivet body 802 passes through the first clamping arm 710 so that the second annular table 805 is in surface contact with the second clamping arm 711. The thickness of the first clamping arm 710 is, and the length of the rivet body (802) is, $L_0<D_1+D_3$.

It should be pointed out, as shown in FIGS. 30 and 45, the inner sidewall of the first clamping arm 710 is in line contact or point contact with the conductive rod contact portion, and the second clamping arm 711 is in surface contact with the conductive rod contact portion. The reasons for the above contact modes are as follows: a second annular table 805 is in surface contact with the second clamping arm 711 in the course of riving the rivet, so the rivet head 801 will deform the connection (a bend 720) between the first clamping arm 710 and the conductor connecting plate 712, such that the first clamping arm 710 inclines in a direction where the second clamping arm 711 is located. Therefore, the first clamping arm 710 is in line contact or point contact with the moving conductive rod 90, and the moving conductive rod 90 is in surface contact with the second clamping arm 711. Therefore, a contact area between the conductive rod contact portion and the conductor 70 is significantly increased, the conductivity of the moving contact mechanism is improved, and the heat generation in the conductive process of the moving contact assembly is reduced to prolong the service life of the moving contact assembly.

Further, as shown in FIGS. 31 and 34, the first clamping arm 710 is provided with a first clamping arm hole 7101 for the rivet body 802 to pass through, the second clamping arm 711 is provided with a second clamping arm hole 7111 for the rivet end 803 to pass through, and an inner diameter of the first clamping arm hole 7101 is greater than an inner diameter of the second clamping arm hole 7111.

As shown in FIG. 31, the first connection mode of the moving conductive rod 90 and the conductor 70 is as follows: the first clamping arm 710 is further provided with a first clamping arm shaft hole 7102, and the second clamping arm 711 is provided with a second clamping arm shaft hole 7112. As shown in FIG. 30, the moving contact assembly further includes a contact shaft 10, two ends of which are inserted in the first clamping arm shaft hole 7102 and the second clamping arm shaft hole 7112 respectively; the moving conductive rod 90 is of a strip-shaped plate structure, one end of which is the conductive rod contact portion; and the conductive rod contact portion is rotatably disposed on the contact shaft 10. Further, the moving contact mechanism includes two contact springs 23, which are disposed on both sides of the moving contact 9 respectively, wherein one end of each contact spring 23 is connected to the moving contact 9 through a third spring shaft 201, and the other end of the contact spring 23 is connected to the contact support 110 through the fourth spring shaft 202.

As shown in FIG. 34, the second connection mode of the conductive rod 90 and the conductor 70 is as follows: the first clamping arm 710 is further provided with a first clamping arm shaft table 7103, and the second clamping arm 711 is further provided with a second clamping arm shaft table 7113; the moving conductive rod 90 is of a strip plate structure, wherein a conductive rod contact portion is disposed at one end of the moving conductive rod 90; the conductive rod contact portion is provided with a conductive rod shaft hole 901; and the first clamping arm shaft table 7103 and the second clamping arm shaft table 7113 are inserted opposite to each other in the conductive rod shaft hole 901. Further, as shown in FIG. 34, the first clamping arm shaft table 7103 and the second clamping arm shaft table 7113 are respectively annular tables, which are formed by stamping the first clamping arm 710 and the second clamping arm 711 opposite to each other. The first clamping arm shaft table 7103 and the second clamping arm shaft table 7113 are conducive to increasing a contact area between the conductor 70 and the moving conductive rod 90. Further, the moving contact mechanism includes two contact springs 23, which are disposed on both sides of the moving contact 9 respectively, wherein one end of each contact spring 23 is connected to the moving contact 9 through a third spring shaft 201, and the other end of the contact spring 23 is connected to the contact support 110 through a fourth spring shaft 202.

Figure 46:
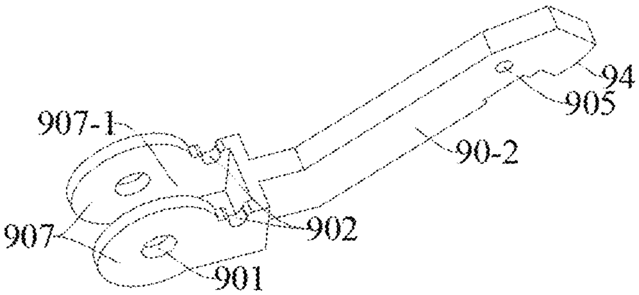
FIG. 46 is a schematic structural diagram of a second embodiment of a moving contact of the present invention.

As shown in FIG. 45 and FIG. 46, the third connection mode of the conductive rod 90 and the conductor 70 is as follows: the moving conductive rod 90 further includes a conductive rod body 90-2, wherein a moving contact point 94 is disposed at one end of the conductive rod body 90-2, and the other end of the conductive rod body 90-2 is connected to the conductive rod contact portion; the conductive rod contact portion includes a contact portion bottom plate, and two conductive rod contact plates 907 which are connected to two ends of the contact portion bottom plate respectively by bending and disposed to face each other at intervals; and the first clamping arm 710 and the second clamping arm 711 are rotatably connected to the two conductive rod contact plates 907 through the contact shaft 10, respectively. Further, as shown in FIGS. 45 and 46, the conductive rod contact portion is of a U-shaped structure, in which the conductive rod body 90-2 is connected to the middle part of one side of the contact portion bottom plate and the conductive rod contact plates 907 are located on two sides of the contact portion bottom plate, respectively. The moving contact mechanism includes at least one contact spring 23, wherein the contact spring 23 is located between the two conductive rod contact plates 907, one end of the contact spring 23 is connected to the moving contact 9 through the third spring shaft 201, and the other end of the contact spring 23 is connected to the contact support 110 through the fourth spring shaft 202. Further, as shown in FIGS. 46, two conductive rod contact plates 907 is respectively provided with a moving contact clamping groove 902 cooperated with the third spring shaft 203.

Figure 35:
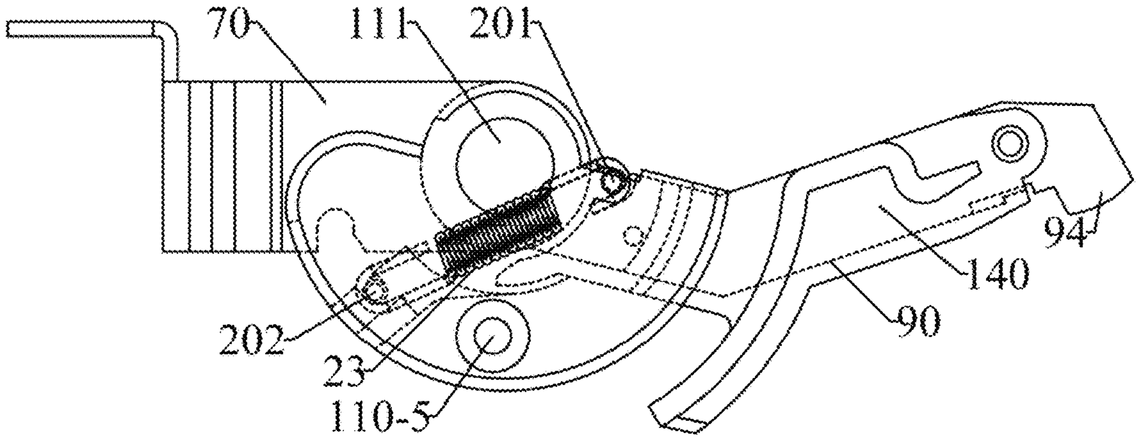
FIG. 35 is a schematic structural diagram of an implementation of the moving contact mechanism of the present invention.
Figure 37:
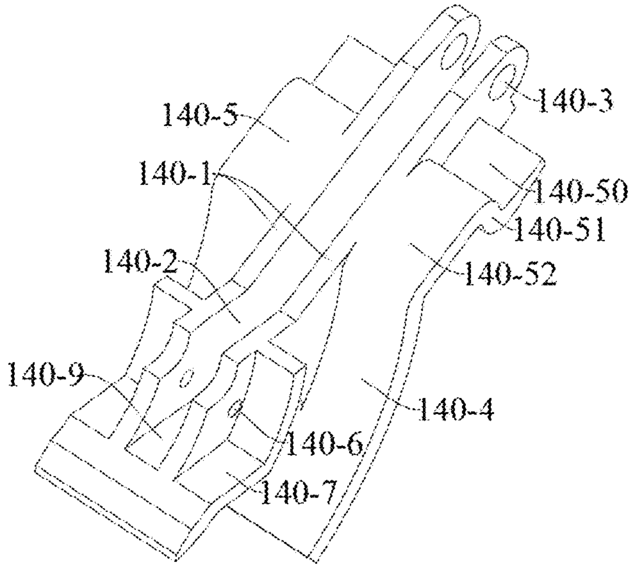
FIG. 37 is a schematic structural diagram of a moving contact insulator of the present invention.

Further, as shown in FIGS. 11-16, 35, 37-40, and 45, the moving contact mechanism further includes a moving contact insulator 140, wherein the cooperation between the moving contact insulator 140 and the moving contact 9 can significantly increase an insulation gap and a creepage distance between the moving contact 9 and the static contact 18. In addition, the moving contact insulator 140 can prevent electric arc particles generated when the moving contact 9 and the static contact 18 are broken from entering into the contact support 110 and from being attached to the contact spring 23 to affect its elasticity, and from being attached to a rotating shaft of the moving contact 9 to affect its action performance. The following is an implementation of the moving contact insulator 140, to be specific:

the moving contact insulator 140 includes an insulator body which includes an insulator bottom plate 140-9 and an insulator sidewall 140-1; a moving contact accommodating cavity 140-2 used to accommodate the moving contact 9 is formed in the middle of the insulator body; the moving contact insulator further includes a main baffle 140-4 and a main isolation plate 140-5, wherein the main baffle 140-4 is disposed outside the insulator bottom plate 140-9 and extends downward, the main isolation plate 140-5 is vertically connected to the insulator sidewall 140-4 and protrudes out of the insulator sidewall 140-4, and the main isolation plate 140-5 extends in a length direction of the insulator body. The moving contact insulator 140 is simple in structure and convenient to assemble, and can significantly improve the insulation performance of the moving contact 9, and increase the creepage distance between the moving contact 9 and the static contact 18. Further, as shown in FIGS. 35 and 37, the main isolation plate 140-5 extends from one end of the insulator body to the other end of the insulator body. Specifically, as shown in FIGS. 35 and 37, one end of the insulator body is close to the moving contact point of the moving contact 9, and is a first body end; the other end of the insulator body is a second body end; and the main isolation plate 140-5 extends from the first body end to the second body end.

Further, as shown in FIG. 37, the main baffle 140-4 and the main isolation plate 140-5 are of an integrated structure. Further, as shown in FIG. 37, the main baffle 140-4, the main isolation plate 140-5 and the insulator body are of an integrated structure.

Further, as shown in FIG. 37, two insulator sidewalls 140-1 are disposed to face each other at intervals; the main isolation plate 140-5 is respectively disposed on two sides of the insulator body respectively; the two main isolation plates 140-5 are disposed vertically on two sides of the two insulator sidewalls 140-4 respectively and protrude to two sides of the two insulator sidewalls 140-1 respectively; and one end of each main isolation plate 140-5 is connected to one end of one main baffle 140-4. Further, as shown in FIG. 37, a cross section of the insulator body is of a U-shaped structure, and the main baffle 140-4 and the main isolation plate 140-5 are of a U-shaped structure as a whole, which encloses the outside of the insulator body.

Specifically, in a direction shown in FIG. 37, the moving contact accommodating cavity 140-2 is located on the upper side of the insulator bottom plate 140-9 (also the inner side of the insulator bottom plate 140-9); the two main isolation plates 140-5 are vertically connected to the left and right sides of the two insulator sidewalls 140-1, respectively; the main baffle 140-4 is disposed on the lower side of the insulator bottom plate 140-9 (also the outer side of the insulator bottom plate 140-9) and extends to the lower side of the insulator bottom plate 140-9; and the main isolation plate 140-5 extends from the front end of the insulator body to the rear end of the insulator body (i.e., both ends of the insulator body in a length direction).

Further, as shown in FIGS. 35 and 37, the main isolation plate 140-5 is formed into a flared mouth shape as a whole, wherein an opening direction of the flared mouth shape is oriented towards the outer side of the insulator bottom plate 140-9. Further, an opening direction of the flared mouth shape of the main isolation plate 140-5 is opposite to an opening direction of the moving contact accommodating cavity 140-2. Specifically, in the direction shown in FIG. 37, the opening direction of the flared mouth shape faces downward, and the opening direction of the moving contact accommodating cavity 140-2 faces upward.

Further, as shown in FIGS. 35 and 37, the main isolation plate 140-5 includes an isolation plate head 140-50, an isolation plate neck 140-51, an isolation plate abdomen 140-52 and an isolation plate tail 140-53, which are connected in sequence, wherein one end of the isolation plate tail 140-53 is connected to the main baffle 140-4; and the isolation plate head 140-50 is disposed near the moving contact point 94 of the moving contact 9. Further, as shown in FIGS. 35 and 37, the upper side of the isolation plate abdomen 140-52 is flush with an opening side of the moving contact accommodating cavity 140-2.

As shown in FIGS. 14-16, and 35-37, an embodiment in which the movable contact 9 and the moving contact insulator 140 cooperate with the contact support 110 is as follows: the moving conductive rod 90 of the moving contact 9 is inserted in the moving contact accommodating cavity 140-2, and the moving contact 9 and the moving contact insulator 140 form a first assembly; a support assembling cavity 110-0 is formed in the middle of the contact support 110, the first assembly and the contact spring 23 are respectively disposed in the support assembling cavity 110-0, and the insulator bottom plate 140-9 props against a support bottom wall 110-9 of the support assembling cavity 110-0; the moving contact insulator 140 protrudes at one side of the contact support 110 from one end of the support assembling cavity 110-9; and the moving contact 9 drives the moving contact insulator 140 to rotate synchronously while the moving contact 9 rotates relative to the contact support 110 under an electric repulsion force generated by a short-circuit current, such that an exposure gap is formed between the insulator bottom plate 140-9 and a bottom wall of the support assembling cavity 110-9, and the main baffle 140-4 blocks the exposure gap on one side of the contact support 110.

Specifically, in a direction shown in FIG. 14, a huge electric repulsion force causes the moving contact 9 to be repulsed and rotated counterclockwise while the short-circuit current flows through the circuit breaker of the present invention, such that an exposure gap having an angle of θ is formed between the insulator bottom plate 140-9 and the support bottom wall 110-9. When the moving contact 9 is initially separated from the static contact 18, a large number of electric arc particles will be generated. However, the main baffle 140-4 is located on the right side of the contact support 110 to block the exposure gap, thereby preventing electric arc particles from entering the contact support assembling cavity through the exposure gap, and from being deposited in the contact spring 23 and/or contact shaft 10 to affect the operation performance of the moving contact mechanism.

Further, as shown in FIG. 37, the moving contact insulator further includes secondary baffles 140-7 which are respectively disposed on both sides of the insulator body; the secondary baffles 140-7 and the main baffle 140-5 are arranged side by side at intervals, and the secondary baffles 140-7 and the main isolation plates 140-5 are located on both sides of the main baffle 140-4, respectively; the secondary baffles 140-7 are vertically connected to the insulator sidewall 140-1 and protrude toward the outside of the insulator sidewall 140-1; and one end of each of the secondary baffles 140-7 protrudes on one side of the insulator bottom plate 140-9 to form a secondary baffle protrusion, and the secondary baffle protrusions located on both sides of the insulator body are connected to each other. Further, as shown in FIG. 37, the two secondary baffles 140-7 are disposed vertically on both sides of the two insulator sidewalls 140-2 respectively, and protrude to both sides of the two insulator sidewalls 140-2 respectively, and one ends of the two secondary baffles 140-70 protrude on one side of the insulator bottom plate 140-9 and are connected to each other, so that the two secondary baffles 140-70 form a U-shaped structure as a whole.

Specifically, in the direction shown in FIG. 37, the secondary baffles 140-7 are disposed at the rear end of the insulator body and are vertically connected to the left and right sides of the insulator sidewall 140-1, respectively; the lower ends of the two secondary baffles 140-7 protrude from the lower side of the insulator bottom plate 140-9 respectively and are connected into a whole, and the secondary baffles 140-7 are located on the rear side of the main baffle 140-4 and are disposed side by side; and the upper end of each secondary baffle 140-7 is flush with the opening side of the moving contact accommodating cavity 140-2.

Figure 36:
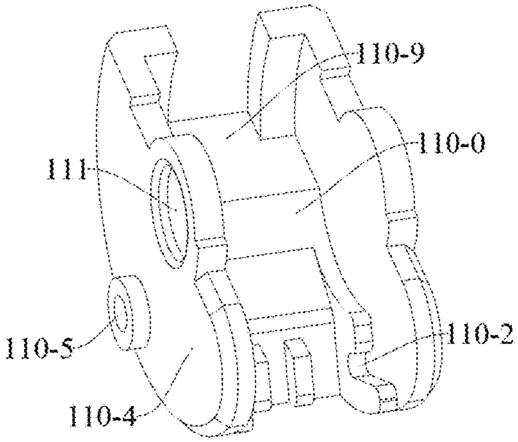
FIG. 36 is a schematic structural diagram of a contact support of the present invention.

Further, as shown in FIG. 36, the secondary baffles 140-7 are located within the support assembling cavity 110-0, respectively, and cooperate with the sidewall of the support assembling cavity 110-0 respectively, to block the exposure gap. Further, as shown in FIG. 37, the contact support 110 includes two support cooperating ribs disposed at one end of the support assembling cavity 110-0 and disposed to face each other at intervals, wherein the two support cooperating ribs are formed by bending inward from one ends of the two sidewalls of the support assembling cavity 110, and the two support cooperating ribs are staggered and cooperated with the two secondary baffles 140-7 respectively, to block the exposure gap. The secondary baffles 140-7 cooperates with the contact support 110, to further prevent the electric arc particles generated by the separation of the moving contact and the static contact from entering the support assembling cavity 110-0 through the exposure gap, which is conducive to prolonging the service life of the moving contact mechanism.

Further, as shown in FIG. 35, the insulator body includes a first body section and a second body section which are connected by bending, wherein the main isolation plate 140-5 and the main baffle plate 140-4 are respectively connected to the first body section, and the secondary baffle 140-7 is connected to the second body section. Further, as shown in FIG. 35, the insulator body is of a <-shaped structure, and the shape of the insulator body is matched with the shape of the moving conductor rod 90 of the moving contact 9.

Further, as shown in FIG. 37, the insulator body includes a head connecting hole 140-3 and a tail connecting hole 140-6 which are formed in both ends thereof, respectively, for a head connecting pin and a tail connecting pin to be inserted respectively, such that the insulator body and the moving contact 9 are fixedly connected. Further, as shown in FIG. 35, in the case that the moving contact 9 and the moving contact insulator 140 are assembled, the moving conductive rod 90 of the moving contact 9 is inserted in the moving contact accommodating cavity 140-2; as shown in FIG. 33, the moving conductive rod 90 includes a first moving contact connecting hole 905 and a second moving contact connecting hole 903 which are respectively formed in both ends thereof, wherein the first moving contact connecting hole 905 and the head connecting hole 140-3 are aligned, and the first connecting pin is inserted in the first moving contact connecting hole 905 and the head connecting hole 140-3; and the second moving contact connecting hole 903 and the tail connecting hole 140-3 are aligned, and the tail connecting pin is inserted in the second moving contact connecting hole 903 and the tail connecting hole 140-6, thereby achieving the fixed connection of the moving contact 9 and the moving contact insulator 140. The moving contact 9 and the moving contact insulator 140 form the first assembly.

As shown in FIG. 33, a first embodiment of the moving contact 9 is provided, wherein the moving contact 9 in this embodiment is a single-breakpoint moving contact: the moving contact 9 includes a moving conductive rod 90 and a moving contact point 94, wherein the moving conductive rod 90 is of a strip plate structure, the moving contact point 94 is disposed at one end of the moving conductive rod 90, and the conductive rod contact portion is disposed at the other end of the moving conductive rod 90; the moving conductor rod 90 is provided with a first moving contact connecting hole 905, a second moving contact connecting hole 903 and a moving contact shaft hole 901, wherein the first moving contact connecting hole 905 and the moving contact shaft hole 901 are formed in both ends of the moving conductive rod 90, respectively; the second moving contact connecting hole 903 is formed in the middle of the moving conductive rod 90 and is provided near the moving contact shaft hole 901; a moving contact clamping groove 902 is formed in the moving conductive rod 90; and the conductive rod contact portion is provided with a contact protrusion 906. Further, the moving conductive rod 90 is of a <-shaped structure, and the shape of the moving conductive rod is matched with the shape of the insulator body.

Further, the conductive rod contact portion is of a circular plate structure, and the contact protrusion 906 which is in driving cooperation with the first push rod 150 is disposed on a circumferential sidewall of the conductive rod contact portion.

It should be pointed out that the moving contact 9 in the first embodiment is suitable for a connection mode of the first and second moving contacts 9 and the conductor 70.

As shown in FIG. 46, a second embodiment of the moving contact 9 is provided, wherein the moving contact 9 in this embodiment is a single-breakpoint moving contact: the moving contact 9 includes a moving conductive rod 90 and a moving contact point 94, wherein the moving conductive rod 90 includes a conductive rod body 90-2 and a conductive rod contact portion, the moving contact point 94 is disposed at one end of the conductive rod body 90-2, and the other end of the conductive rod body 90-2 is connected to the conductive rod contact portion; the conductive rod contact portion is of a U-shaped structure, including a contact portion bottom plate and two conductive rod contact plates 907 which are connected to both ends of the contact portion bottom plate by bending and disposed to face each other at intervals, respectively; the conductive rod body 90-2 is connected to the middle of one side of the contact portion bottom plate, and the conductive rod body 90-2 and the conductive rod contact plate 907 are located on both sides of the contact portion bottom plate, respectively; a first moving contact connecting hole 905 and a second moving contact connecting hole 903 (not shown) are formed in both ends of the conductor rod body 90-2, respectively; and a moving contact clamping groove 902 is formed in one edge of one end, connected to the contact portion bottom plate, of the conductive rod contact plate 907.

It should be pointed out that the moving contact 9 in the second embodiment is suitable for the third connection mode of the moving contact 9 and the conductive rod 70.

As shown in FIG. 10, a third embodiment of the moving contact is provided, wherein the moving contact 9 in this embodiment is a double-breakpoint moving contact: the moving contact 9 is of a central symmetrical structure, including a moving conductive rod 90 and two moving contact points 94 disposed at both ends of the moving conductive rod 90, respectively, i.e., the first moving contact 94-0 and the second moving contact 94-1, respectively, which cooperates with two static contacts 18 (the two static contacts 18 are a first static contact 18-0 and a second static contact 18-1); and the moving contact 9 rotates, which can simultaneously realize the closure/disconnection with the two static contacts 18. The moving contact 9 in this embodiment does not need to be electrically connected by the conductor 70, but is directly disposed on the contact support 110.

As shown in FIG. 11 and FIG. 38, an embodiment of the static contacts 18 is provided: the static contact 18 include a static contact bridge 18-1 and a static contact point 18-0 disposed at one end of the static contact bridge 18-1; the static contact bridge 18-1 includes a U-shaped portion and a bending portion, wherein the bending portion is of a <-shaped structure, and the static contact 18-0 is disposed on one side arm of the U-shaped portion; the bending portion includes a first plate and a second plate connected by bending, wherein two ends of the first plate are connected to the U-shaped portion and the second plate by bending respectively, and the second plate is disposed parallel to the side arm of the U-shaped portion.

As shown in FIG. 36, an embodiment of the contact support 110 is provided: the contact support 110 is of a semi-cylindrical structure as a whole, including two support sidewalls 110-4 disposed to face each other at intervals, a support bottom wall 110-9 and a support assembling cavity 110-0, wherein both ends of the support bottom wall 110-9 are connected to the two support sidewalls 110-4 respectively by bending, and the support assembling cavity 110-0 is formed between the two support sidewalls 110-4; one ends of the two support sidewalls 110-4 are bent inwardly to form two support cooperating ribs which are disposed to face each other at intervals, and two support clamping grooves 110-2 which cooperate with both ends of the fourth spring shaft 202 are formed at the inner sides of the other ends of the two support sidewalls 110-4; and each support sidewall 110-4 is of a semicircular plate structure, wherein a support shaft groove 111 is formed in the circle center outside the support sidewall 110-4, and a support connecting hole 110-5 is formed in the radial end of the support sidewall 110-4.

As shown in FIGS. 39-44, the present invention also discloses a quick tripping device, in which the operating mechanism 100 quickly trips when the moving contact 9 is ejected due to a short-circuit fault of the circuit breaker, avoiding the moving contact 9 and the static contact 18 from being closed again. In addition, the operating mechanism cannot trip in a normal breaking/closing process of the moving contact 9 and the static contact 18, and details are as follows.

As shown in FIGS. 39-44, the quick tripping device includes an operating mechanism, a moving contact mechanism and a static contact 18, wherein the moving contact mechanism includes a contact support 110 and a moving contact 9; the operating mechanism 100 is in driving connection to the moving contact mechanism, so that the moving contact 9 and the static contact 18 are closed or disconnected. The quick tripping device further includes a first push rod 150 pivotally disposed on the contact support 110; the first push rod 150 includes a first push rod driven end and a first push rod driving end, wherein the first push rod driven end is in driving fit with the moving contact 9, and the first push rod driving end cooperates with the operating mechanism 100 to trip the operating mechanism; and a driving gap is formed between the first push rod driven end and the moving contact 9. When the moving contact 9 is electrically repelled by an electric repulsion force generated by a short-circuit current, the moving contact 9 rotates relative to the contact support 110, and the moving contact 9 rotates around the driving gap, then contacts with the first push rod driven end and drives the first push rod 150 to rotate, so that the operating mechanism 100 is tripped. According to the quick tripping device of the present invention, the moving contact 9 and the contact support 110 rotate synchronously. Therefore, the driving gap between the first push rod driven end and the moving contact 9 remains unchanged while the moving contact mechanism rotates such that the moving contact 9 and the static contact 18 are closed or disconnected normally, but the moving contact 9 will rebound when the moving contact 9 is in contact with the static contact 18. In the presence of the driving gap, a certain buffer space may be provided for the reasonable vibration generated when the moving contact 9 and the static contact 8 are closed, thereby avoiding the misoperation of the quick tripping device. However, if a short-circuiting fault occurs, the moving contact 9 is quickly repulsed by an electric repulsion force, and driven by the first push rod 150, an intermediate transmission structure and the second push rod 18, and the second push rod 18 drives the re-buckle 15 to release the limiting fit from the latch 13, such that the latch 13 releases the latching fit from the jump buckle 60, and the circuit breaker can be disconnected quickly.

Figure 39:
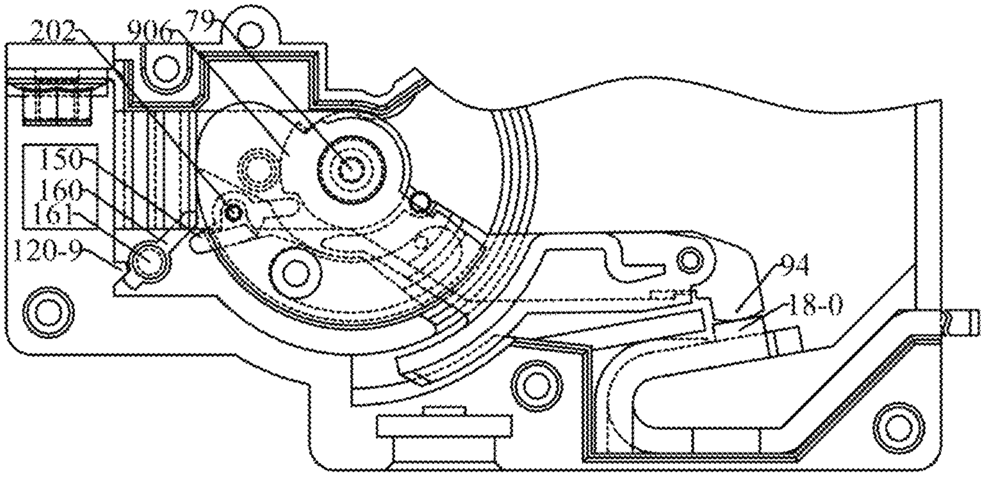
FIG. 39 is a schematic structural diagram of a circuit breaker pole of the present invention, in which an assembly relationship among the moving contact mechanism, a first push rod and a second push rod is shown.
Figure 40:
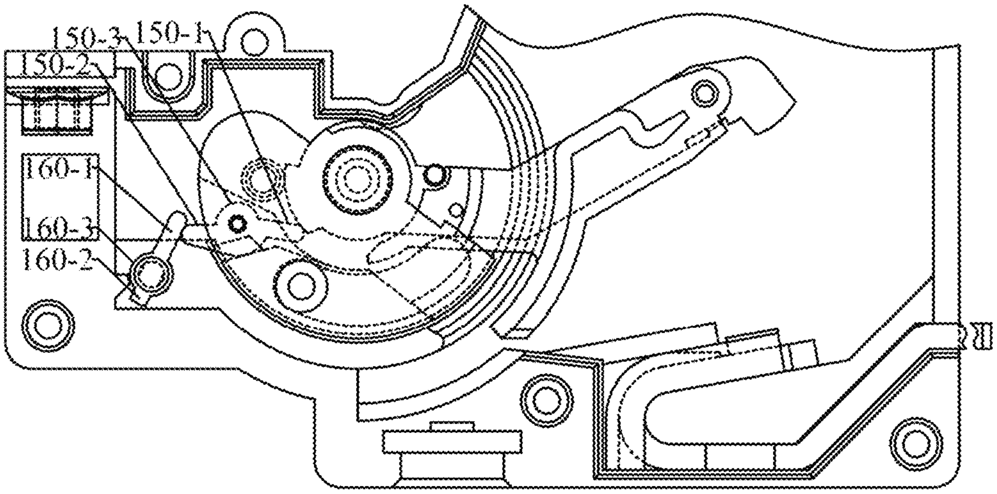
FIG. 40 is a schematic structural diagram of the circuit breaker pole of the present invention, in which a cooperative relationship among the moving contact, the first push rod, the second push rod and the unit housing is shown.

Specifically, as shown in FIG. 39, the contact support 110 drives the first push rod 150 and the moving contact 9 to rotate clockwise/counterclockwise synchronously in response to the normal closing/disconnecting operation of the circuit breaker, such that a driving gap is always remained between the first push rod 150 and the moving contact 9, and the quick tripping device will not be triggered. In particular, due to the hard contact between the moving contact 9 and the static contact 18 when the circuit breaker of the present invention is closed normally, the moving contact 9 will rebound to a certain extent. Due to the existence of the driving gap, the moving contact 9 will not contact the first push rod 150 when it rebounds, so the quick tripping device will not be driven. As shown in FIG. 40, the huge electric repulsion force causes the moving contact 9 to be repulsed when the short-circuit current flows through the circuit breaker of the present invention, and a rotation angle of the moving contact 9 is much greater than a rebound amplitude that appears when the moving contact 9 and the static contact 18 are closed. Therefore, the moving contact 9 will turn around the driving gap and then contact the first push rod driven end to drive the first push rod 150 to rotate, and the first push rod driving end drives the operating mechanism 100 to trip (even if the latch 13 releases the latching fit from the jump buckle 60), so that the circuit breaker is quickly tripped or disconnected, avoiding the moving contact 9 and the static contact 18 from being closed again.

It should be pointed out that the "the moving contact 9 is repelled by the short-circuit current" refers that: in the case that the short-circuit current flows through the closed moving contact 9 and U-shaped static contact 18, a large electric repulsion force is generated between the moving contact 9 and the static contact 18 since the U-shaped static contact 18 has a short-circuit current in the opposite direction, so that the moving contact 9 and the static contact 18 are disconnected.

Further, the first push rod driven end includes a driven protrusion or a driven groove.

Further, the moving contact 9 includes a driving groove or a driving protrusion.

Specifically, the first push rod driven end and the moving contact 9 may be cooperated by means of the driven protrusion and the driving protrusion, or by means of the driven groove and the driving protrusion, or by means of the driven groove and the driving groove, or by means of the driven protrusion and the driving groove.

Further, as shown in FIGS. 39-40, the moving contact 9 includes a moving conductive rod 90, the moving conductive rod 90 including a contact protrusion 906 that is in driving fit with the first push rod 150, a driving gap being formed between the contact protrusion 906 and the first push rod driven end. Further, as shown in FIG. 40, the middle part of the first push rod 150 is pivotally disposed on the contact support 110. The first push rod 50 includes a first push rod driven arm 150-1 (i.e., the first push rod driven end) and a first push rod driving arm 150-2 (i.e., the first push rod driving end) which are disposed at both ends, respectively and are in driving fit with the moving contact 9 and the intermediate transmission structure, respectively; and a driving gap is formed between the first push rod driven arm 150-1 and the contact support 906. Further, as shown in FIG. 40, the first push rod 150 further includes a first push rod mounting portion 150 pivotally disposed on the contact support 110, wherein one end of the first push rod driven arm 150-1 and one end of the first push rod driving arm 150-2 are connected to the first push rod mounting portion 150, respectively. Further, as shown in FIG. 39 and FIG. 40, the first push rod 150 is pivotally disposed on the contact support 110 through the fourth spring shaft 202.

Further, as shown in FIGS. 39-42, the quick tripping device further includes an intermediate transmission structure and a second push rod 180, wherein the first push rod driving end is in driving fit with the second push rod 180 through the intermediate transmission structure, and the second push rod 180 is in driving fit with the operating mechanism 100 to drive the operating mechanism 100 to trip. Further, as shown in FIG. 41, the second push rod 180 is in driving fit with the re-buckle 15 of the operating mechanism 100.

Further, as shown in FIGS. 39-42, the intermediate transmission structure includes a first intermediate push rod 160, a first intermediate shaft 161, a second intermediate push rod 170-1 and a second intermediate shaft 170-2, wherein the first intermediate push rod 160 is in driving fit with the first push rod driving end, the first intermediate shaft 161 is rotatably disposed around its axis line, and the first intermediate push rod 160 and the second intermediate push rod 170-1 are fixedly connected to the first intermediate shaft 161 respectively, such that the first intermediate push rod 160, the first intermediate shaft 161 and the second intermediate shaft 170-2 rotate synchronously; one end of the second intermediate shaft 170-2 is connected to the second intermediate push rod 170-1; and the other end of the second intermediate shaft 170-2 is in driving fit with the second push rod 180. Further, as shown in FIGS. 39-42, the first intermediate shaft 161 is inserted on the unit housing 120, and an inner end and an outer end of the first intermediate shaft 161 are in driving connection to the first intermediate push rod 160 and the second intermediate push rod 170-1, respectively. Further, as shown in FIG. 38, the unit housing 120 is provided with an intermediate shaft insertion hole 120-8 for the first intermediate shaft 161 to be inserted. It should be pointed out that the first intermediate shaft 161 may also be rotatably disposed on the bracket 50 of the operating mechanism 100.

Figure 42:
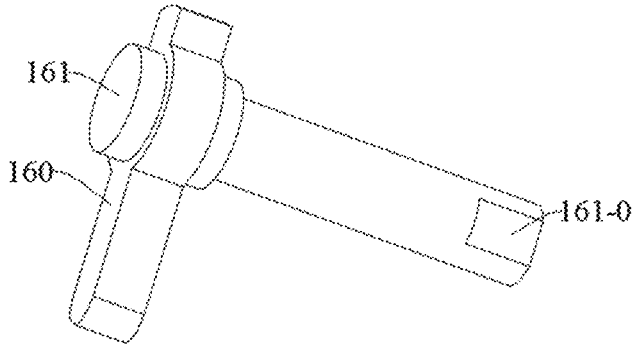
FIG. 42 is a schematic diagram of an assembly structure of a first intermediate push rod and a first intermediate shaft of the present invention.

Further, as shown in FIG. 42, the first intermediate shaft 161 is provided with a shaft limiting plane 161-0 at one end, the second intermediate push rod 170 is provided with a second intermediate push rod hole 170, and a sidewall of the second intermediate push rod hole 170 is provided with a hole limiting plane in limiting fit with the shaft limiting plane 161-0.

Further, as shown in FIGS. 40-42, the first intermediate push rod 160 includes a first intermediate push rod driven arm 160-1 and a first intermediate push rod limiting arm 160-2 which are in driving fit with the first push rod 150. As shown in FIGS. 39 and 40, the quick tripping device further includes a push rod limiting protrusion 120-9 which is in limiting fit with the first intermediate push rod limiting arm 160-2. Further, as shown in FIGS. 40-42, the middle part of the first intermediate push rod 160 is fixedly connected to the first intermediate shaft 161.

Further, as shown in FIGS. 39 and 40, the first push rod 150 and the push rod limiting protrusion 120-9 are located on both sides of the first intermediate push rod 160, respectively. Further, as shown in FIGS. 40-42, the push rod limiting protrusion 120-9 is disposed on the unit housing 120. It should be pointed out that the setting position of the push rod limiting protrusion 120-9 is not limited to one of the above, as long as it can play the function of limiting the swing amplitude of the first intermediate push rod 160.

Further, as shown in FIG. 41, the second push rod 180 is of a triangular plate-like structure, at one vertex angle of which a push rod driven hole 180-2 is formed for the second intermediate shaft 170-2 to be inserted to be in driving fit with the push rod driven hole, at a second vertex angle of which a second push rod shaft 4 is disposed pivotally, and at a third vertex angle of which a push rod driving finger 180-1 that is in driving fit with the re-buckle 15 is disposed. Further, as shown in FIG. 41, the second push rod 180 is pivotally disposed outside the unit housing 120 through the second push rod shaft 4.

Further, the re-buckle 15 includes a re-buckle driven column 15-9 in driving fit with the second push rod 180, and the re-buckle driven column 15-9 is in driving fit with the push rod driving finger 180-1.

Further, as shown in FIG. 41, the first intermediate shaft 161 is inserted on the unit housing 120, and two ends of the first intermediate shaft 161 are located inside and outside the unit housing 120 respectively. The first push rod 150 and the first intermediate push rod 160 are respectively disposed inside the unit housing 120, and the second intermediate push rod 170-1, the second intermediate shaft 170-2 and the second push rod 180 are respectively disposed outside the unit housing 120.

Further, as shown in FIG. 44, the circuit breaker of the present invention includes a plurality of circuit breaker poles 300 arranged side by side, wherein each circuit breaker pole including an independent first push rod 150, a first intermediate push rod 160, a first intermediate shaft 161, a second intermediate push rod 170-1 and a second intermediate shaft 170-2. Further, as shown in FIG. 44, each of the circuit breaker poles includes an independent second push rod 180; or two adjacent circuit breaker poles share one second push rod 180.

Specifically, as shown in FIG. 44, the circuit breaker of the present invention includes three circuit breaker poles 300 arranged side by side, wherein the circuit breaker poles 300 on the left side and in the middle share one second push rod 180, and the circuit breaker pole 300 on the right side includes an independent second push rod 180.

Further, as shown in FIGS. 38 and 43, each of the unit housing 120 includes a first connecting lug 120-1 and a second connecting lug 120-3 which are disposed on the sidewall at one end. The second push rod shaft 4 passes through each second connecting lug 120-3 to connect the unit housing 120 together. The circuit breaker further includes a second connecting shaft **4*a*, wherein the second connecting shaft 4*a* passes through the bracket 50 of the operating mechanism 100, and each first connecting lug 120-1 connects the operating mechanism 100 and the unit housing 120** together.

The above content is a further detailed description of the present invention in conjunction with specific preferred embodiments, and it cannot be considered that the specific embodiments of the present invention are limited to these descriptions. For those of ordinary skill in the technical field to which the present invention belongs, several simple deductions or substitutions can be made without departing from the concept of the present invention, which should be regarded as falling within the protection scope of the present invention.

The invention claimed is:

1. An operating mechanism of a circuit breaker, comprising a bracket, a rocker arm assembly and a jump buckle pivotally disposed on the bracket respectively, as well as a first crank, a first spring, a first connecting rod and a contact support, one end of the first crank is pivotally disposed on the jump buckle around a first axis, and another end of the first crank is rotatably connected to one end of the first connecting rod; one end of the first spring is connected to the rocker arm assembly, and another end of the first spring is connected to a rotating connection position of the first crank and the first connecting rod;

wherein the operating mechanism further comprises slide rails, a slider and a second connecting rod; the slider is slidably disposed on the slide rails and is rotatably connected to another end of the first connecting rod; one end of the second connecting rod is rotatably connected to the slider, and another end of the second connecting rod is rotatably connected to the contact support; and the contact support is driven to rotate around a third axis.

2. The operating mechanism of the circuit breaker as claimed in claim 1, wherein the operating mechanism further comprises an auxiliary limiting structure, one end of the auxiliary limiting structure is rotatably connected to the second connecting rod, and another end of the auxiliary limiting structure is rotatably connected to the bracket or a housing of the circuit breaker.

3. The operating mechanism of the circuit breaker as claimed in claim 2, wherein the auxiliary limiting structure is a third crank, one end of the third crank is rotatably connected to the second connecting rod, and another end of the third crank is rotatably connected to the bracket or the housing of the circuit breaker.

4. The operating mechanism of the circuit breaker as claimed in claim 1, wherein the bracket comprises two bracket arms disposed to face each other at intervals, and each bracket arm is provided with a slide rail, and two ends of the slider are respectively slidably disposed on the two slide rails.

5. The operating mechanism of the circuit breaker as claimed in claim 4, wherein the slide rails are slide holes, and the slider is a sliding shaft, two ends of which are respectively disposed in the two slide holes.

6. The operating mechanism of the circuit breaker as claimed in claim 1, wherein end of the second connecting rod is rotatably connected to the contact support through a first connecting shaft; and the bracket comprises a second avoidance hole for the first connecting shaft to pass through for avoiding the first connecting shaft.

7. The operating mechanism of the circuit breaker as claimed in claim 1, wherein the slide rails are disposed on the bracket or a housing of the circuit breaker, and the slide rails are of a groove-like structure or a hole-like structure.

8. The operating mechanism of the circuit breaker as claimed in claim 1, wherein the operating mechanism further comprises a latch and a re-buckle which are pivotally disposed on the bracket respectively; the jump buckle is in latching fit with the latch, and the latch is in limiting fit with the re-buckle; the rocker arm assembly comprises a handle, a rocker arm fixedly connected to the handle, and a reset structure for driving the jump buckle to rotate to re-buckle with the latch, the rocker arm being pivotally disposed on the bracket; the first crank comprises a crank limiting portion, which is in limiting fit with the jump buckle; two ends of a swing stroke of the rocker arm are a first stroke end and a second stroke end, respectively; two ends of the first spring are a first spring end and a second spring end, respectively, which are respectively connected to the rocker arm assembly and the first crank.

9. The operating mechanism of the circuit breaker as claimed in claim 8, wherein in a case that the operating mechanism is in a closed state, the rocker arm swings toward the second stroke end and drives the first spring end to rotate around the second spring end, until the first spring passes a first dead center position; the first spring drives the first crank to rotate in a second direction and drives the rocker arm to swing to the second stroke end; the first crank drives the slider through the first connecting rod to slide along the slide rails; and the slider drives the contact support through the second connecting rod to rotate in a first direction to a breaking position, so that the operating mechanism is switched to a disconnected state;

in a case that the operating mechanism is in the disconnected state, the rocker arm swings toward the first stroke end and drives the first spring end to rotate around the second spring end, until the first spring passes the first dead center position; the first spring drives the first crank to rotate in the first direction, such that the crank limiting portion is in limiting fit with the jump buckle, thereby preventing the first crank from rotating in the first direction; meanwhile, the first spring drives the rocker arm to swing to the first stroke end, and the first crank drives the slider through the first connecting rod to slide along the slide rails; and the slider drives the contact support through the second connecting rod to rotate in the first direction to a closing position, so that the operating mechanism is switched to a closed state; the first direction and the second direction are opposite to each other, in the case that the operating mechanism is in the closed state, the re-buckle rotates to release the limiting fit from the latch, and the latch rotates to release the latching fit from the jump buckle; the jump buckle rotates and drives the first crank to rotate synchronously, the first crank drives the slider through the first connecting rod to slide along the slide rails, and meanwhile, the slider drives the contact support through the second connecting rod to rotate in the second direction to the breaking position; the first spring drives the rocker arm to swing toward the second stroke end to the reset structure till being in limiting fit with the jump buckle, and the operating mechanism is switched to a tripped state; and in a case that the operating mechanism is in the tripped state, the rocker arm swings to the second stroke end, and the rocker arm drives the jump buckle through the reset structure to rotate to be in latching fit with the latch; and meanwhile, the latch rotates to be in limiting fit with the re-buckle, and the operating mechanism is switched to the disconnected state.

10. A circuit breaker, wherein comprising the operating mechanism of the circuit breaker as claimed in claim 1.

11. An operating mechanism of a circuit breaker, comprising a bracket; a rocker arm assembly and a jump buckle pivotally disposed on the bracket respectively, as well as a first crank, a first spring, a first connecting rod and a contact support, one end of the first crank is pivotally disposed on the jump buckle around a first axis, and another end of the first crank is rotatably connected to one end of the first connecting rod; one end of the first spring is connected to the rocker arm assembly, and another end of the first spring is connected to a rotating connection position of the first crank and the first connecting rod;

wherein the operating mechanism further comprises slide rails, a slider, a second crank and a second connecting rod; the slider is slidably disposed on the slide rails and is rotatably connected to another end of the first connecting rod; the second crank comprises a second crank supporting portion, a second crank connecting portion, and a second crank driving portion, wherein the second crank is pivotally disposed through the second crank supporting portion, and the second crank is connected to the contact support through the second crank driving portion; one end of the second connecting rod is rotatably connected to the slider, and another end of the second connecting rod is rotatably connected to the second crank connecting portion; and the contact support is driven to rotate around a third axis.

12. The operating mechanism of the circuit breaker as claimed in claim 11, wherein the second crank is pivotally disposed on the bracket or a housing of the circuit breaker through the second crank supporting portion; the second crank supporting portion and the second crank driving portion are respectively disposed on two ends of the second crank; and the second crank connecting portion is disposed between the second crank supporting portion and the second crank driving portion.

13. The operating mechanism of the circuit breaker as claimed in claim 12, wherein the second crank driving portion is rotatably connected to the contact support through a linkage shaft.

14. The operating mechanism of the circuit breaker as claimed in claim 13, wherein the housing of the circuit breaker is provided with a first avoidance hole for the linkage shaft to pass through for avoiding the linkage shaft; end of the second connecting rod is rotatably connected to the second crank connecting portion through a first connecting shaft; and the bracket is provided with a second avoidance hole for the first connecting shaft to pass through for avoiding the first connecting shaft.

15. The operating mechanism of the circuit breaker as claimed in claim 11, wherein a center of rotation of the second crank is a ninth axis, and the ninth axis is parallel to or coincided with the third axis.

* * * * *